US012611621B2

(12) United States Patent (10) Patent No.: US 12,611,621 B2
Pease et al. (45) Date of Patent: *Apr. 28, 2026

(54) SEPARATOR ASSEMBLIES AND METHODS

(71) Applicant: Battelle Memorial Institute, Richland, WA (US)

(72) Inventors: Leonard F. Pease, Richland, WA (US); Xiao-Ying Yu, Richland, WA (US); Timothy G. Veldman, Kennewick, WA (US); Matthew S. Fountain, Kennewick, WA (US); Michael J. Minette, Kennewick, WA (US); Carolyn A. Burns, Richland, WA (US); Nathan R. Phillips, Kennewick, WA (US); Jason E. Serkowski, Richland, WA (US); Judith A. Bamberger, Richland, WA (US); Raymond S. Addleman, Benton City, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,943

(22) Filed: Jul. 8, 2024

(65) Prior Publication Data

US 2024/0359118 A1 Oct. 31, 2024

Related U.S. Application Data

(63) Continuation-in-part of application No. 16/395,097, filed on Apr. 25, 2019.

(Continued)

(51) Int. Cl.
B01D 29/44 (2006.01)
B01D 17/02 (2006.01)
B01D 19/00 (2006.01)

(52) U.S. Cl.
CPC ........ *B01D 29/445* (2013.01); *B01D 17/0211* (2013.01); *B01D 19/0042* (2013.01)

(58) Field of Classification Search
CPC .............. B01D 29/445; B01D 17/0211; B01D 19/0042

(Continued)

(56) References Cited

U.S. PATENT DOCUMENTS 3,240,336 A 3/1966 Condolios
4,818,375 A 4/1989 Dorph
(Continued)

FOREIGN PATENT DOCUMENTS

CN 202983295 6/2023
GB 2150039 6/1985
(Continued)

OTHER PUBLICATIONS

Peacock et al., "The stratified Boycott effect", J. Fluid Mech. vol. 529 (2005) United Kingdom, pp. 33-49.

(Continued)

*Primary Examiner* — Molly K Devine
(74) *Attorney, Agent, or Firm* — Wells St. John P.S.

(57) ABSTRACT

Systems and methods for separating components of a mixture are provided. The systems can include at least one section that defines a tortured path configured to provide some components in one direction along the section and other components in another direction along the section. Methods can provide for the separation of bubbles within a liquid matrix, liquid separation, liquid/solid separation, and/ or solids separation.

37 Claims, 56 Drawing Sheets
(2 of 56 Drawing Sheet(s) Filed in Color)

Related U.S. Application Data

(60) Provisional application No. 63/525,631, filed on Jul. 7, 2023, provisional application No. 62/832,790, filed on Apr. 11, 2019, provisional application No. 62/824,925, filed on Mar. 27, 2019.

(58) Field of Classification Search
USPC ................................. 209/393, 660; 210/801
See application file for complete search history.

(56) References Cited

U.S. PATENT DOCUMENTS

| | | | |
|---|---|---|---|
| 5,817,505 A | 10/1998 | Thompson et al. | |
| 5,947,299 A | 9/1999 | Vazquez et al. | |
| 6,010,554 A | 1/2000 | Birmingham et al. | |
| 6,814,241 B1 | 11/2004 | Galvin | |
| 7,735,652 B2 | 6/2010 | Inglis et al. | |
| 8,186,913 B2 * | 5/2012 | Toner ...................... | F16L 41/02 |
| | | | 435/174 |
| 8,579,117 B2 | 11/2013 | Loutherback et al. | |
| 8,906,322 B2 | 12/2014 | Huang et al. | |
| 8,921,102 B2 | 12/2014 | Fuchs et al. | |
| 9,500,051 B2 | 11/2016 | Hall | |
| 9,597,692 B2 | 3/2017 | Bernate et al. | |
| 10,413,848 B2 | 9/2019 | Xu | |
| 10,576,399 B2 | 3/2020 | Kompala | |
| 11,028,359 B2 | 6/2021 | Misner et al. | |
| 11,090,583 B2 | 8/2021 | Hammerschmidt et al. | |
| 11,406,918 B2 | 8/2022 | Alba et al. | |
| 11,491,418 B2 | 11/2022 | Less et al. | |
| 2009/0032448 A1 | 2/2009 | Kolb | |
| 2010/0006479 A1 | 1/2010 | Reichenbach | |
| 2010/0243539 A1 | 9/2010 | Kojima et al. | |
| 2012/0006728 A1 | 1/2012 | Huang et al. | |
| 2012/0037544 A1 | 2/2012 | Lane | |
| 2013/0023397 A1 | 1/2013 | Galvin | |
| 2013/0168298 A1 | 7/2013 | Huang et al. | |
| 2015/0328566 A1 | 11/2015 | Oosthuizen | |
| 2018/0297024 A1 * | 10/2018 | Tran .................... | B01L 3/50273 |
| 2020/0001217 A1 | 1/2020 | Savage | |
| 2021/0317009 A1 | 10/2021 | Galvin | |
| 2024/0360005 A1 | 10/2024 | Pease et al. | |

FOREIGN PATENT DOCUMENTS

| | | |
|---|---|---|
| GB | 2170419 | 8/1996 |
| JP | 2014000547 | 1/2014 |
| WO | WO 1991/006627 | 5/1991 |
| WO | PCT/US2020/025063 | 10/2021 |
| WO | WO 2022/067408 | 4/2022 |
| WO | WO 2023/066218 | 4/2023 |
| WO | PCT/US2024/026794 | 6/2024 |
| WO | PCT/US2024/026871 | 8/2024 |

OTHER PUBLICATIONS

Baranets et al., "Mathematical Modeling of Particle Aggregation and Sedimentation in the Inclined Tubes", Mathematics, Applied Mathematics and Mechanics, vol. 90, 2019, Netherlands, pp. 42-59.
Cerny et al., "The Sedimentation Potential and the Boycott Effect", Biorheology, vol. 25, 1988, United States, pp. 503-516.
Hill et al., "Boundary-Enhanced Sedimentation Due to Settling Convection", Int. J. Multiphase Flow, vol. 3, 1977, Great Britain, pp. 561-583.
Kapoor et al., "Sedimentation and sediment flow in settling tanks with inclined walls", Journal of Fluid Mechanics, vol. 290 (1995), United Kingdom, pp. 39-66.
Kim et al., "Geometry effects on blood separation rate on a rotating disc", Sensors and Actuators B, 178, 2013, Netherlands, pp. 648-655.
Kinahan et al., "Spira mirabilis enhanced whole blood processing in a lab-on-a-disk", Sensors and Actuators A, 215, 2014, Netherlands, pp. 71-76.

Leighton et al., "The shear-induced migration of particles in concentrated suspensions", Journal of Fluid Mechanics, vol. 181 (1987), United Kingdom, pp. 415-439.
Leung et al., "Lamella and Tube Settlers. 1. Model and Operation", Ind. Eng. Chem. Process Des. Dev. Vol. 22, No. 1 (1983) pp. 58-67.
Nir et al., "Sedimentation and sediment flow on inclined surfaces", Journal of Fluid Mechanics, vol. 212 (1990) United Kingdom, pp. 139-153.
Palma et al., "Characterization of a sediment layer of concentrated fluid-solid mixtures in tilted ducts at low Reynolds Numbers", Powder Technology 325 (2018) Netherlands, pp. 192-201.
Pease et al., "Industrial scale mesofluidic particle separation", Chemical Engineering & Processing: Process Intensification 173 (2022) 108795, Netherlands, 7 pages.
Reyes et al., "Heat-Assisted Batch Settling of Mineral Suspensions in Inclined Containers." Minerals 9, No. 4 (2019) 228; Switzerland, 19 pages.
Schaflinger, "Centrifugal separation of a mixture", Fluid Dynamics Research vol. 6, 1990, United Kingdom, pp. 213-249.
Smith et al., "Particle concentration using inclined sedimentation via sludge accumulation and removal for algae harvesting", Chemical Engineering Science vol. 91 (2013) United Kingdom, pp. 79-85.
Spearman et al., "On the hindered settling of sand-mud suspensions", Ocean Dynamics vol. 67 (2017) Germany, pp. 465-483.
Tripathi et al., "A new criterion for the continuous operation of supersettlers in the bottom-feeding mode", Int. J. Multiphase Flow, vol. 22, No. 2 (1996) United Kingdom, pp. 353-361.
Wiberg et al., "Calculations of the Critical Shear Stress for Motion of Uniform and Heterogeneous Sediments", Water Resources Research, vol. 23, No. 8 (1987) United States, pp. 1471-1480.
Acrivos et al., "Enhanced sedimentation in settling tanks with inclined walls", Journal of Fluid Mechanics 92 (1979), United Kingdom, pp. 435-457.
Boycott, "Sedimentation of Blood Corpuscles", Nature 104 (1920) United Kingdom, 532, 1 page.
Burns et al., "Mesofluidic Separation versus Dead-end Filtration" Separation and Purification Technology 254 (2021) The Netherlands, 117256, 7 pages.
D'Avino, "Non-Newtonian Deterministic Lateral Displacement Separator: Theory and Simulations", Rheologica Acta vol. 52, 2013, Germany, pp. 221-236.
Daniel et al., "EFRT M-12 Issue Resolution: Comparison of Filter Performance at PEP and CUF Scale", Pacific Northwest National Laboratory WTP-RPT-185, 2009, United States, 148 pages.
Davis et al., "Deterministic Hydrodynamics: Taking Blood Apart", Proceedings of the National Academy of Science vol. 103, 2006, United States, pp. 14779-14784.
Dijkshoorn et al., "A Comparison of Microfiltration and Inertia-based Microfluidics for Large Scale Suspension Separation", Separation and Purification Technology vol. 173, 2017, United Kingdom, pp. 86-92.
Dijkshoorn et al., "Deterministic Displacement of Particles and Oil Droplets in a Cross-Flow Microsieve Module", Journal of Membrane Science vol. 566, 2018, Netherlands, pp. 435-441.
Dijkshoorn et al., "Reducing the Critical Particle Diameter in (highly) Asymmetric Sieve-based Lateral Displacement Devices", Scientific Reports, 2017, United Kingdom, 10 pages.
Dijkshoorn et al., "Sieve-based Lateral Displacement Technology for Suspension Separation", Separation and Purification Technology vol. 175, 2017, United Kingdom, pp. 384-390.
Dincau et al., "Deterministic Lateral Displacement (DLD) in the High Reynolds Number Regime: High-Throughput and Dynamic Separation Characteristics", Microfluidics and Nanofluidics vol. 22, 2018, Germany, 59.
Dincau et al., "Vortex-Free High-Reynolds Deterministic Lateral Displacement (DLD) via Airfoil Pillars", Microfluidics and Nanofluidics vol. 22, 2018, Germany, 137.
Geeting et al., "Filtration of Hanford Tank AP-107 Supernatant", Pacific Northwest National Laboratory PNNL-27638, 2018, United States, 76 pages.
Golcar, "Performance of Tubular Porous Metal Crossflow Filters", Pacific Northwest Laboratory PNWD-3216, WTP-RPT-019, 2002, United States, 88 pages.

(56)          References Cited

OTHER PUBLICATIONS

H2K Technologies, Inc., "IPC Series DAF & Inclined Plate Clarifiers", available online at https://www.h2ktech.com/wp-content/uploads/2020/02/IPC_Series_Inclined_Plate_Clarifiers.pdf, 2011, 3 pages.
Holm, et al., "Separation of Parasites from Human Blood using Deterministic Lateral Displacement", Lab on a Chip vol. 11, 2011, United Kingdom, pp. 1326-1332.
Huang et al., "Continuous Particle Separation Through Deterministic Lateral Displacement", Science vol. 304, 2004, United States, pp. 987-990.
Inglis et al., "Critical Particle Size for Fractionation by Deterministic Lateral Displacement", Lab on a Chip vol. 6, 2006, United Kingdom, pp. 655-658.
Jacob et al., "Particle Dispersion in Porous Media: Differentiating Effects of Geometry and Fluid Rheology", Physical Review E vol. 96, 2017, United States, 13 pages.
Kabacaoglu et al., "Optimal Design of Deterministic Lateral Displacement Device for Viscosity Contrast Based Cell Sorting", Physical Review Fluids vol. 3, 2018, United States.
Kabacaoglu et al., "Sorting Same-Size Red Blood Cells in Deep Deterministic Lateral Displacement Devices", Journal of Fluid Mechanics vol. 859, 2019, United Kingdom, pp. 433-475.
Kong et al., "Lab-on-a-CD: A fully Integrated Molecular Diagnostic System", Journal of Laboratory Automation 21 (2016) United States, pp. 323-355.

Li et al., "Dynamic Control of Particle Separation in Deterministic Lateral Displacement Separator with Viscoelastic Fluids", Scientific Reports, 2018, United Kingdom, 9 pages.
Loutherback et al., "Deterministic Microfluidic Ratchet", Physical Review Letters vol. 102, 2009, United States, 4 pages.
Lubbersen et al., "Suspension Separation with Deterministic Ratchets at Moderate Reynolds Numbers", Chemical Engineering Science vol. 73, 2012, United Kingdom, pp. 314-320.
Lubbersen et al., "Visualization of Inertial Flow in Deterministic Ratchets", Separation and Purification Technology vol. 109, 2013, United Kingdom, pp. 33-39.
Minette et al., "Targeted Particle Fractionation Technologies: Proof of Concept" Proceedings of the ASME 2023, Paper No. IMECE2023-110684, published online Feb. 5, 2024, United States, 7 pages.
Ranjan et al., "DLD Pillar Shape Design for Efficient Separation of Spherical and Non-Spherical Bioparticles", Lab on a Chip vol. 14, 2014, United Kingdom, pp. 4250-4262.
Reyes et al., "A Review on Steeply Inclined Settlers for Water Clarification", https://arxiv.org/pdf/2212.10394v1; Dec. 21, 2022, United States, 37 pages.
Xu et al., "A Numerical Simulation of the Boycott Effect", Chem. Eng. Comm, 192 (2005) United Kingdom pp. 532-549.
Zeming et al., "Rotational Separation of Non-Spherical Bioparticles using I-Shaped Pillar Arrays in a Microfluidic Device", Nature Communications vol. 4, 2013, United Kingdom, 8 pages.

* cited by examiner

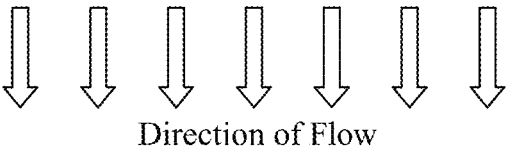
Direction of Flow
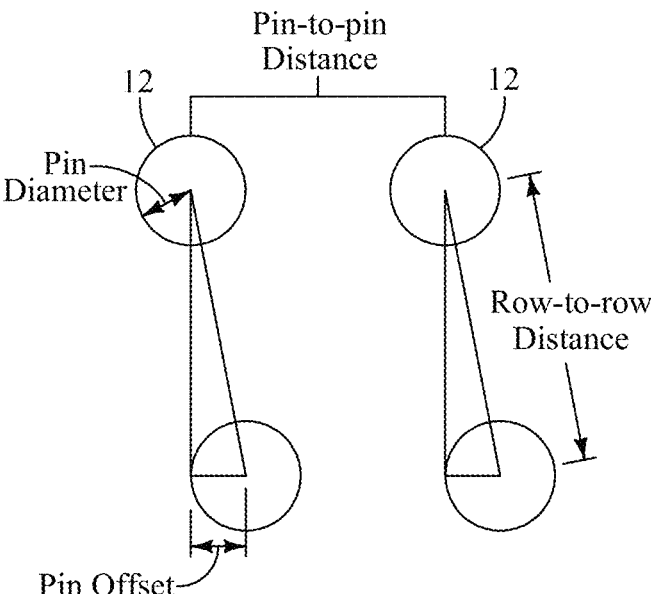
Pin-to-pin
Distance
12           12
Pin
Diameter
Row-to-row
Distance
Pin Offset
FIG. 5

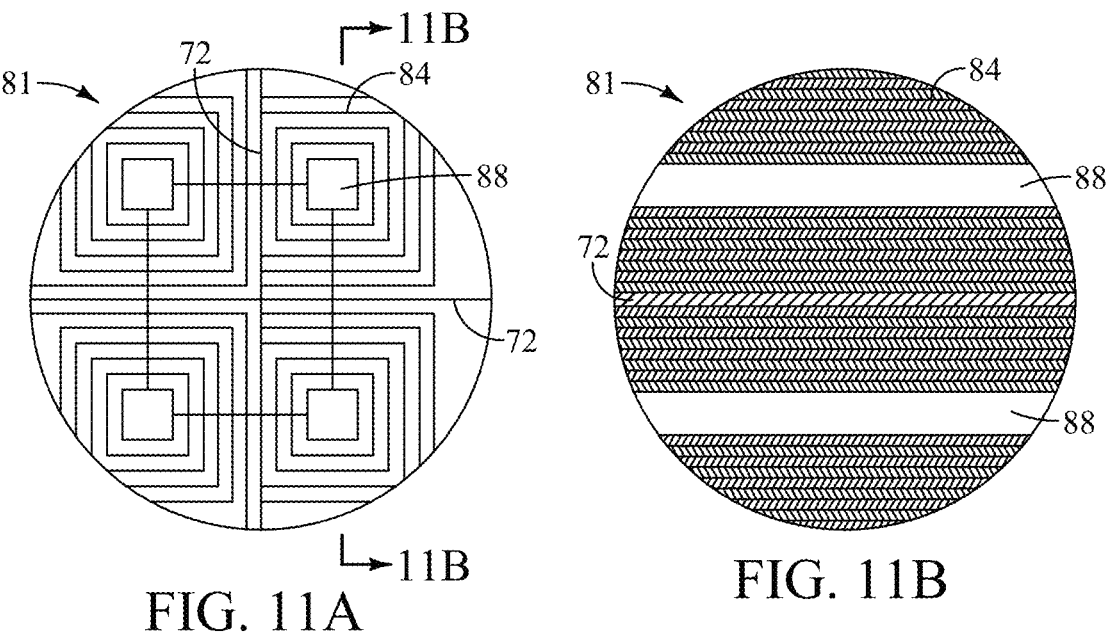
FIG. 11A
FIG. 11B
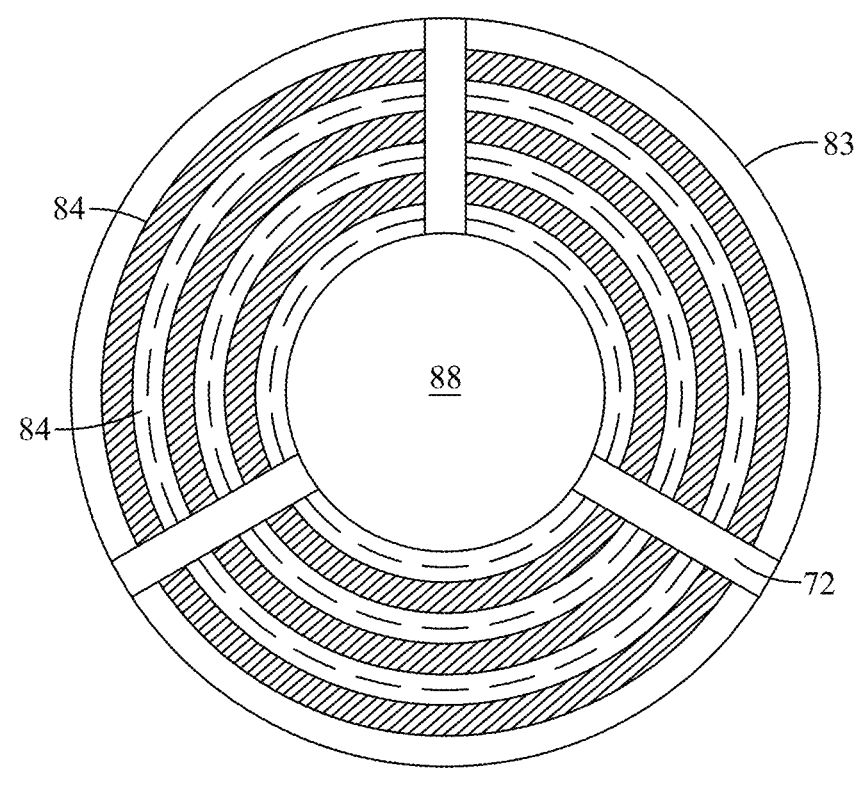
FIG. 12

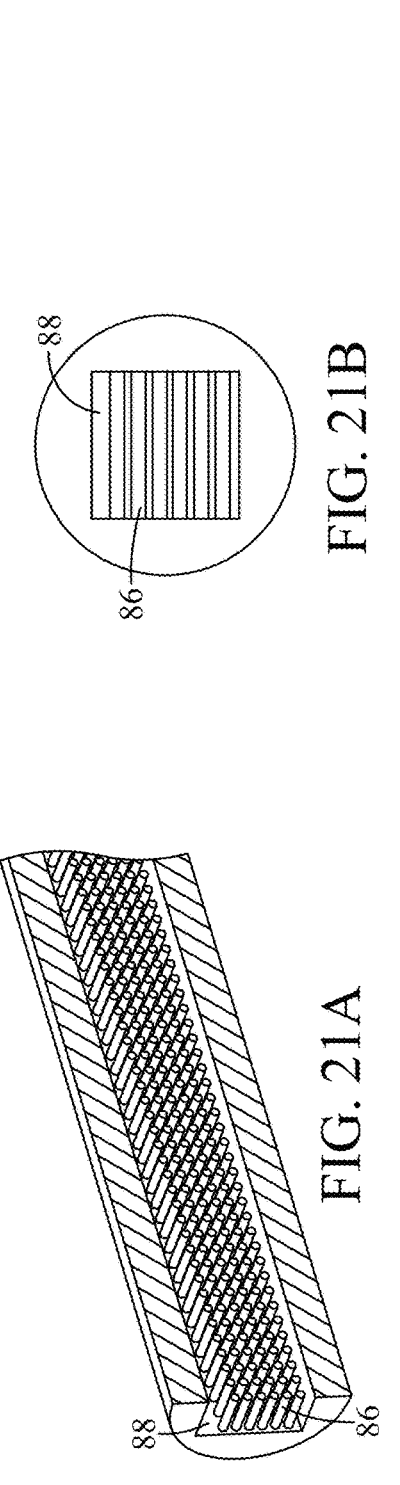
FIG. 21A
FIG. 21B
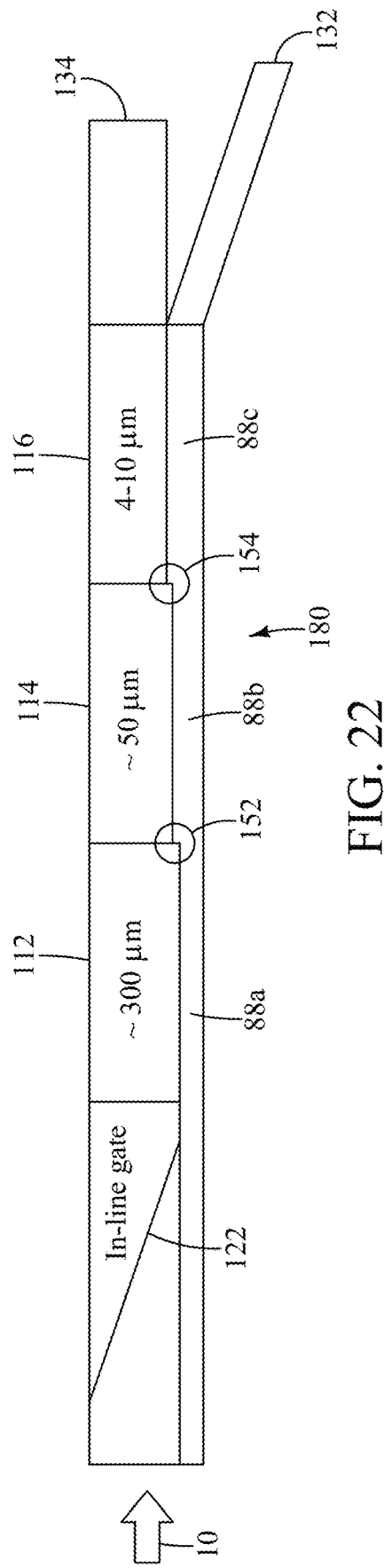
FIG. 22

800

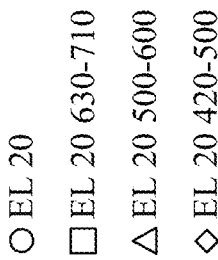
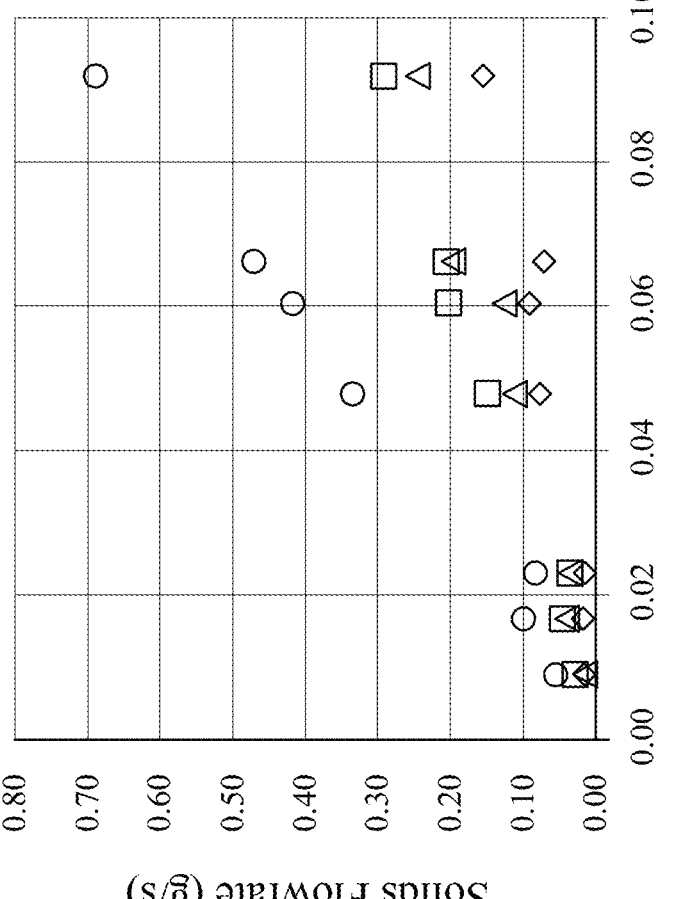
FIG. 46A

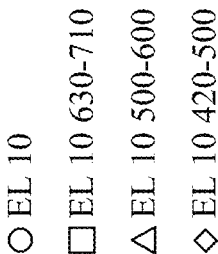
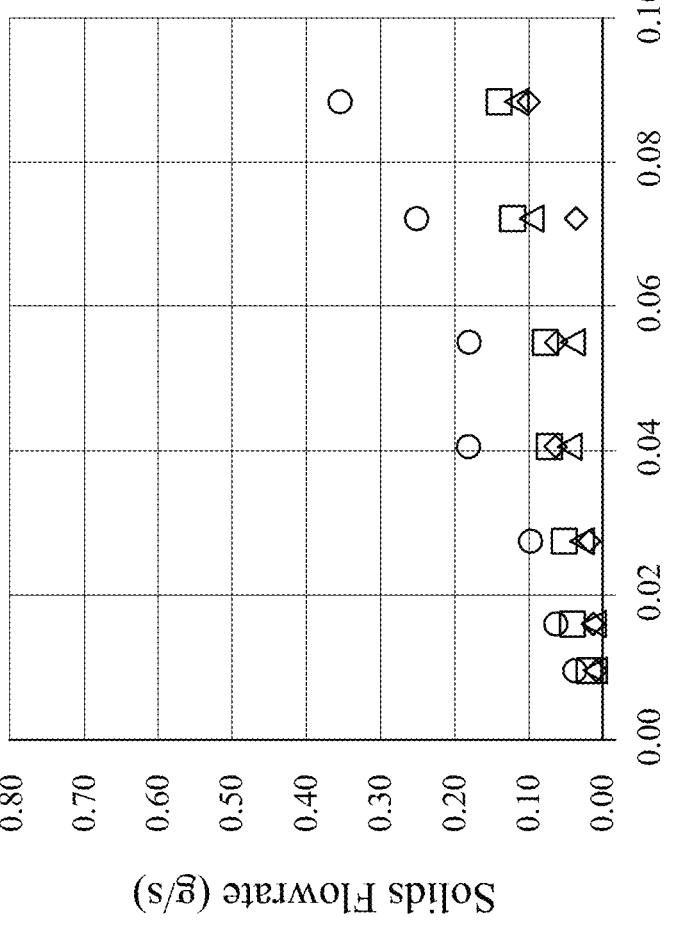
FIG. 46B

800

800

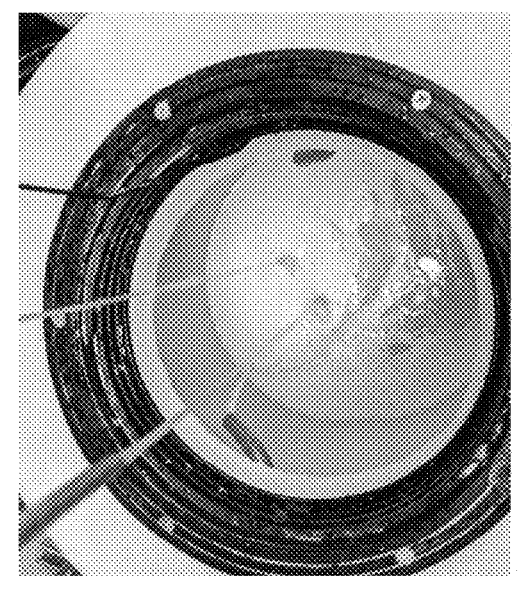
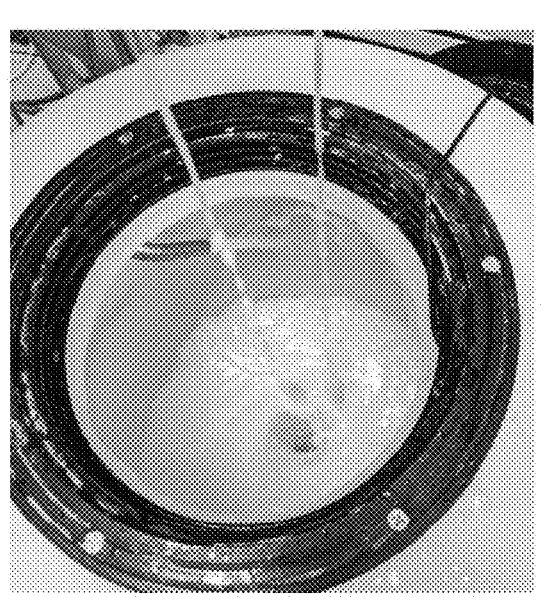
FIG. 49A                    FIG. 49B

Flowrate (L/min)

□ Conc 1    ○ Conc 2    △ Conc 3    ◇ Conc 4    ⬠ Conc 5    ○ Conc 5R

SEPARATOR ASSEMBLIES AND METHODS

CROSS REFERENCE TO RELATED APPLICATION

This application is a continuation-in-part of U.S. patent application Ser. No. 16/395,097 filed Apr. 25, 2019, entitled "Separator Assemblies and Methods", which claims priority to and the benefit of U.S. Provisional Patent Application Ser. No. 62/824,925 filed Mar. 27, 2019, entitled "Solid Particle Filtration Apparatuses and Methods" and U.S. Provisional Patent Application Ser. No. 62/832,790 filed Apr. 11, 2019, entitled "Separator Assemblies and Methods", the entirety of each of which is incorporated by reference herein. This application also claims priority to and the benefit of U.S. Provisional Patent Application Ser. No. 63/525,631 filed Jul. 7, 2023, entitled "Mesofluidic Separator Assemblies and Methods, the entirety of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to separator assemblies and methods. Particular embodiments of the disclosure are directed to mesofluidic separator assemblies and methods.

BACKGROUND

Slurries play an important role in modern industrial processing, from food processing and hydraulic fracturing to mineral processing, waste treatment, vegetable processing, water purification, and/or nuclear waste processing. Conditioning slurries to meet product, process, and regulatory requirements is an important industrial technique. Engineering is challenged particularly as concentrations rise due to process intensification.

Filtration is an industrially important unit operation used on every continent across a broad range of at least these industries. In each application, particles (broadly defined) larger than a cutoff must be removed to produce a filtrate devoid of large particles. In dead-end filtration with a single inlet and a single outlet, particles larger than the characteristic channel dimension are trapped on the filter inlet to form a filter cake.

Every major industry is intensifying its processes as rapidly as technology, market economics, and available investment allow, because higher flowrates and higher concentrations typically lead to lower cost of goods sold (COGS), higher profit margins, and more compelling returns on investment. However, in several industries filtration technology limits process intensification, because both higher concentrations and faster flowrates lead to faster cake and depth fouling, leaving filtration unit operations as perineal bottlenecks.

Additionally, filter banks often have a significant footprint as they increase cross-sectional area to match flowrate requirements, but smaller footprint systems minimize the cost of implementation. Therefore, minimizing the filtration footprint is also desirable.

Therefore, novel filtration approaches amenable to process intensification remain desirable. The present disclosure provides separator assemblies and methods that overcome shortcomings of the prior art.

Filters, sieves, and hydrocyclones are used industrially to remove particles. Filters and sieves often limit process throughput, and some require back flushing so that overall throughput is reduced. Hydrocyclones are expensive and have reduced efficacy at lower particle sizes. Alternative particle removal techniques would be advantageous.

The separation of large particles from non-Newtonian slurries can be a particular challenge. These non-Newtonian slurries, in contrast to Newtonian slurries, can include small, sticky (colloidal) particles. They can be characterized by rare experimental radioactive slurry data using a combination of Cross's model that accounts for both infinite and zero shear viscosities and Bingham's yield stress, which has Bingham's model as a limit.

Additionally, the ability to efficiently separate multi-phase mixtures such as two-phase industrial (oil/water) mixtures is important for future use of valuable resources. For example, a portion of the over 800 billion gallons of petroleum production water could be reclaimed annually for reuse in the drought-ridden western US states. The ability to reclaim this petroleum production water may be advantageous for the Central High Plains (Colorado, Kansas, New Mexico, Oklahoma, and Texas). Trends in the High Plains alone suggest loss of 20 to 25% of the irrigated farming area due to insufficient ground water storage for irrigation, and these farmland losses are expected to grow to 40%. Separation systems that can facilitate reuse of petroleum production water for crop irrigation or to replace water from currently failing aquifers in rich agricultural lands of the Central High Plains are highly desirable.

However, effective and rapid separation of multiphase solutions at industrial scales remains a long-standing challenge. Many two-phase separations are accomplished by static gravitational settling (e.g., oil-water separators, clarifiers, settling tanks, etc.), which is often slow if not very slow, or in centrifuges that operate much faster but with limited throughput. Where phase density differences are large (e.g., air versus water), buoyancy forces can be very effective at driving phase separation, but where the densities remain within an order of magnitude, separations are often much slower. At very small scales, surface forces can be used to drive phase separation, but these techniques often do not translate to high throughput systems. A rapid high throughput means of inducing phase separation remains a challenge.

SUMMARY

Mesofluidic separator assemblies are provided that can include at least a pair of supports configured to extend lengthwise within a pressure differential axis, and at least one level of a plurality of members extending between the pair of supports.

Mesofluidic separator assemblies are also provided that can include a plurality of members configured to extend substantially normal to a pressure differential axis, and at least individual members of the plurality defining a plurality of levels extending from a first level configured to have initial contact with the fluid to be filtered and a last level configured to have final contact with the fluid to be filtered.

Additional mesofluidic separator assemblies are also provided that can include at least one set of a plurality of members with a length of each individual member being configured to extend substantially normal to a pressure differential axis and each member in the one set being aligned along one axis that is neither parallel nor normal to the pressure differential axis.

Additionally, mesofluidic separator assemblies are provided that can include a conduit configured to facilitate the flow of fluid along a pressure differential axis with the conduit defining at least one cross sectional area. The mesofluidic separator assembly can also include a separator assembly within the conduit and occupying one portion of the at least one cross sectional area while another portion of the at least one cross sectional area is open.

Methods for size separating particles within a fluid are provided. The methods can include providing a fluid having solid particles of at least two sizes into a conduit having a plurality of members, and arranging the members to direct the smaller of the two sized particles through the plurality of members while maintaining a substantially linear path and to direct the larger of the two sized particles through the plurality of members in a substantially non-linear path.

Systems for separating components of a mixture are provided. The systems can include: a conduit system comprising at least one section; the at least one section comprising, in at least one cross section, a tortured path and an expressway; the at least one section being configured to receive a mixture of components, the tortured path configured to direct at least one portion of the mixture of components to the expressway while allowing at least another portion of the mixture components to avoid the expressway; and at least one other section defining at least two conduit pathways, one of the conduit pathways being configured to receive the at least one portion of the mixture of components proceeding through the expressway and the another of the conduit pathways being configured to receive the other portion of the mixture of components that proceeded through the tortured path and avoided the expressway.

Methods for separating components of a mixture are provided. The methods can include: providing a mixture of components, wherein at least two of the components have different physical characteristics; conveying the mixture through at least one section of conduit, the at least one section of conduit defining a tortured path and an expressway; and the conveying separating at least some of the at least two components.

Systems for separating components of a mixture are provided. The systems can include: a conduit system comprising at least one section; the at least one section including, in at least one cross section: a tortured path; wherein the at least one section is configured to receive a mixture of components, the tortured path configured to direct at least one portion of the mixture of components in one direction while allowing at least another portion of the mixture components to proceed without substantial change in direction, wherein the path of the one portion is substantially different than the other portion; and at least one other section defining at least two conduit pathways, one of the conduit pathways being configured to receive the at least one portion of the mixture of components proceeding in the one direction and the other of the conduit pathways being configured to receive the other portion of the mixture of components.

Methods for separating components of a mixture are provided. The methods can include: providing a mixture of condensed fluid phase components, wherein at least two of the fluid phase components have different physical characteristics; conveying the mixture through at least one section of conduit, the at least one section of conduit defining a tortured path; and the conveying separating at least some of the at least two fluid phase components.

Systems for separating components of a mixture are provided. The systems can include: a conduit system comprising at least one section; the at least one section comprising, in at least one cross section, a tortured path and an expressway, the section being aligned along a horizontal plane wherein the tortured path is aligned vertically above the expressway in the at least one cross section; the at least one section being configured to receive a mixture of fluid phase components; and the tortured path configured to direct at least one portion of the mixture of components in one direction while allowing at least another portion of the mixture components to proceed without substantial change in direction, wherein the path of the one portion is substantially different than the other portion; and at least one other section defining at least two conduit pathways, one of the conduit pathways being configured to receive the at least one portion of the mixture of components proceeding in the one direction and the other of the conduit pathways being configured to receive the other portion of the mixture of components.

Methods for separating components of a mixture are provided. The methods can include: providing a mixture of components, wherein at least two of the components have different physical characteristics; conveying the mixture along a horizontal plane through at least one section of conduit, the at least one section of conduit defining a tortured path and an expressway, wherein the tortured path is aligned vertically above the expressway; and the conveying separating at least some of the at least two components.

BRIEF DESCRIPTION OF DRAWINGS

The patent or application file contains at least one drawing/photograph executed in color. Copies of this patent or patent application publication with color drawing(s) will be provided by the Office upon request and payment of the necessary fee.

Embodiments of the disclosure are described below with reference to the following accompanying drawings.

FIG. 5 is a depiction of the relationship of members within a separator assembly according to an embodiment of the disclosure.

FIGS. 11A-11B are depictions of a separator assembly according to an embodiment of the disclosure and a cross section of same.

FIG. 12 is a depiction of a separator assembly according to an embodiment of the disclosure.

FIGS. 21A-21B are views of the separator assembly of FIG. 15 according to embodiments of the disclosure.

FIG. 22 is a depiction of a separator assembly according to an embodiment of the disclosure.

FIG. 46A depicts data for solids express lane flowrate for each particle per test in 20 pin assemblies compared to total express lane flowrate showing total express lane solids flowrate (EL 20) and data for each of the three glass beads as a function of total slurry mass flowrate acquired using assemblies and/or methods according to an embodiment of the disclosure.

FIG. 46B depicts data for solids express lane flowrate for each particle per test in 10 pin assemblies compared to total express lane flowrate showing total express lane solids flowrate (EL 10) and data for each of the three glass beads as a function of total slurry mass flowrate acquired using assemblies and/or methods according to an embodiment of the disclosure.

FIG. 49A is a flow system showing express lane and permeate flowing into mixing vessel with oil addition to mixture prior to start of concentration 5 according to an embodiment of the disclosure.

FIG. 49B is a flow system showing express lane and permeate flowing into mixing vessel with fully mixed oil and water during tests between concentrations 3 and 4 (see below) according to an embodiment of the disclosure.

DESCRIPTION

Figure 1A:
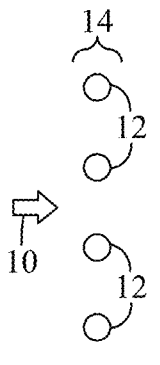
FIGS. 1A-1C are depictions of embodiments of levels of members according to an embodiment of the disclosure.

This disclosure is submitted in furtherance of the constitutional purposes of the U.S. Patent Laws "to promote the progress of science and useful arts" (Article 1, Section 8).

Embodiments of the mesofluidic separation systems of the present disclosure do not cake or depth foul. Implementations of these systems are flow through systems that minimize large void volumes within arrays of members that in combination perform the particle separation. Mesofluidic refers to the systems or devices that operate at industrial scale flowrates (e.g., gallons per hour in contrast to milliliters per hour). In mesofluidic separation small particles weave around arrays of members. In contrast, large particles bump consecutively to one side of members with each row of members offset by a fixed amount that is related through fluidic mechanics to the cutoff between large and small particles. In this manner, small particles simply pass from entrance to exit but large particles migrate toward one side.

At the end of the array, the larger stream of particles can be collected separately from the remainder of the flow. This larger particle stream can be considered a retentate and the remainder of the fluid can be considered the filtrate or permeate, although the disclosed systems and methods are not filters. These systems may perform at feed flowrates of 1-100 gpm enclosed between supports. Substantially higher flowrates are also contemplated.

Fast flowrates in mesofluidic separation systems are important to a variety of industrial applications. One example is nuclear waste processing. For example, radioactive tank waste is slated to be converted into glass in vitrification plants for high level waste (HLW) and low activity waste (LAW). The Hanford Waste Treatment and Immobilization Plant (WTP) Pretreatment Facility (PTF) is designed to separate the waste for the two plants by removing radioactive particles using filtration and the soluble radioactive Cs using ion exchange. The stream devoid of or dilute in particles and Cs is to be processed in the LAW vitrification plant and the remainder is slated for the HLW vitrification plant. Some enhancement in throughput may be gained by arraying mesofluidic separators within the inner diameter of a pipe. In nuclear operations involving the transportation of fissile particles, linear pipe sections are typically limited to three inches or less in diameter to prevent nuclear criticality. Even with increases in cross sectional area relative to the parallel plate systems, exploration at higher flowrates is necessary to evaluate the potential throughput of mesofluidic filtration systems for these applications. Flowrates up to and exceeding 90 gpm can be achieved with a smaller footprint within a pipe three inches in diameter for example.

Another example of the need for fast flowrates in mesofluidic separation systems is in the petroleum industry. The hydraulic fracturing process in the petroleum industry uses about 4.2 million pounds of proppant sand per well. When the pressure is removed for the well (at the end of fracturing) a mixture of drilling muds, petroleum products, hole cuttings, and around a 1 million pounds of proppant sand flow out of the well at a high rate of flow. The mesofluidic separator could be placed in the existing piping structure and would be able to separate the proppant sands from the drilling muds, hole cuttings and a majority of the liquids so they could be used in future well drilling. This would allow much faster turnaround of the proppant sand when compared to the current settling pond approach and would better separate the proppant sand from the drilling muds (clays) and the hole cuttings.

An emerging need for mesofluidic separation is in the recycle of particles for advanced manufacturing and metal 3D printing. The print process may leave very small metal particles and partially agglomerated particles in addition to the desired particles. A two stage mesofluidic separation process may be used with the first stage removing the partially agglomerated particles and the second stage removing the very small metal particles that are less useful. In this manner, a stream of particles of the desired size range may be produced.

Particulate removal from gas streams can employ technologies such as cyclones, granular beds, scrubbers, and fabric filters for a variety of reasons including protection of downstream processes, environmental protection, and worker safety. These technologies all have limitations relating to particle size separation, flowrate, operating temperature and pressures, and maintenance for cleaning filter cake formation or depth fouling. Embodiments of the mesofluidic separators of the present disclosure can be tailored for desired particle size segregation, have minimal pressure drop, and/or require little to no periodic cleaning to return to or maintain original performance. The separators can be configured to partition particles in pneumatic conveyance and/or from fluidized beds.

The assemblies and/or methods of the present disclosure can be used for separation of components and/or phases of mixtures, of liquids, liquids and solids, liquids and cells, liquids and flocculants, solids, and emulsificants, solids and gases, for example. At least some mixtures can be multiphasic, including at least two phases, and in some cases more than two phases. These mixtures can be provided through pneumatic and/or hydraulic conveyance. Example mixtures can include hydrocarbon materials and water. The mixtures can include materials in their condensed phases, such as separation of liquids, separation of liquids and solids, and/or separation of solids. In some implementations, the solids can be particles, molecules (e.g. large molecules), fragments, and/or cells. More particularly, the mixtures can include: sand, oil, sticky particles that agglomerate, salt cake simulant, abrasive polydispersed particles, yield-stress slurry with particles, spheres, silica, oil-water mixture with solid particles (e.g., mineral oils), algae, emulsions.

Figure 1B:
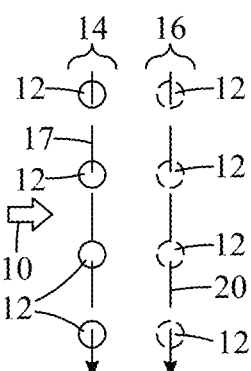
Figure 1C:
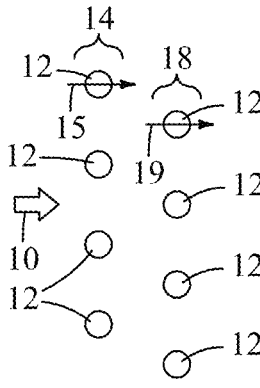

The separator assemblies and methods of the present disclosure will be described with reference to FIGS. 1A-51. Referring first to FIGS. 1A-1C, a portion of a mesofluidic separator assembly is shown in cross sectional view that includes at least a pair of supports, not shown at this point, configured to extend lengthwise and within a pressure differential axis 10. Pressure differential axis 10 is the orientation of fluid direction proceeding to the intake of a separator assembly and then proceeding away via the out-take of a separator assembly. This pressure differential axis can be considered a linear axis for the entirety of the fluid as it typically is conveyed via a conduit and/or through separator assemblies of the present disclosure. The axis may become spiral as fluid progresses between assemblies as supports spiral, but within an assembly the fluid progresses linearly while particles within the fluid can progress non-linearly. The pressure differential axis can be facilitated by allowing fluid to migrate via gravity or by providing a pressure differential either at the front of a conduit or the rear portion of a conduit. Accordingly, a pressure differential can be established by pumping or providing pressure to a head or by withdrawing or providing pressure in the form of a vacuum. The supports can be linear or curved and may take the form of a spiral for example in the form of wire supported members. Further, the supports can be considered the sidewalls of the assembly such as inner sidewalls of a conduit through which the pressure differential axis proceeds. In all instances, the fluids discussed here can include both liquid and gas phase fluid as well as supercritical fluids.

With reference to FIGS. 1A-1B, a plurality of members 12 are shown in cross section. As depicted, the members are substantially circular in cross section. However, other cross sections are contemplated, including planar or even semi-planar, as well as nonsymmetrical cross sections. Further, members can have different diameters in at least one cross section. As shown in most of the examples, the cross sectional diameters are substantially the same, but this is not necessary. Additionally, the members are depicted and shown as straight, however additional embodiments can include curved or bent members. The members and/or supports may be coated with a material as well.

With reference to FIG. 1A, one level of these members can be represented as 14 and with respect to FIG. 1B, a second level of members can be represented as 16. Referring to FIG. 1B, the second level 16 of members can be oriented wherein at least a pair of members are located lateral to one another. Referring to FIG. 1C, another level of members 18 is shown wherein each of the members is not lateral to but juxtaposed to a lateral level of members. Accordingly, the members of another level such as 18 are juxtaposed in relation to alignment with the other level 14. As can be seen in FIGS. 1A-1C, subsequent levels can be spaced apart from other levels, and levels can be located at different points along the pressure differential axis 10. Accordingly, subsequent other levels such as 18 in relation to 14 or 16 in relation to 14 can be distal to the one level. Referring to FIG. 1C, accordingly, each of the members can be arranged along an axis in relation to the pressure differential axis. For example, members within level 14 can be arranged along an axis 15 while members within another level such as level 18 can be arranged along an axis 19. These axes can be different axes in relation to one another. Additionally, the levels can be arranged along axes that are normal to pressure differential axis 10. Accordingly, axes 17 and 20 can be parallel to one another, however, both normal to the pressure differential axis 10. In accordance with example implementations, there can be a plurality of these levels in the separator assembly of the present disclosure.

Figure 2A:
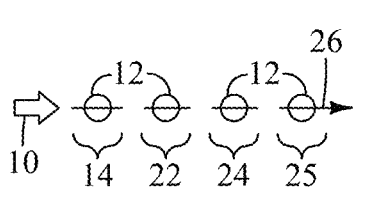
FIGS. 2A-2C are depictions of sets of pluralities of members according to embodiments of the disclosure.
Figure 2B:
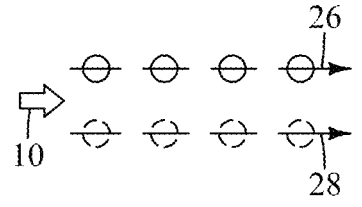
Figure 2C:
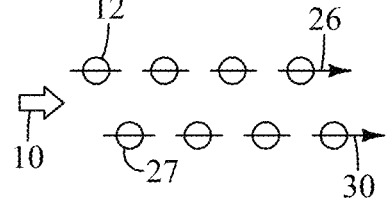

Referring next to FIGS. 2A-2C, a plurality of members 12 can be configured to extend lengthwise substantially normal to a pressure differential axis. Individual ones of these members can define individual levels extending from a first level such as 14 to another level or second level 22 to another level or third level 24 and even another level such as fourth level 25. In accordance with example implementations, first level 14 can be configured to have initial contact with the fluid to be filtered while last level 25 may have final contact with the fluid to be filtered. The number of these levels is not restrained by the numbers depicted here, as a plurality of levels are contemplated. In accordance with example implementations, at least one set of individual members can be aligned along an axis such as axis 26, and this axis can be substantially parallel to the pressure differential axis. Another set of members can be aligned along another axis such as axis 28, and both of these axes may be substantially parallel with the pressure differential axis 10. In accordance with example implementations and with reference to FIG. 2C, the relationship of the members can be juxtaposed in relation to one another as shown in FIG. 2C, wherein one set of members 27 is juxtaposed in relation to the other set of members 12. In accordance with example implementations, one set of these members can reside at an edge of the separator and be exposed to an open portion of the separator assembly.

Figure 3A:
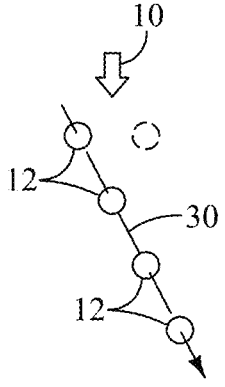
FIGS. 3A-3C depict additional sets of pluralities of members arranged in relation to the pressure differential axis according to embodiments of the disclosure.
Figure 3B:
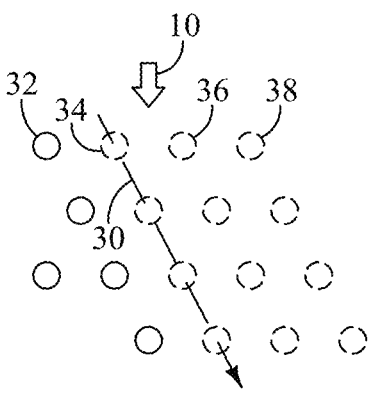
Figure 3C:
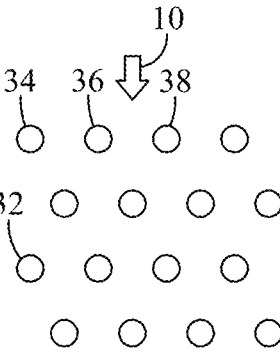

Referring next to FIGS. 3A-3C, portions of separator assemblies are shown with a pressure differential axis 10 in relation to members 12. These members 12 can be aligned along an axis 30 that is neither normal to nor parallel with pressure differential axis 10 as shown. As shown in FIGS. 3B and 3C, there can be additional sets of these members in the separator assembly. These sets are shown as set 32, 34, 36, and 38, each being aligned along an axis that is neither normal to nor parallel with the pressure differential axis. Referring to FIG. 3C, as the members are associated with edges of the separator system, there may be portions of these sets that are removed from the separator assembly. As shown, there is a portion of set 32 that is removed, while sets 34, 36, and 38 remain intact. As can be seen, at least one set of members can be distal to another set of members along the pressure differential axis. In accordance with example implementations and as will be discussed shortly, specific particles can proceed substantially along the non-parallel or normal axis.

Figure 4:
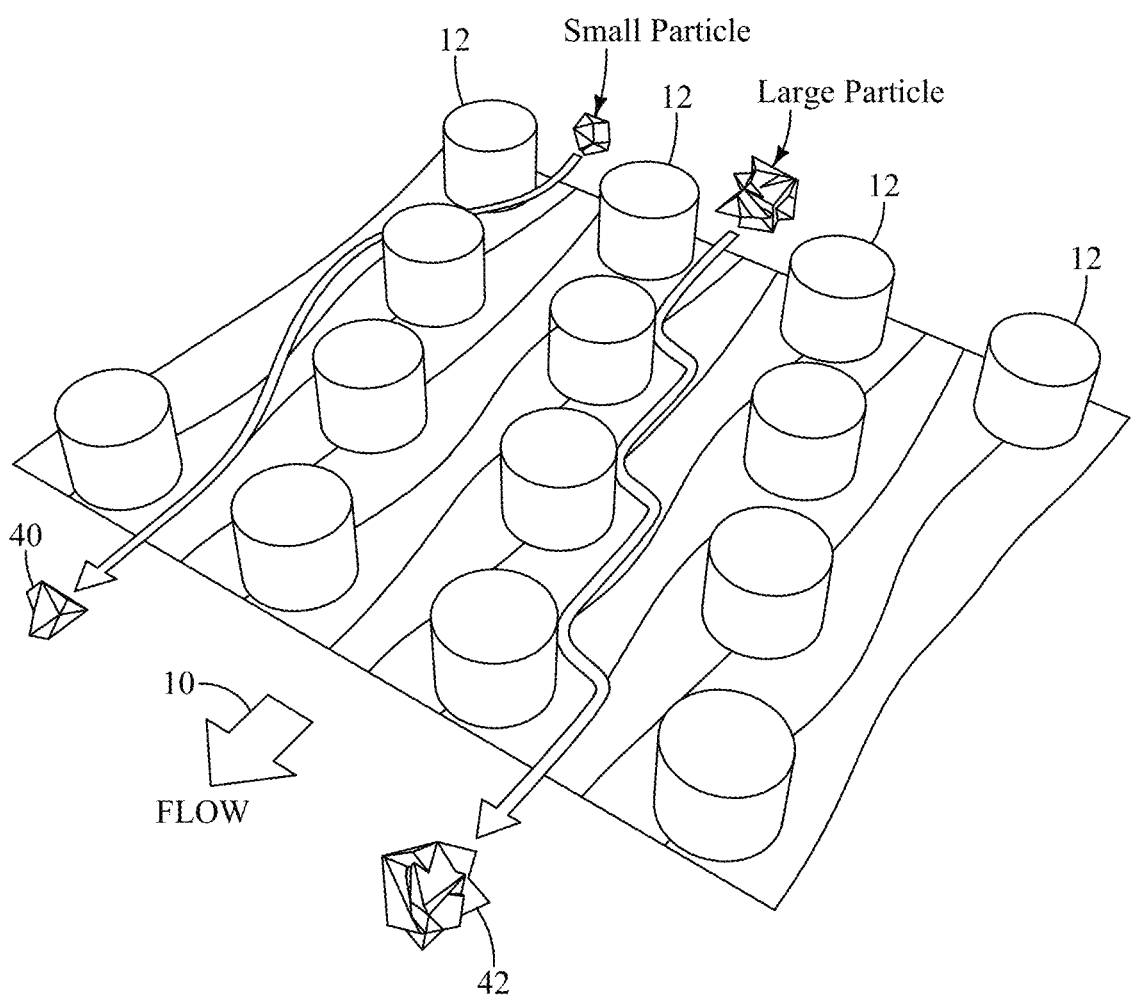
FIG. 4 is a depiction of a separator assembly according to an embodiment of the disclosure.

Referring to FIG. 4, a separator assembly is shown that includes members 12. This separator assembly is shown with a pressure differential axis 10 as well as particles of varying size, with small particle 40 and larger particle 42. As can be seen, small particle 40 proceeds along a path that is substantially linear to the pressure differential axis path, while the large particle 42 migrates in a non-linear path as it proceeds through the separator assembly. To facilitate a desired particle separation, the orientation of the members in relation to one another can be manipulated to provide a size exclusion separation that can range from >600 μm down to <10 μm as desirable. Referring to FIG. 5, for example, pin-to-pin distance; pin offset, and/or row-to-row distance can be manipulated to achieve a desired particle separation.

Figure 6:
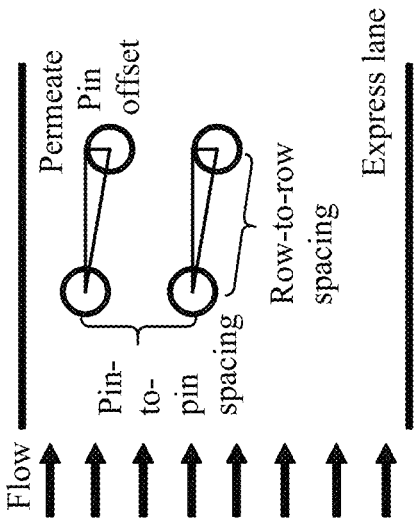
FIG. 6 is an array configuration according to an embodiment of the disclosure.
Figure 8A:
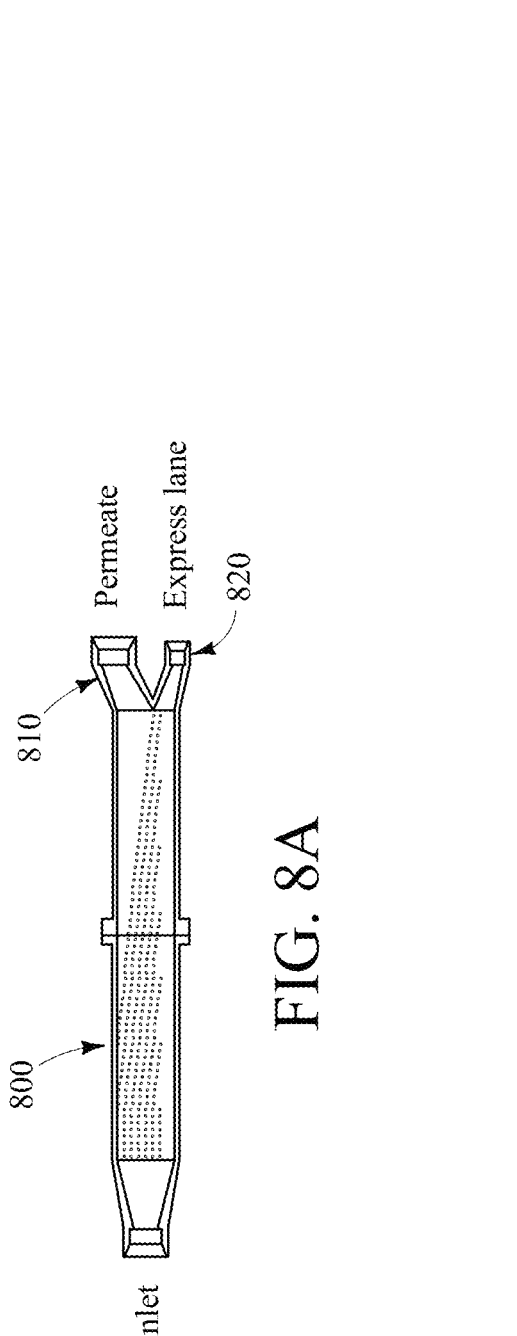
FIG. 8A is a cross section of a non-Newtonian mesofluidic separation assembly according to an embodiment of the disclosure.
Figure 8B:
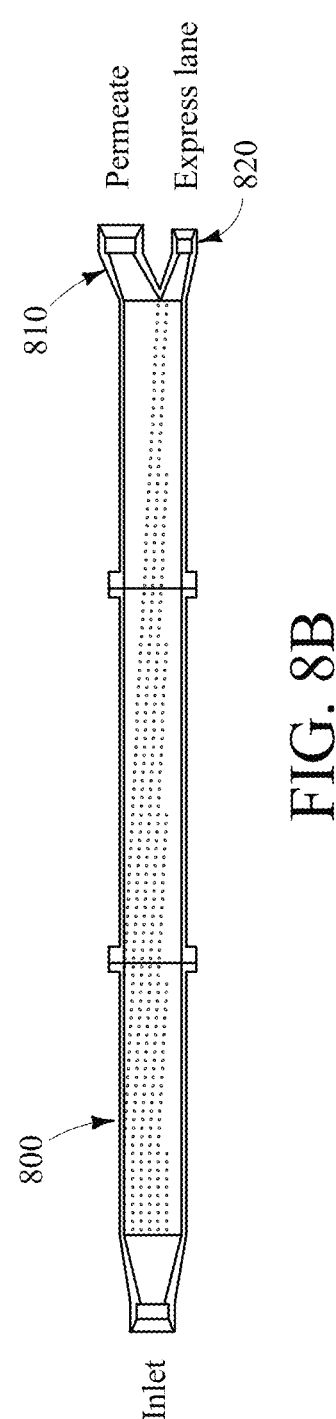
FIG. 8B is a cross section of a non-Newtonian mesofluidic separation according to an embodiment of the disclosure.

In accordance with at least one example, two configurations of mesofluidic separator assemblies 800 are provided: a 10 pin repeat and a 20 pin repeat each with tapered pin arrays. The pin configurations of these separators are shown in FIG. 6 and FIGS. 8A-8B. The two repeat configurations differ in the center-to-center distance and the offset (see Table 1 below) but were designed to have approximately the same large particle cutoff. Immediately before the diagonally arranged pins, several rows of pins were provided to minimize entrance effects. The pin array configuration can be tapered, meaning that pins were not printed in part of the permeate lane 810 to reduce pressure drop through the mesofluidic device. This taper is visible as the triangular area without pins shown at the upper right side of each device. Large particle depleted slurry can exit via the permeate outlet and solids laden slurry can exit via the express lane 820 outlet. The pin diameter selected was 1.2 mm. The array dimensions are listed in Table 1.

TABLE 1

| ARRAY DIMENSIONS | | |
| --- | --- | --- |
| Repeat | 10 Pin | 20 Pin |
| Pin diameter | 1.2 mm | 1.2 mm |
| Center-to-center | 2.86 mm | 3.60 mm |
| Offset | 287 mm | 180 mm |
| Pins in first row | 6.5 | 5.5 |
| Width | 22.5 mm | 22.5 mm |
| Height | 10.0 mm | 10.0 mm |
| Pin section | 191.9 mm | 393.2 mm |
| Pin section not angled | 18.4 mm | 33.6 mm |
| Entrance | 7 rows | 10 rows |
| Overall length | 268 mm | 470 mm |

The slurry simulant was based on a non-Newtonian carrier fluid composed of Kaolin and Bentonite clay powder (particle diameter <30 μm) with composition listed in Table 2 with the addition of glass beads listed in Table 3. The Kaolin and Bentonite carrier fluid was mixed several weeks before testing to equilibrate; the Kaolin and Bentonite powders are fine and do not separate after equilibration. The slurry simulant contained trace amounts of three sizes of glass beads to evaluate the ability of the tapered mesofluidic separator to separate the beads from the non-Newtonian carrier fluid as a function of flow conditions.

The glass beads can be sieved as shown in Table 3. These beads can be considered solids in contrast to the Kaolin and Bentonite clay that is not included in the term solids for present purposes. Prior to testing the Kaolin-Bentonite fluid can be added to the mix tank and circulated through the system using the pump. After the fluid is considered well circulated, the glass beads can be added to the mix tank, and the slurry circulated through the system using the pump to fully incorporate and mix the beads into the carrier fluid.

TABLE 2

| NON-NEWTONIAN CARRIER FLUID COMPONENTS | |
| --- | --- |
| Component | Wt % |
| Water | 64.8 |
| Kaolin [a] | 28.0 |
| Bentonite [b] | 7.1 |
| Salt | 0.1 |

[a] EPK Feldspar Pulverized, Feldspar Corporation, Atlanta, Georgia
[b] WYO-Ben Big Horn CH-200, Wyo-Ben, Inc., Billings, Montana

TABLE 3

| GLASS BEADS | | | |
| --- | --- | --- | --- |
| Bead Type Units | Upper Bound μm | Lower Bound μm | Quantity g |
| Black Soda Lime (a) | 710 | 630 | 96 |
| Green Ceroglass (b) | 600 | 500 | 59 |
| Clear Sigma glass beads | 500 | 420 | 40 |
| Acid Washed(c) | | | |

Figure 7:
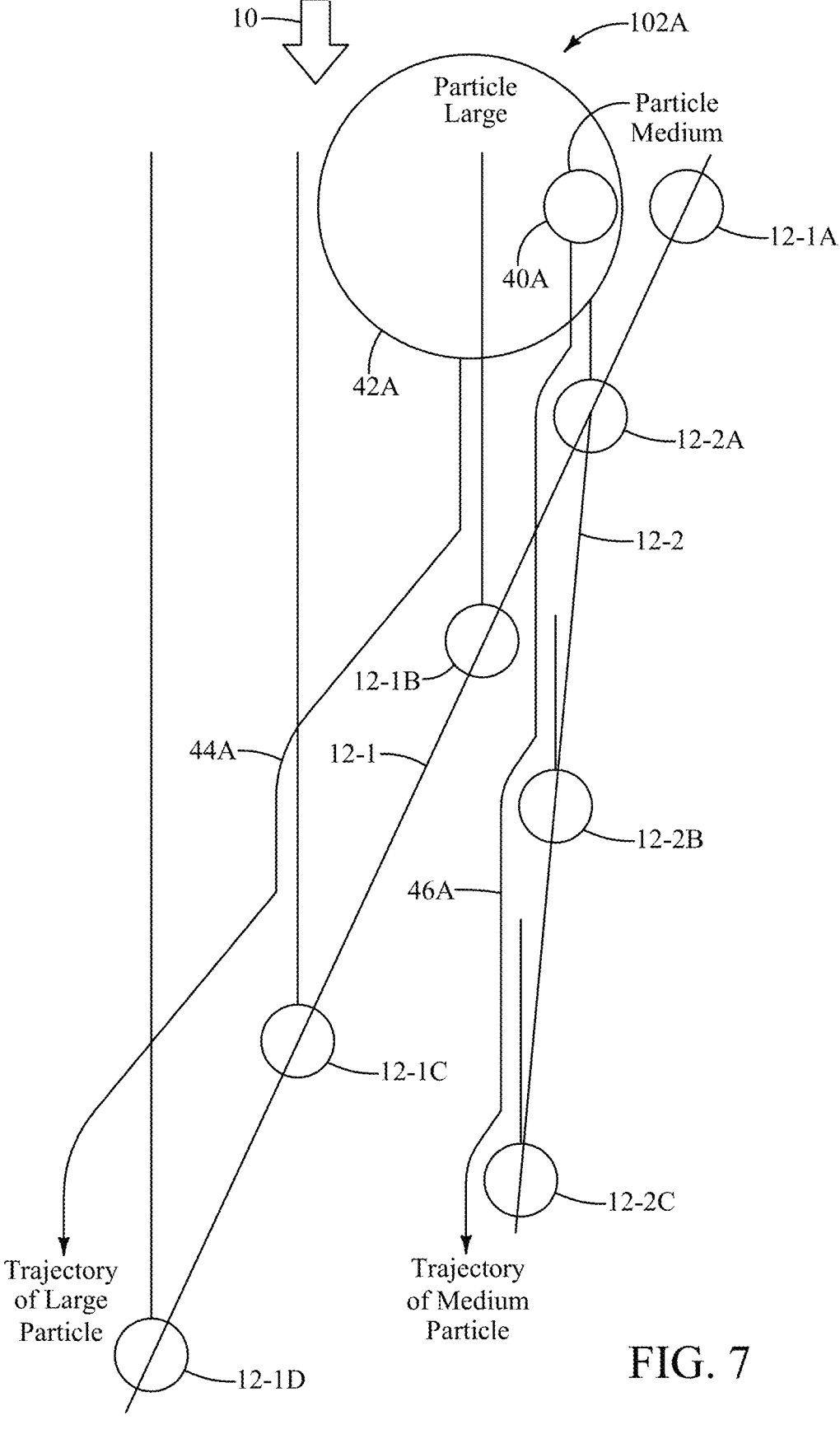
FIG. 7 is another depiction of another relationship of members within a separator assembly according to an embodiment of the disclosure.

[a] XL Sci-Tech, Inc., Richland, Washington
[b] Ceroglass Technologies Inc., Columbia, Tennessee
[c] Sigma-Aldrich No. G8772, Saint Louis, Missouri Referring to FIG. 7, another depiction of another relationship of members 12-1A to 12-2C within a separator assembly is shown. As can be seen, members 12-1A to 12-1D can be aligned along one axis 12-1 and members 12-2A to 12-2C can be aligned along another axis 12-2. As shown, these axes are not parallel with an angle of departure from pressure differential axis 10 being greater for axis 12-1 than axis 12-2. Accordingly, particle 40A can proceed along members 12-1A and 12-1B but along members 12-2A to 12-2C along path 46A. Particle 42A can proceed along trajectory 44A without proceeding between members 12-1A to 12-1D. Accordingly, the members need not be aligned in levels normal to the axis 10.

Figure 9:
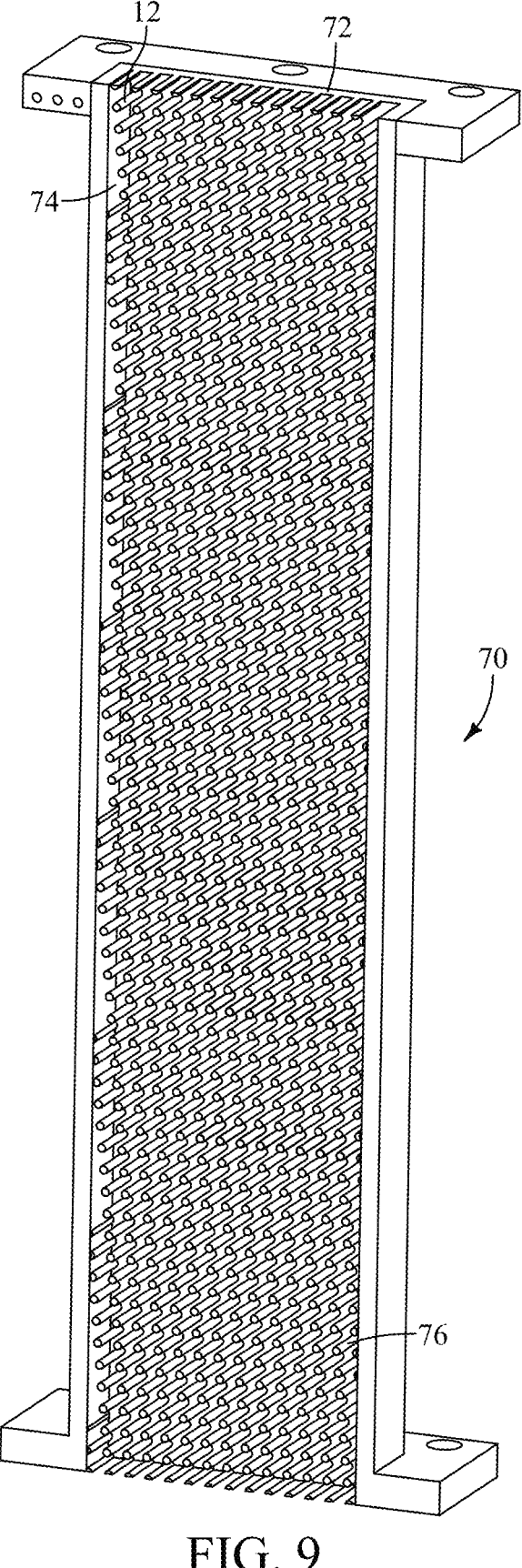
FIG. 9 is a separator assembly according to an embodiment of the disclosure.

Referring to FIG. 9, a separator assembly 70 is shown that includes a plurality of members extending from support member 72 with opposing support member not shown, to demonstrate a cross sectional of separator assembly 70. As can be seen, because of the juxtaposition of the levels and/or the sets of members 12, there are slight openings 74 along one side of assembly 70, while there are no openings along the other side 76 of assembly 70. Accordingly, as fluid with particles migrates through assembly 70, the larger particles will migrate toward the side without openings, while the small particles will not migrate relative to the side with openings.

Figure 10A:
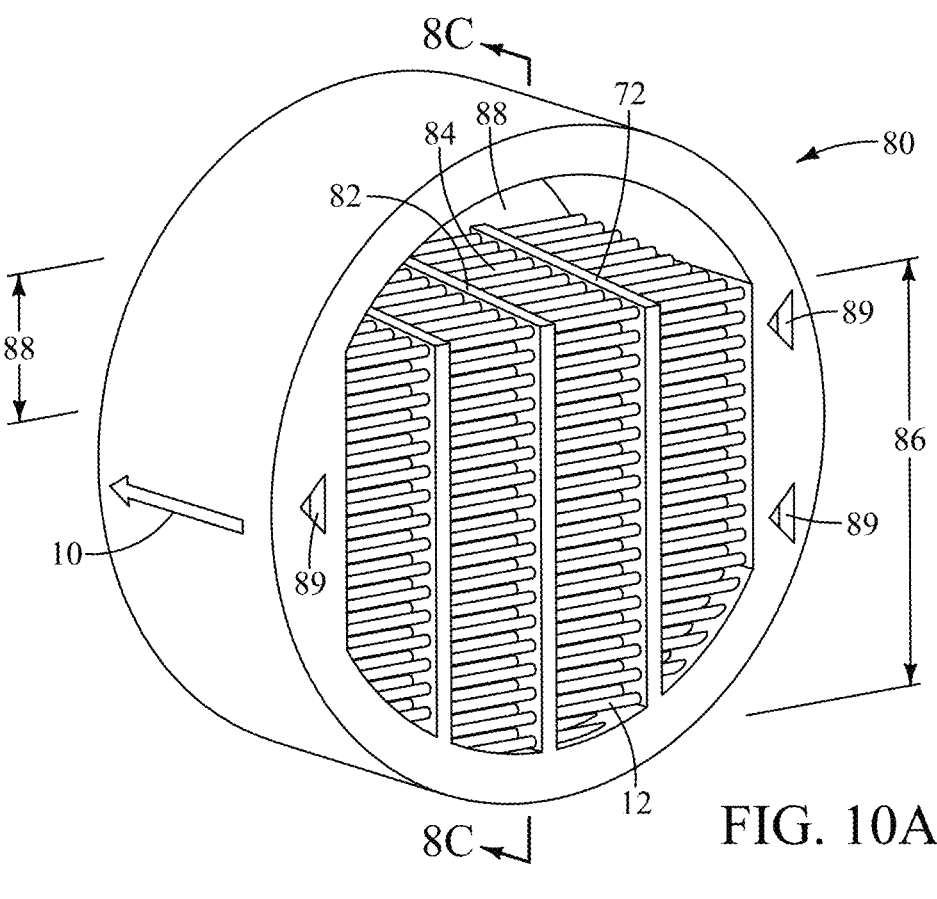
FIGS. 10A-10C are depictions of a separator assembly according to an embodiment of the disclosure and a cross section of same.
Figure 10B:
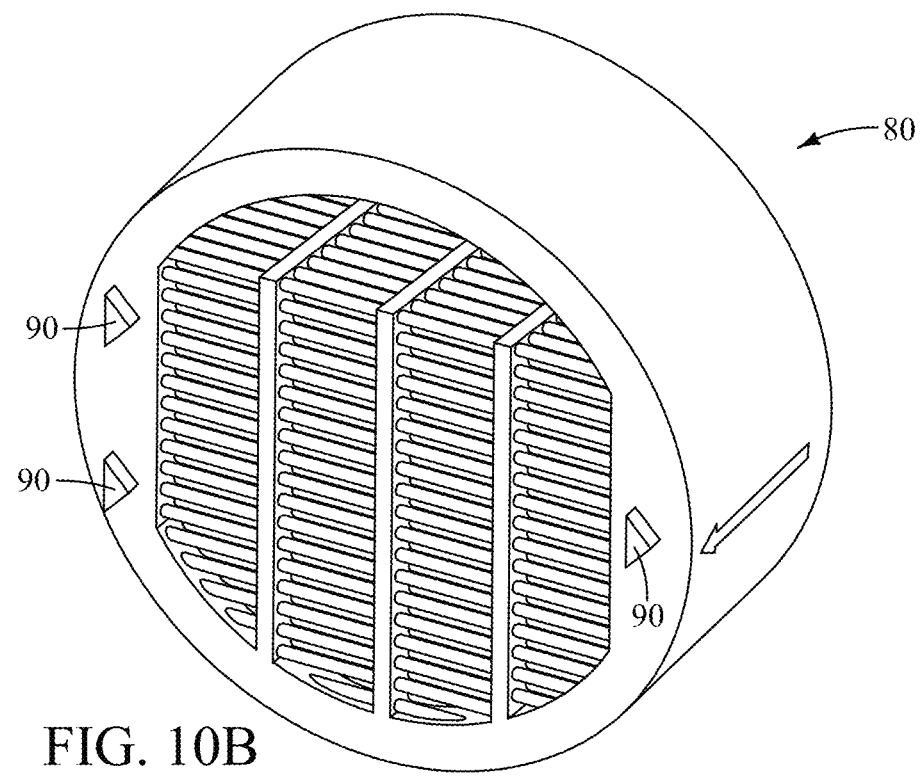
Figure 10C:
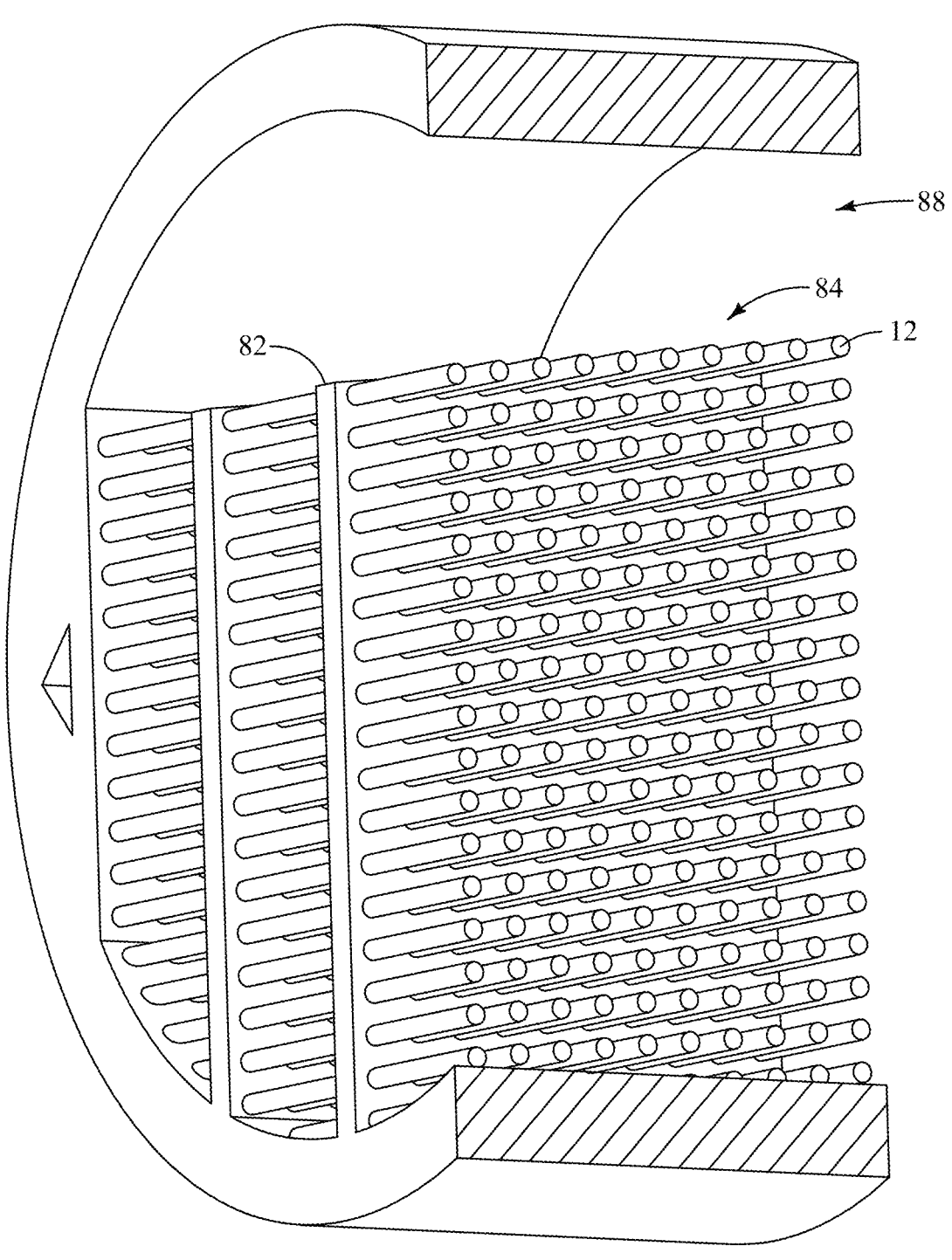

Referring next to FIGS. 10A-10C, an embodiment of a separator assembly is shown in two views and a cross section of same. Referring first to FIG. 10A, separator assembly 80 can include a plurality of members arranged between supports 72 and 82 that represent a channel 84 of separator assembly 80. Accordingly and as shown, separator assembly 80 can include a plurality of channels; as shown in this embodiment, four channels. The cross section of members 12 within these channels can be configured as shown in FIGS. 1A-3C. In accordance with example implementations, separator assembly 80 can be aligned along a pressure differential axis 10, and the separator assembly can occupy a portion 86 of assembly 80 while leaving another portion 88 open for fluid flow. This open portion can be considered an express way or lane and allow for fluid entering the assembly to pass along the pressure differential axis unencumbered. However, the members of the separator assembly, as well as the channels, are in fluid communication with the express way allowing for larger particles to migrate out of the channels and into the express way. In some embodiments a partial physical barrier is contemplated to permit some but not complete fluid communication. While shown and described along one side of the assembly this lane or way can be on multiple sides and/or located through a more center portion of the assembly. Additionally, multiple express ways can be provided.

Referring next to FIG. 10B, assembly 80 can include coupling projections configured to allow for the aligned coupling of the separator to additional separators as a modular separator assembly, and these are shown as projections 90 and complimentary recesses 89. Other types of projections and/or coupling mechanisms and alignment mechanisms are contemplated. The leading edge of set of separators can be angled or smoothed rather than blunt. Accordingly, pressure drop can be minimized.

Referring next to FIGS. 11A-11B, another separator assembly or configuration within a conduit is shown as assembly 81. As shown, members 84 are aligned about open portion 88. Accordingly, members 84 can be configured to provide particle size separation with the larger particles proceeding to within portion 88 and smaller particles proceeding along the pressure differential axis. Members 84 can be supported by supports 72 for example. Accordingly, a conduit or assembly may have multiple open portions or expressways. Each of the expressways can be in fluid communication with a conduit separate from another conduit in fluid communication with the pressure differential axis along the members thereby providing for separation of large from small particles within the fluid.

Referring next to FIG. 12, a depiction of another assembly or configuration 83 is shown that includes members 84 arranged as bent or curved elongated members 84. In accordance with this embodiment, multiple sections can be provided as bracketed by supports 72. The sections may have the same or different size exclusion characteristics. Accordingly, particles of larger size are provided to a central open portion 88 while the sections are in fluid communication with the same or different conduits as desired to accumulate particles of a known size limitation. Supports for this embodiment, for example, can be configured to spiral. Accordingly, supports can spiral along the pressure differential axis from the opening to the exit of the separation assembly.

Figure 13:
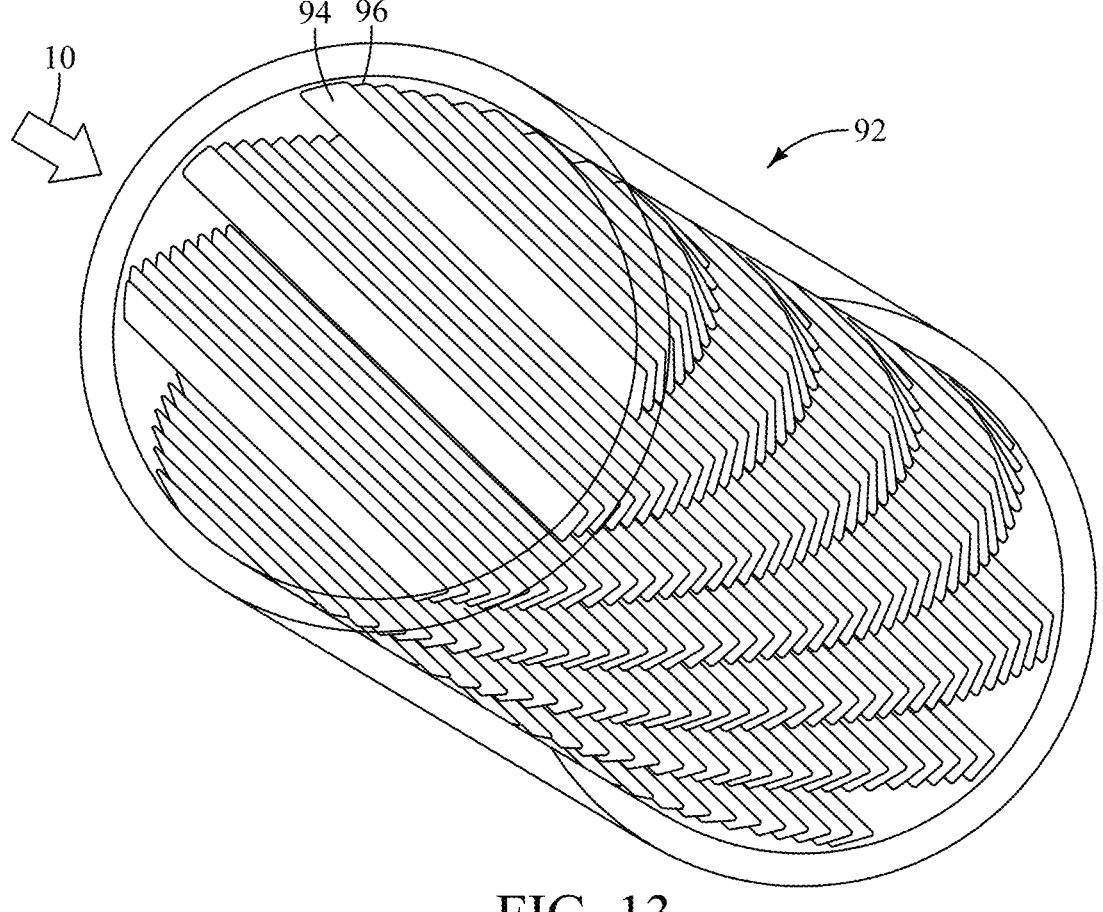
FIG. 13 is a depiction of a separator assembly according to an embodiment of the disclosure.

Referring next to FIG. 13, in accordance with another embodiment of the disclosure, separator assembly 92 is shown with supporting members 94 and 96 oriented in an anti-normal orientation to pressure differential axis 10. In this configuration supporting members 94 and 96 are arranged neither parallel nor normal to pressure differential axis 10.

Figure 14:
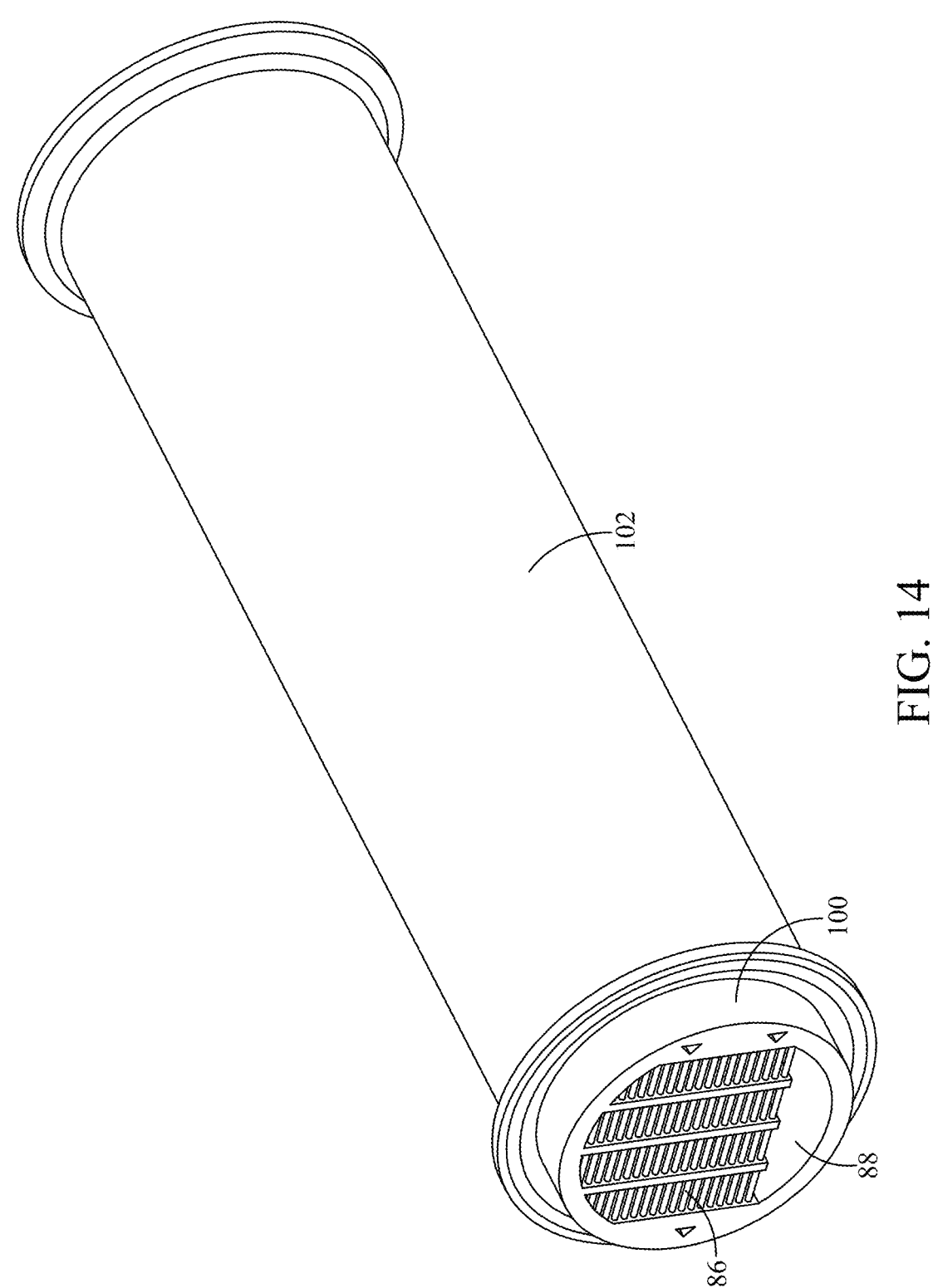
FIG. 14 is a depiction of a separator assembly according to an embodiment of the disclosure.

Referring next to FIG. 14, separator assembly 100 can be oriented within conduit 102. As shown in this configuration, the open cross sectional portion 88 of assembly 100 is arranged operationally in relation to members and channels of separator assembly 86. Open portion 88 of separator assembly 100 can be oriented in a gravitationally lower position in relation to separator assembly portion 86, for example, however, this orientation of the open portion in relation to the members can be lateral, above, and/or central. According to example implementations, assembly 100 can be referred to as a module. This module may be inserted either alone or in combination with other modules within a conduit such as a pipe within a processing facility. In accordance with example implementations, the alignment of the modules can proceed about a bend or curve. Accordingly, a multiple channel bend is contemplated so that partially separated particles may migrate from one module to the next without losing its alignment.

Figure 15:
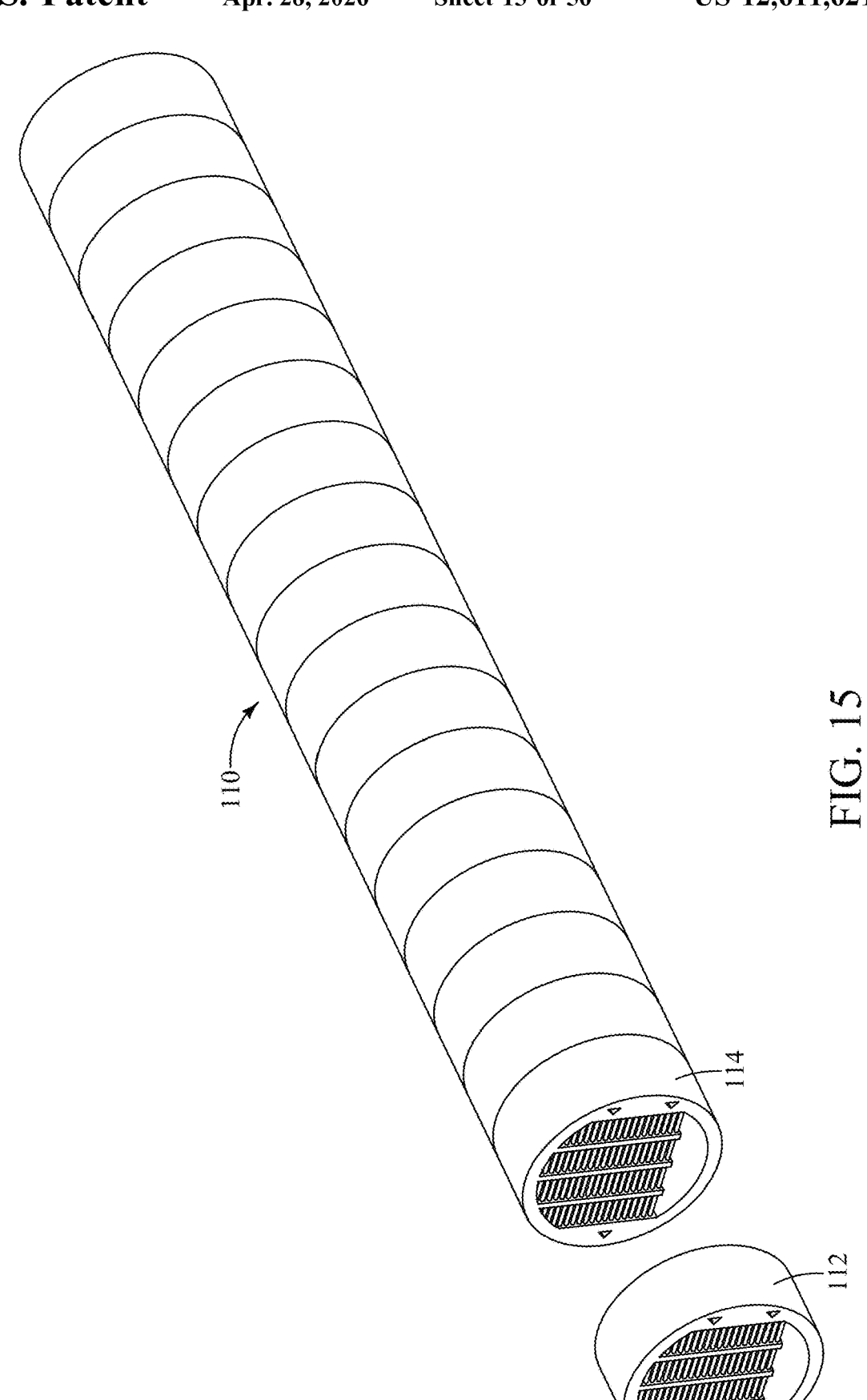
FIG. 15 is a separator assembly according to an embodiment of the disclosure.

Referring next to FIG. 15, separator assembly 110 is shown in a modular configuration that includes at least a plurality of modules 112 and 114. These modules may be configured to separate sizes along the same size separation configuration, or they may be configured to separate particles according to different size exclusion parameters. For example, as the modules are distal from one another along the pressure differential axis, the distal module may have a size exclusion for particle size that is smaller than the size exclusion based on particle size of the previous module in assembly 110. In accordance with additional embodiments, the separation array of modules may be combined with entrance and exit manifolds so that multiple separations take place in one larger cross section. In other embodiments, individual modules within an array may be operatively aligned with outlets intermediate to the final outlets, thereby allowing for the separation along multiple size parameters. This embodiment can provide for the selection of particles of an intermediate size. For example, one size is separated out with the first module or array. A second module or array separates particles of a second size thereby providing for the separation of multiple sizes.

Figure 16:
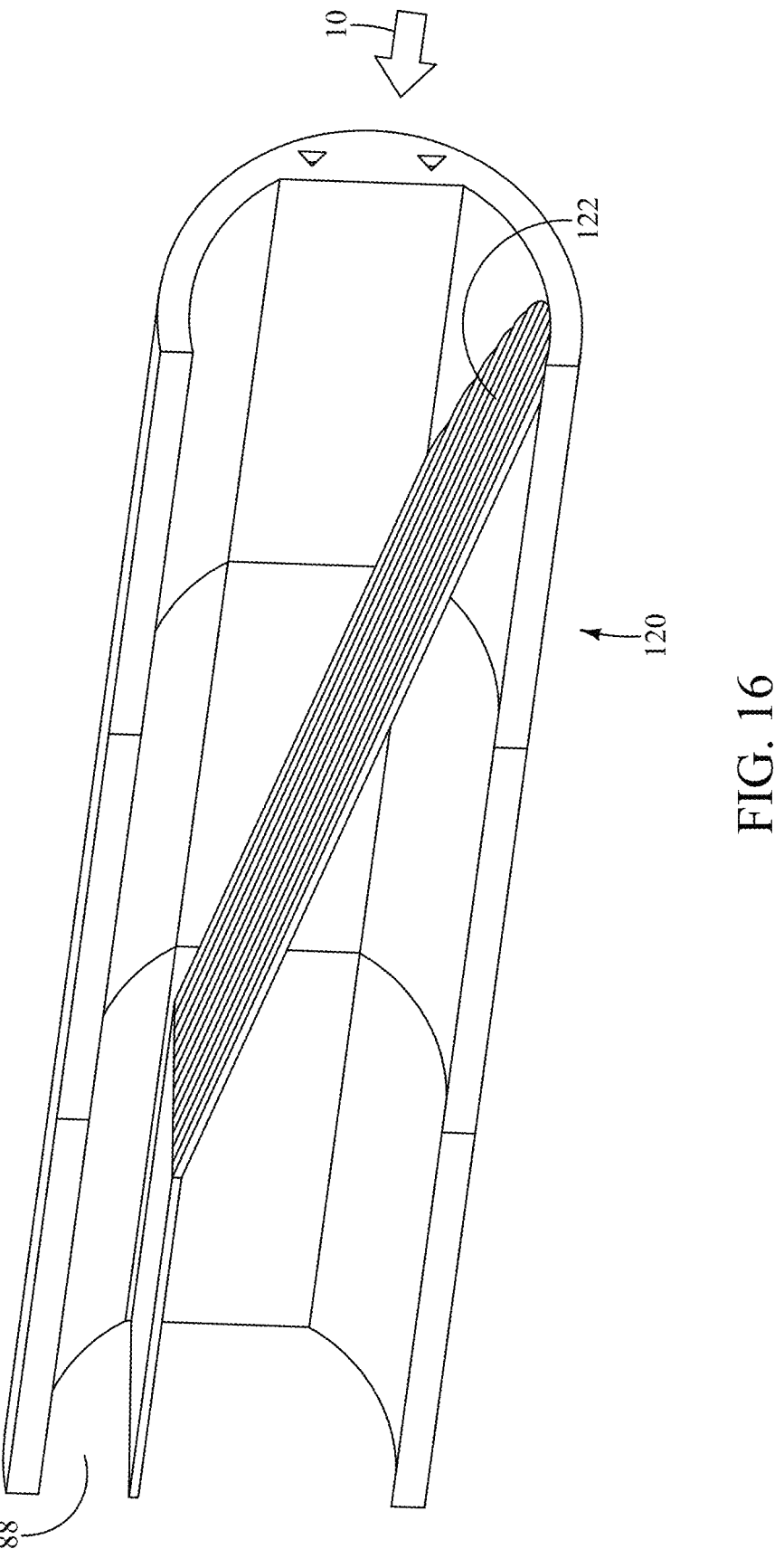
FIG. 16 is a portion of a separator assembly according to an embodiment of the disclosure.

Referring next to FIG. 16, a portion of a separator assembly 120 is shown that includes a cross sectional area 88. In this configuration, a separation screen 122 can be utilized to facilitate the flow of larger particles into opening 88 while allowing smaller particles to proceed towards subsequent or distal separator assemblies. As shown here, the screen is arranged as a series of slats; however, other arrangements are contemplated, for example, a mesh. Further, screen 122 is arranged at an angle rather than normal to axis 10. This can facilitate flow by reducing the number of the largest particles (those particles with a diameter larger than the spacing between the first row of members) that are presented to the first row of members.

Figures 17A, 17B:
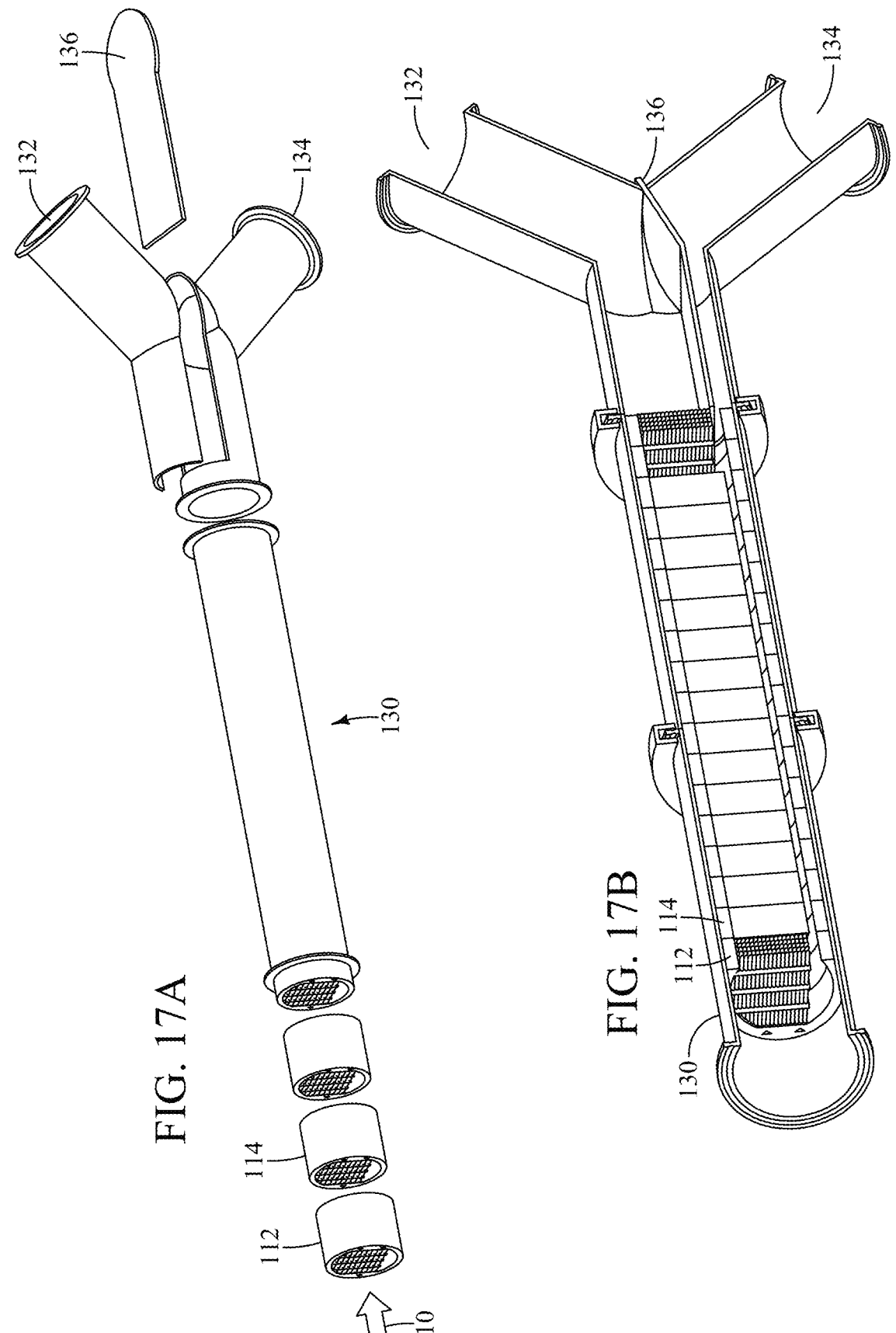
FIGS. 17A and 17B are separator assemblies according to an embodiment of the disclosure and a cross sectional view of same.

Referring next to FIGS. 17A and 17B, an additional separator assembly 130 according to an embodiment of the disclosure is provided that includes multiple modules 112 and 114, for example, operatively configured in relation to pressure differential axis 10. Assembly 130 can include two outlets, 132 and 134. Outlet 132 can be configured to receive fluid that includes mostly small particles, and outlet 134 can be configured to receive fluid that includes mostly large particles. In between these two outlets can be a divider 136 that prevents the backflow of large particles into the separator assemblies or through outlet 132.

Figures 18A, 18B:
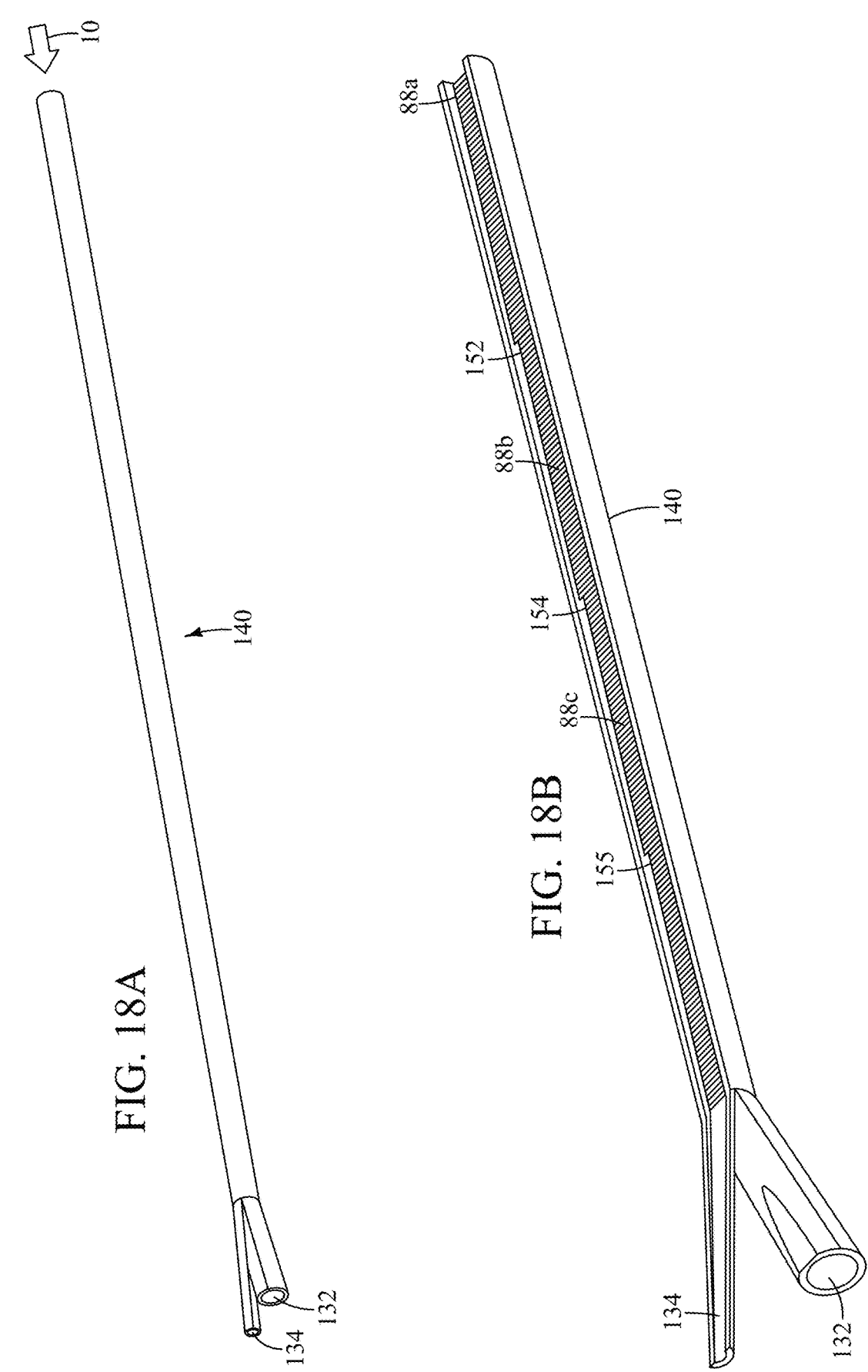
FIGS. 18A and 18B are a depiction of a separator assembly according to an embodiment of the disclosure and a cross sectional view of same.

Referring next to FIG. 18A, in accordance with another example implementation, assembly 140 can be configured to receive fluid including particles of different sizes, and provide that fluid to outlets 132 and 134 that are configured as previously described with reference to FIGS. 17A and 17B.

Figure 19:
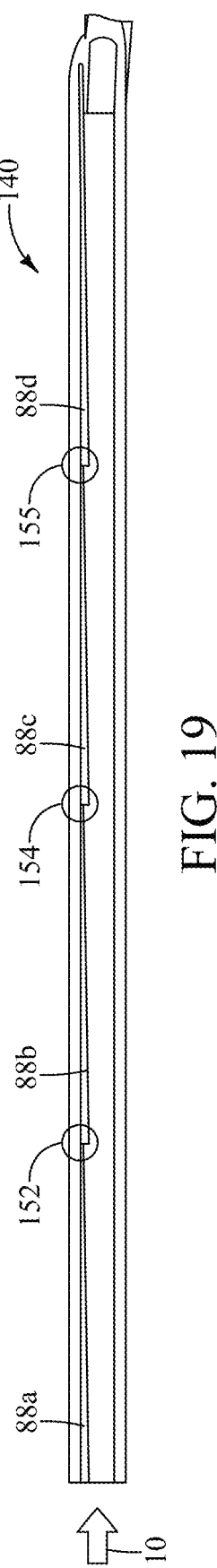
FIG. 19 is a cross section of a separator assembly according to an embodiment of the disclosure.

Referring next to FIGS. 18B and 19, another depiction of the assembly 140 of FIG. 18A is shown. Separator assembly 140 is provided that is configured to receive fluid containing at least two different size particles along a pressure differential axis 10. As the cross section of FIGS. 18B and 19 depicts, separator assemblies can be arranged in series with each separator assembly providing for the separation of different sized particles. Accordingly, the interface 152, 154, and 155 of these different modules can provide for larger cross sectional areas 88a, 88b, 88c, and 88d. For example, each of these successive areas can be larger than the preceding areas.

Figure 20:
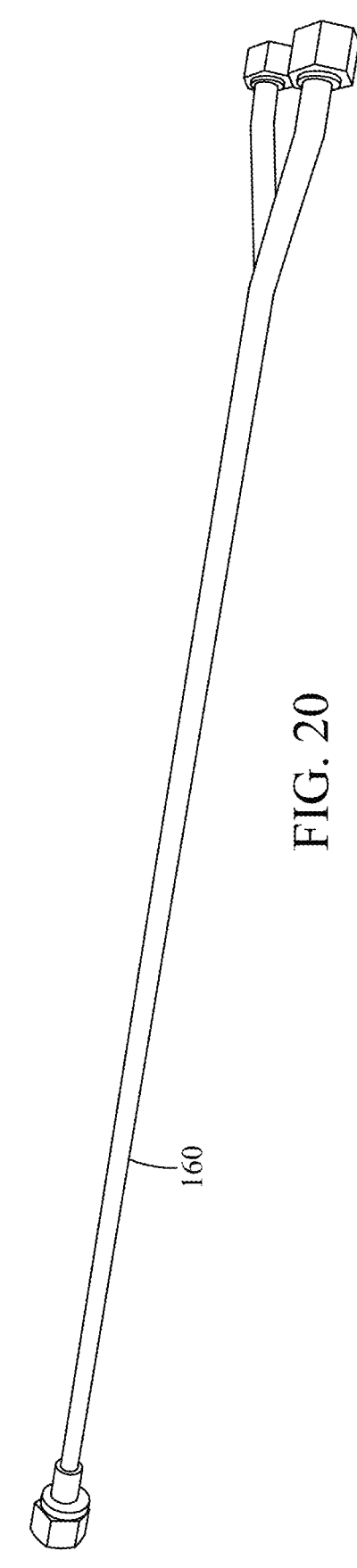
FIG. 20 is a separator assembly according to an embodiment of the disclosure.

Referring next to FIG. 20, an assembly 160 is shown, with end view of assembly 160 shown as FIG. 21B and cross sectional view of 160 shown as FIG. 21A. Accordingly, there can be an open cross sectional area 88 and a separator assembly 86 as shown in FIGS. 21B and 21A. Separator assembly 86 is shown in relation to open cross sectional area 88.

Referring next to FIG. 22, assembly 180 is provided with modules 112, 114 and 116 arranged along the pressure differential axis 10. Accordingly, assembly 180 can include a pre-separator 122 as well as a stepped configuration 152 and 154 which can provide for larger cross sectional area openings 88A, 88B, and 88C. Separator assembly 180 can include an outlet 134 configured to convey particles of the smaller size exiting the assembly, while another outlet 132 is provided to convey particles of a larger size than those exiting at outlet 134.

Figure 23:
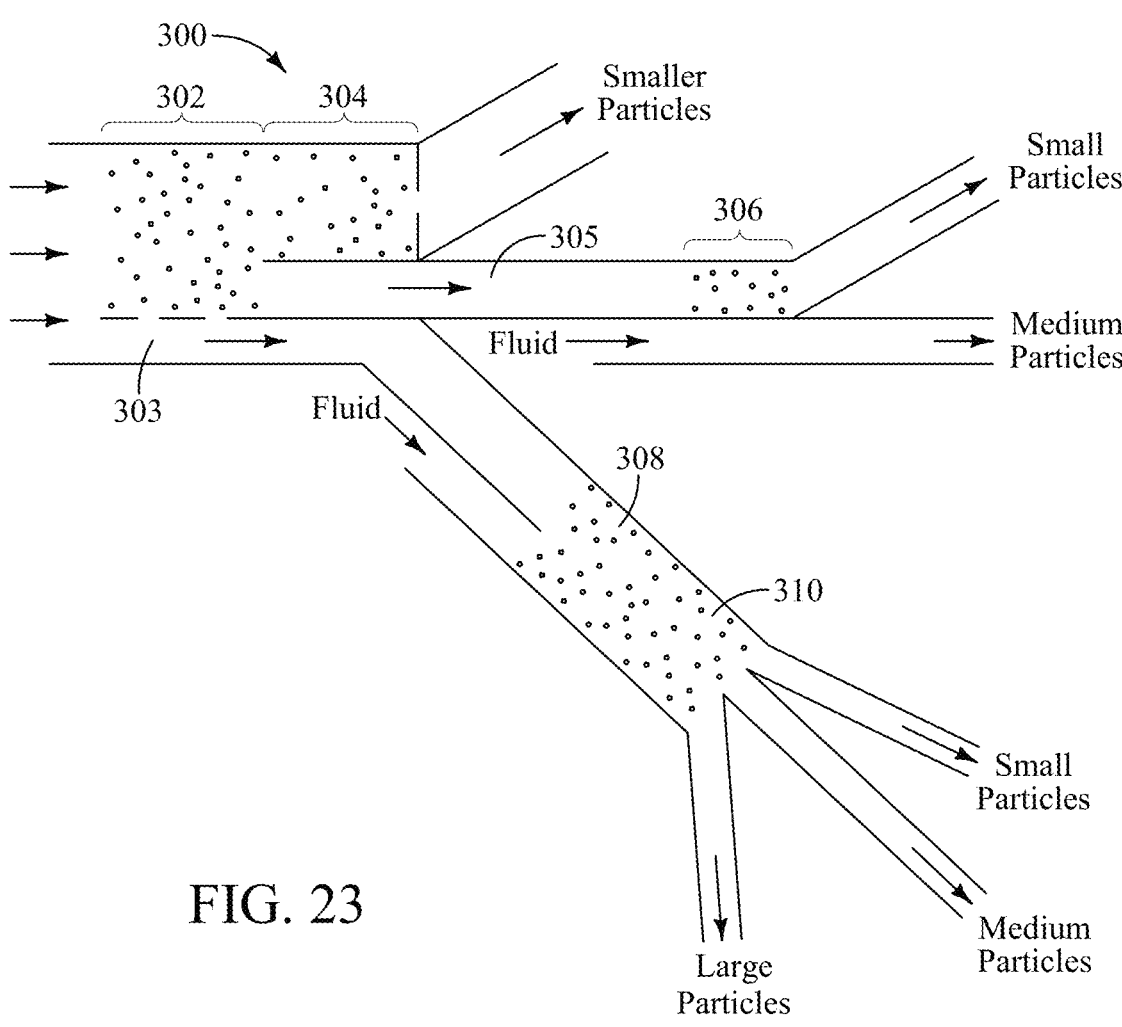
FIG. 23 is a depiction of another separator assembly according to an embodiment of the disclosure.

Referring next to FIG. 23, a system 300 is depicted that can include multiple modules arranged in relation to multiple fluid intakes as well as multiple open portions or express ways. For example, module 302 can include members operatively arranged in relation to an open portion 303. Accordingly, particles of a larger size are transferred to and along portion 303 while smaller particles flow to module 304 which includes members arranged operatively in relation to open portion 305. In some embodiments, particles of a smaller size than the larger particles transferred along portion 303 are separated even further into small and medium sizes with the medium and small particles migrating along open portion 305 and the small particles conveyed to a conduit. Further separation of small and medium particles can be accomplished in module 306. Additionally, the large, medium, and small particles can be conveyed from portion 303 to additional modules 308 and 310 operatively configured and/or arranged in fluid communication with conduits of separated small, medium, and large particles. Recycle of streams may be contemplated. For example, 305 may be configured to recycle to the entrance instead of or in complement to downstream separation.

Figure 24:
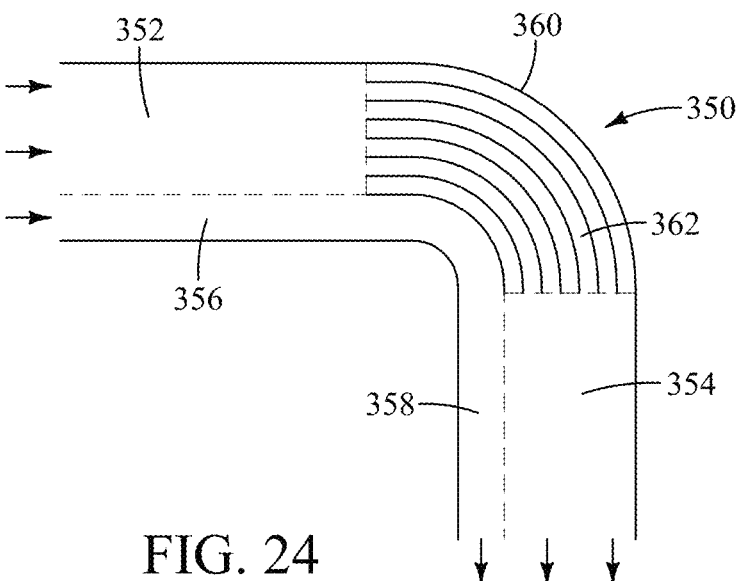
FIG. 24 is a depiction of a separator assembly according to an embodiment of the disclosure.
Figure 25:
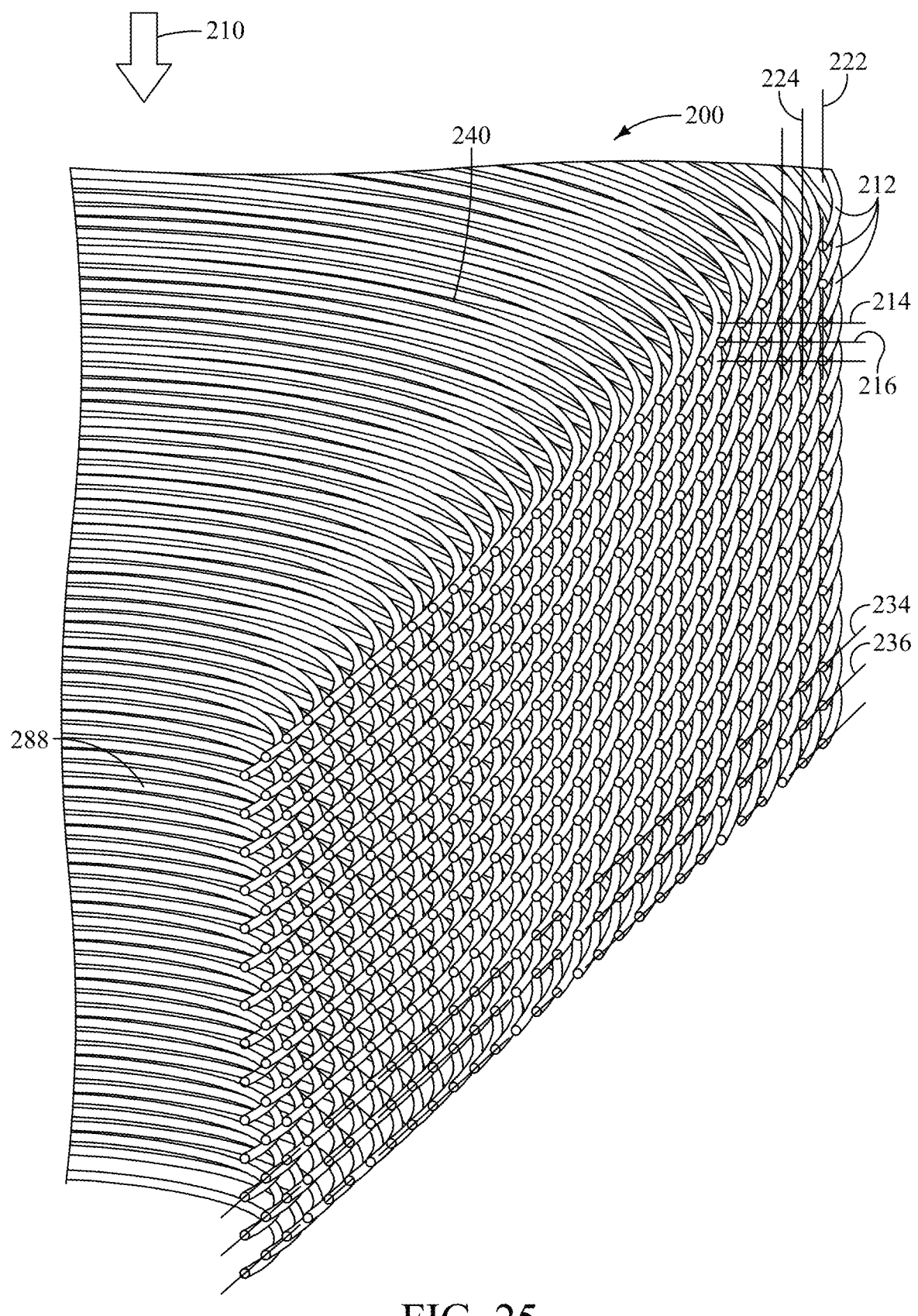
FIG. 25 is a perspective view of a portion of a separator assembly according to an embodiment of the disclosure.
Figures 26, 27:
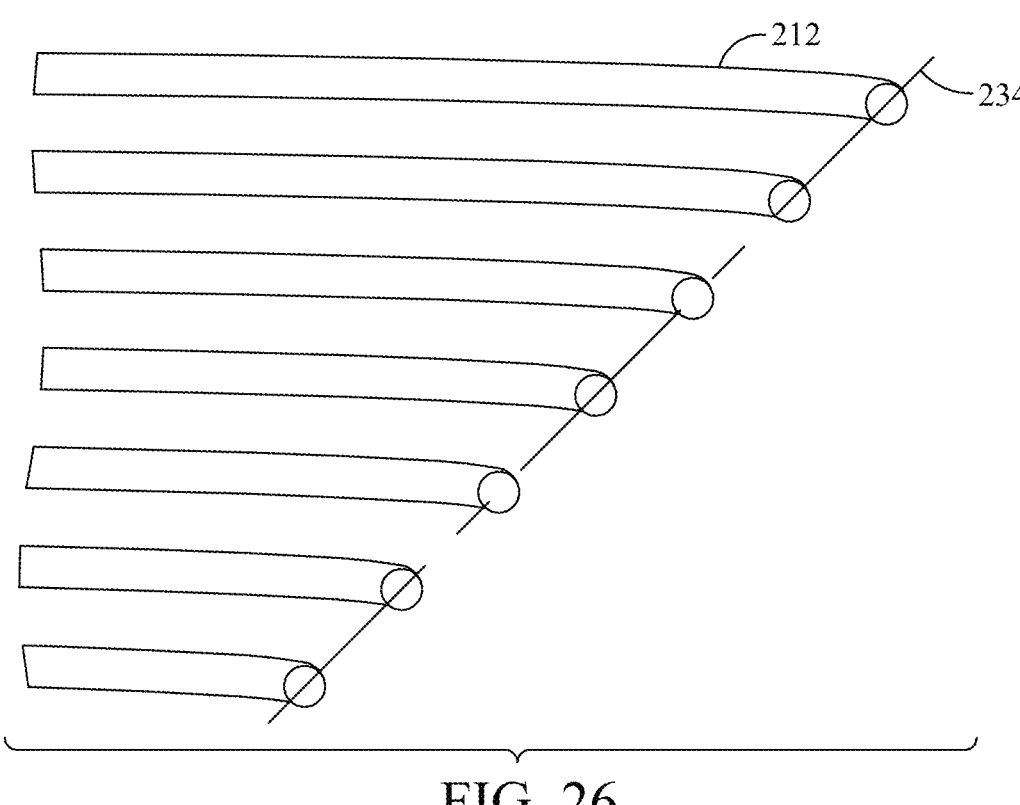
FIG. 26 is a portion of a cross sectional view of the separator assembly of FIG. 23.
FIG. 27 is a portion of the separator assembly of FIG. 23 according to an embodiment of the disclosure.
Figure 28:
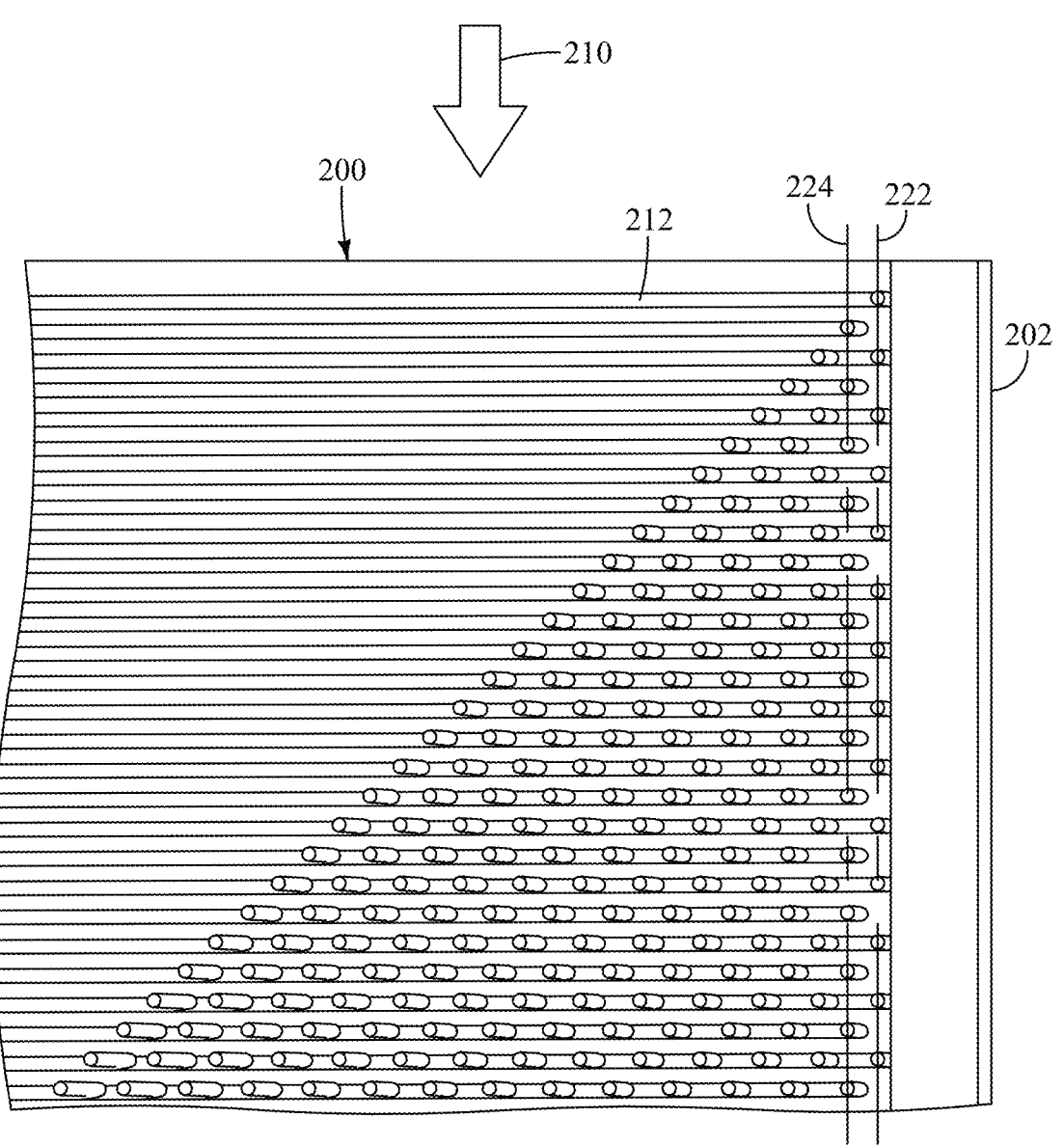
FIG. 28 is a portion of a cross sectional portion of the separator assembly of FIG. 23 according to an embodiment of the disclosure.
Figure 29:
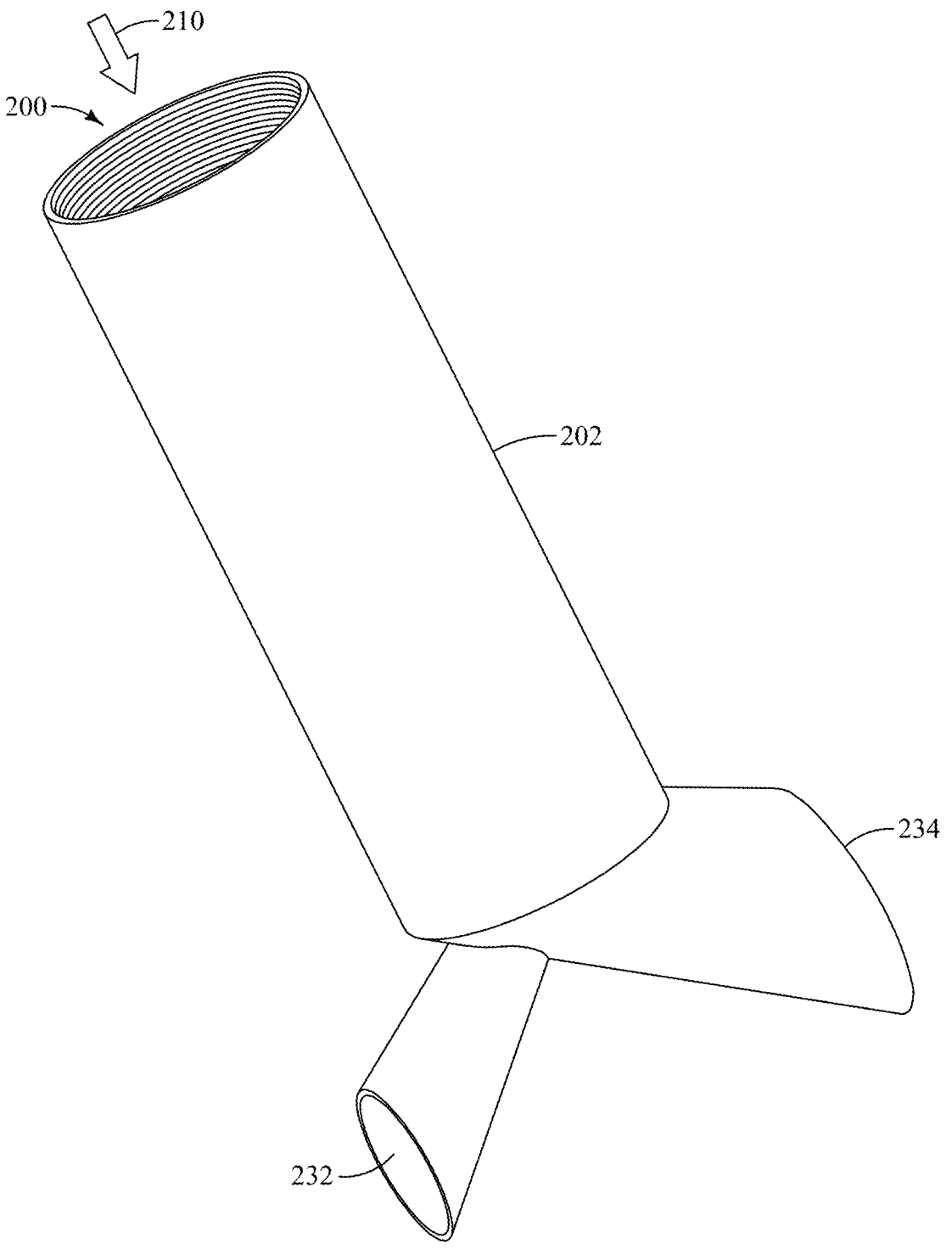
FIG. 29 is the separator assembly of FIG. 23 according to an embodiment of the disclosure.

Referring next to FIG. 24, modules 352 and 354 are shown on both sides of a curved conduit 350. As can be seen, multiple channels 362 exist around a curved portion 360 of the conduit. These channels are aligned with membered portions of the modules while the open portions 356 and 358 remain in fluid communication. While multiple channels are shown, additional embodiments can include a pair of channels, with one channel maintaining fluid communication between the open portions and the other channel maintaining fluid communication between the membered portions.

Referring next to FIGS. 25-29 separator assembly 200 is shown. Assembly 200 can include a plurality of members 212. As shown these members are not linear but are arranged to be normal in relation to the pressure differential axis 210. Accordingly, members 212 can be arranged in levels 214 and 216, for example, with each level increasing in the number of sets of members 222 and 224 extending substantially parallel with axis 210 and other sets 234 and 236 extending neither parallel nor normal to axis 210. These members can be arranged to form an inlet cone 240 which as shown here constricts as it progresses along axis 210. Additionally, assembly 200 can include opening 288 which provides unimpeded passage of fluid. As shown, outlet 232 can be operatively aligned with opening 288 and outlet 234 can be operatively aligned with the sets of members 212. A divider is not shown but may be included.

Figures 30, 31:
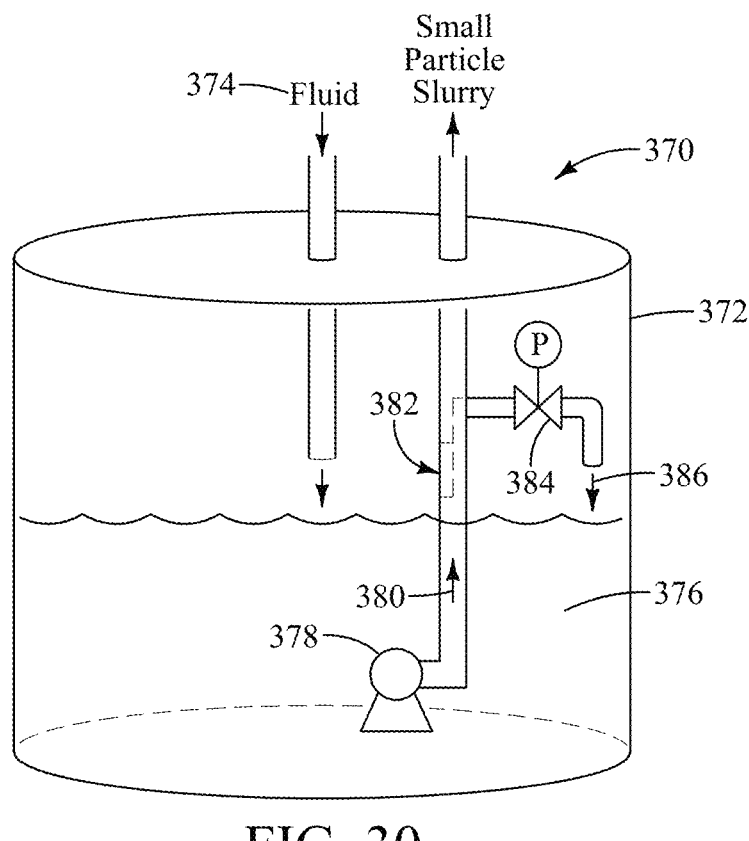
FIG. 30 is a separator assembly within a separation system according to an embodiment of the disclosure.
FIG. 31 is another separator assembly within another separation system according to an embodiment of the disclosure.

Referring next to FIGS. 30 and 31, example depictions of a separator/concentrator system 370 is shown that includes a vessel 372 configured to receive a fluid 374 that can include particles of differing sizes. The fluid can be amassed 376 and/or displaced using a pump 378 for example, to provide a pressure differential axis 380. The fluid can be provided through a separator assembly 382 where a membered portion is in fluid communication with a conduit exiting the system and the open portion is in fluid communication with a conduit returning fluid to vessel 372. A valve 384 can regulate the return of large particled fluid 386 to the vessel. Accordingly, system 370 is configured to separate small particles from fluid 374 while concentrating large particles in vessel 372.

Figure 32:
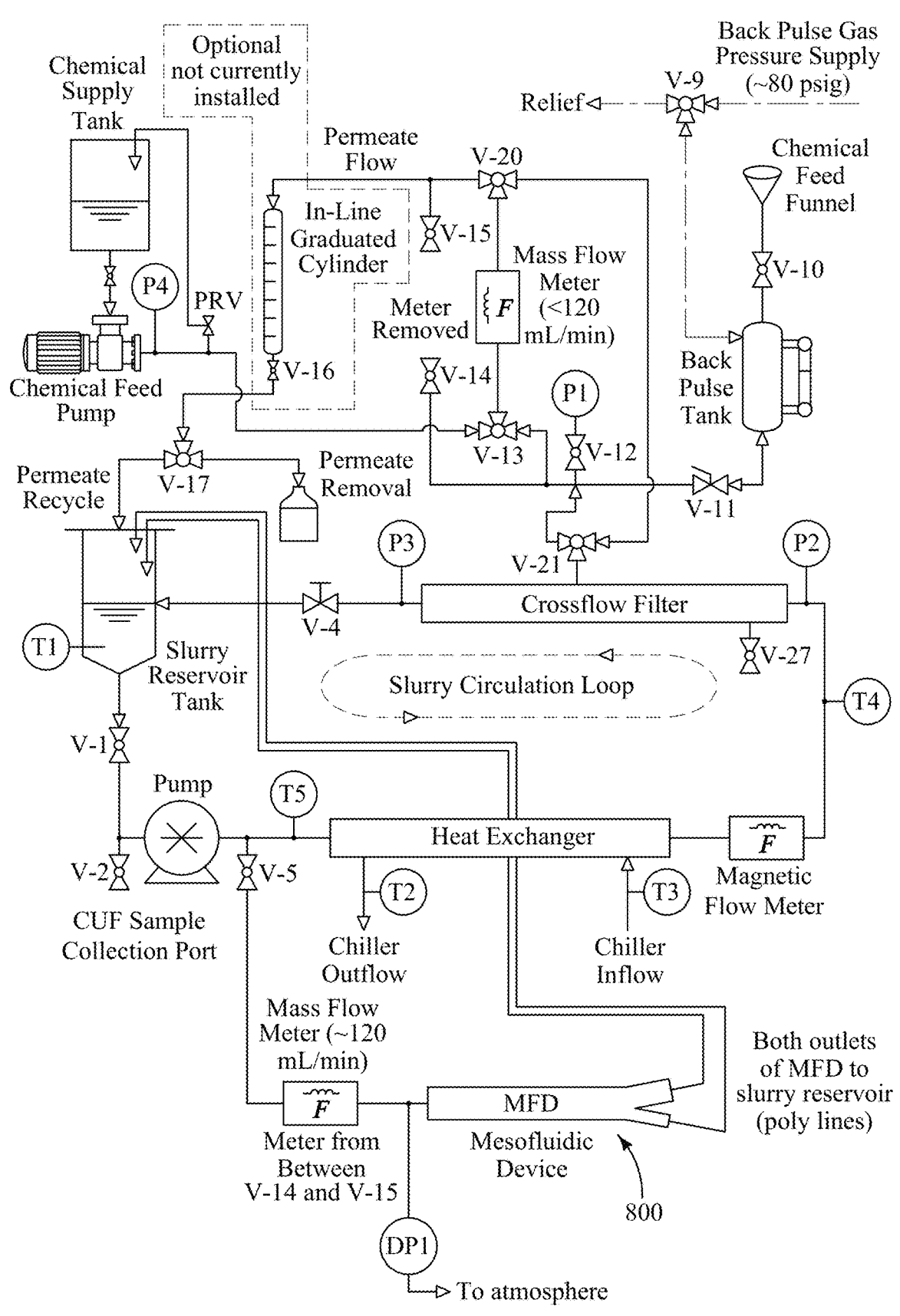
FIG. 32 is a process flow utilizing a separator assembly according to an embodiment of the disclosure.
Figure 33:
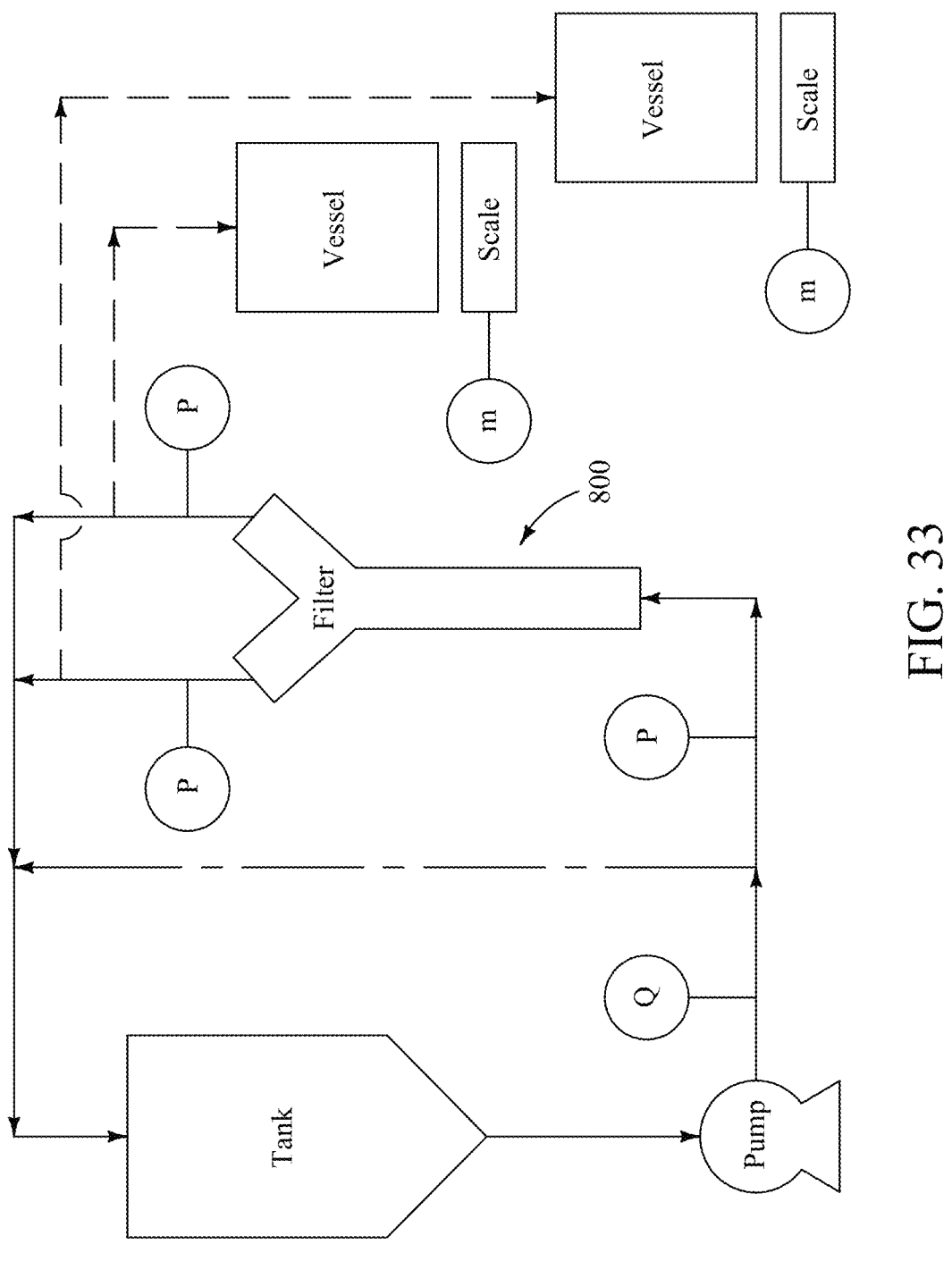
FIG. 33 is a process flow utilizing a separator assembly according to an embodiment of the disclosure.
Figure 34A:
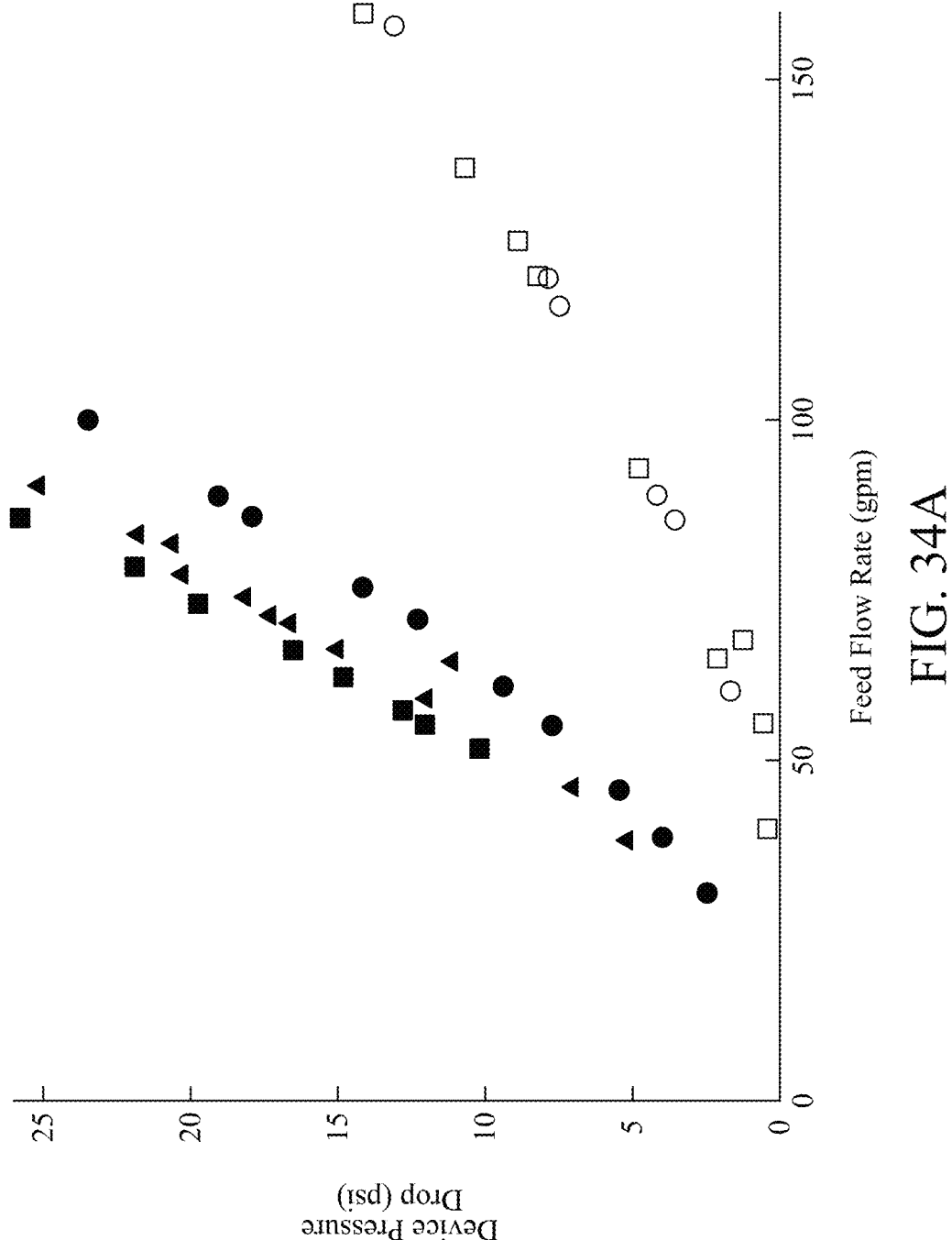
FIGS. 34A-34D are representations of data acquired utilizing separator assemblies according to embodiments of the disclosure.
Figure 34B:
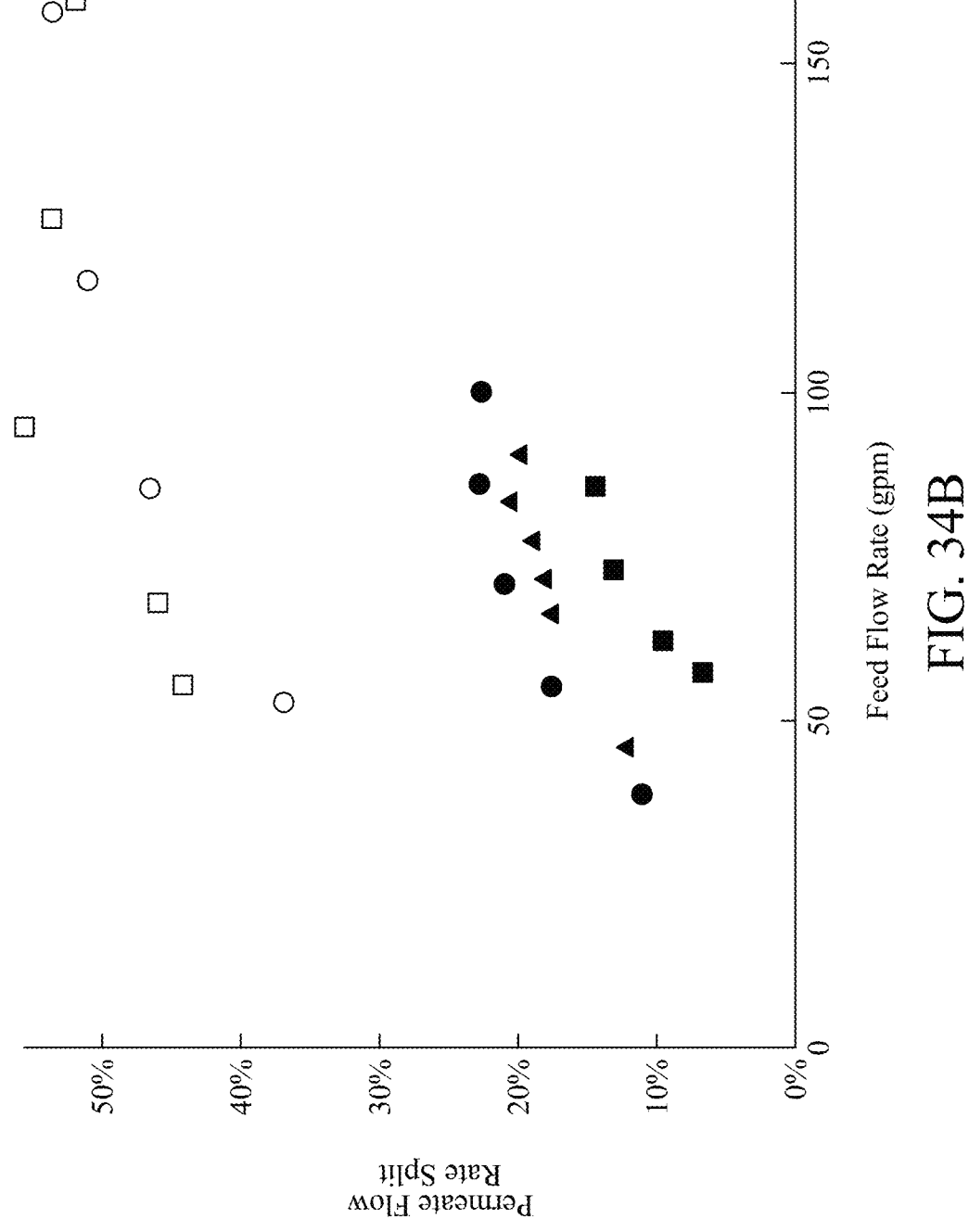
Figure 34C:
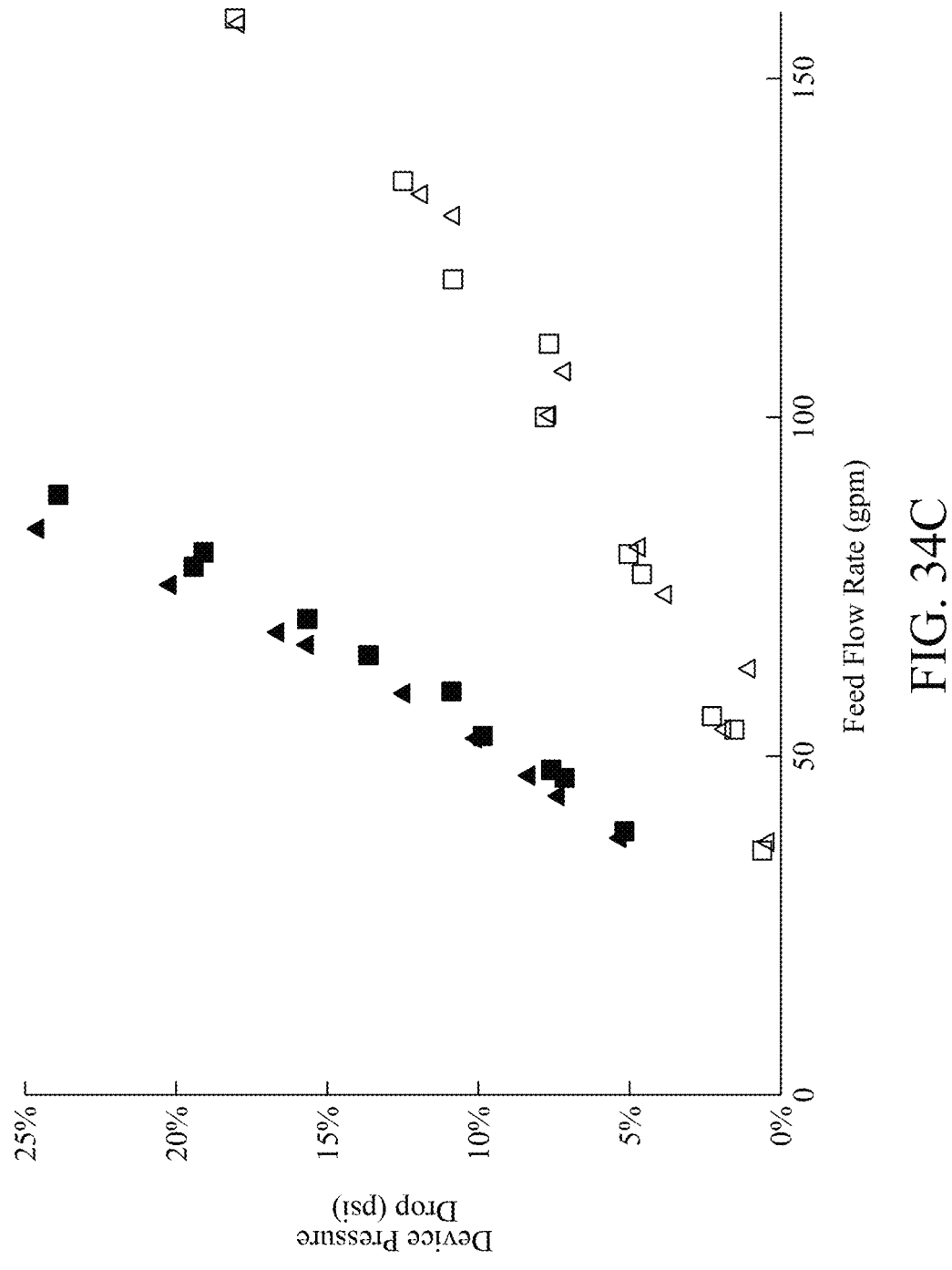
Figure 34D:
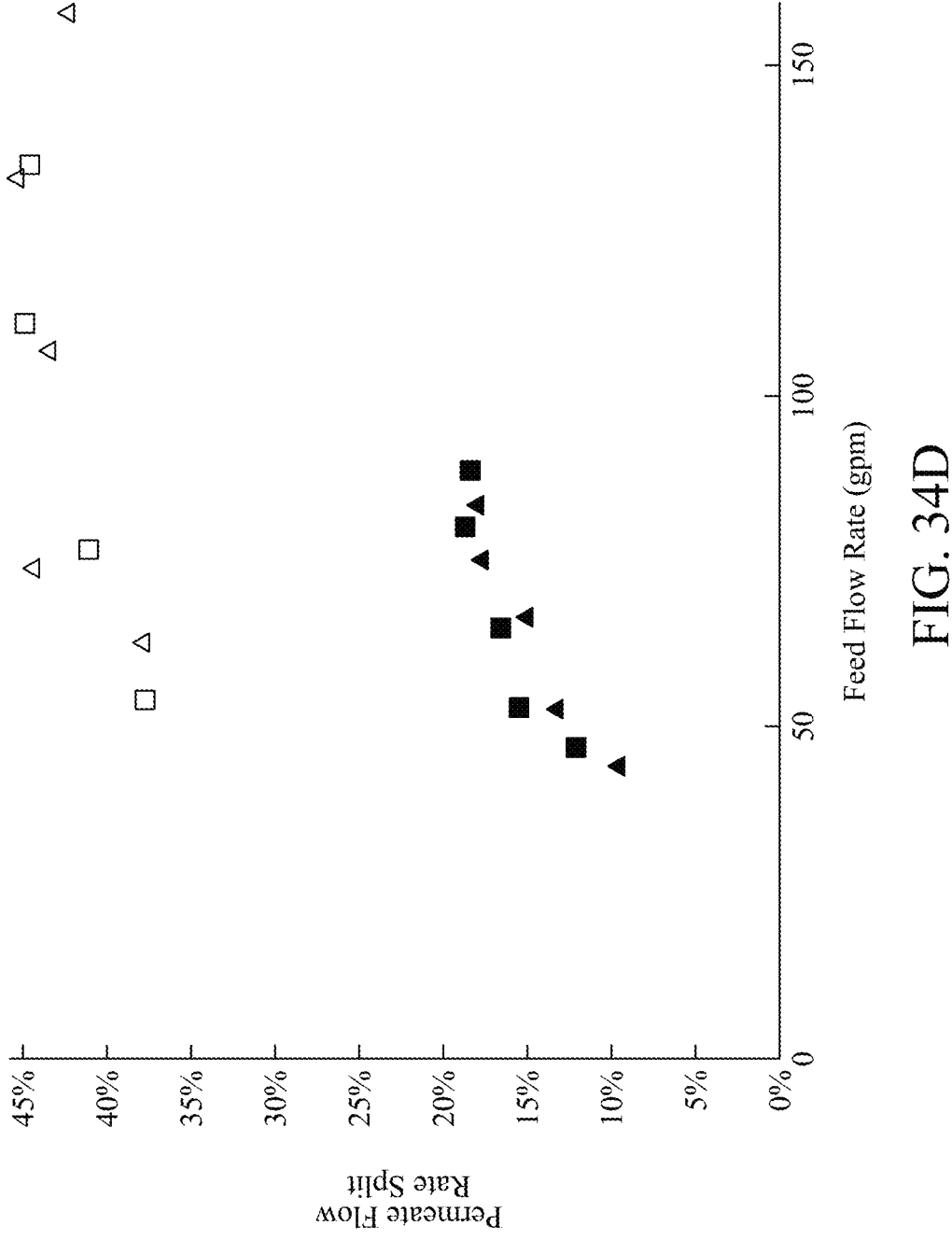

FIG. 32 is a representation of a separator assembly as part of a chemical process flow according to an embodiment of the disclosure. FIG. 33 is a representation of a separator assembly as part of a process flow according to an embodiment of the disclosure.

While many sizes and spacings can be provided to accomplish the desired separations, some example assemblies of the present disclosure can be provided with a 300 µm offset between members. This member offset was selected, as an intermediate size in mesofluidic filtration cascades. Mesofluidic filtration systems can be configured to be an insert within a pipe (see FIG. 14). A round exterior can be selected to fit within a three inch cylinder. Accordingly, standard off-the-shelf pipes and pipe fittings commonly approved for nuclear engineering applications may be implemented to satisfy stringent safety requirements (e.g., burst pressures, containment requirements, etc.). Within the round exterior, the express lane can occupy 10±9% of the cross section while the remainder of the cross section can be considered a separator array that includes a partitioning by three parallel supports with arrays of members perpendicular to the members. The center-to-center distance between rows of members can be 3 mm with each member 1.2 mm in diameter for a design edge-to-edge gap of 1.8 mm. Over a sufficient distance (~1.18 inches) the pattern of members can repeat itself. As an example, more than twenty modules can be used so that a large particle that entered the insert away from the express lane would migrate to the express lane in the absence of turbulent or molecular diffusion with a 17% margin. Upstream of the stacked modules, ten pipe diameters were used to minimize any entrance length concerns. Downstream of the stacked modules, the express lane and remaining flows divided in a Y configuration (see FIGS. 17A-B and 18A-B for example). The final module can have a notch in place of the bottom set of members to prevent rotation of the insert within the device during operation. Welding may be used to secure one or more stacked modules. For the vertical upward flow implementations, a long thin plastic shim can be inserted away from the express lane to buttress the insert in place. This shim may be inserted in alternate locations as well.

Separator assemblies of the present disclosure can be used to separate the simulant described in Table 4 having particle sizes ranging from <0.7 to >700 µm across the design cutoff size. These simulants in water had an approximately neutral pH and did not present a radioactivity risk. After the simulant was added to the tank and after the first horizontal run, very large particles were screened from the as-prepared simulant by flowing through a 900 µm sieve at flowrates in excess of 30 gpm for at least 12 minutes. Particles and other debris collected were washed with a water jet until no additional particles passed through the sieve. Prior to testing with this simulant, a cloudy watery dilute simulant with particle concentration >200 ppm was used.

TABLE 1

| | | Mass | | | Moh |
| Material (Manufacturer, Product) | Density kg/L | Fraction — | $d_{50}$ μm | $d_{10}$-$d_{90}$ μm | Hardness — |
|---|---|---|---|---|---|
| Gibbsite (Huber, Onyx Elite 103) | 2.42 | 0.176 | 88.34 | 10.19-164.1 | 3 |
| Zeolite (ZEO Inc., Zar-Min) | 2.15 | 0.119 | 34.33 | 4.103-188.9 | 3.75 |
| $Ca_5OH(PO_4)_3$ (Jost) | 3.14 | 0.110 | 2.647 | 0.699-7.034 | 5 |
| $Bi_2O_3$ (Ferro, 320 Bismuth Trioxide) | 9.37 | 0.057 | 7.818 | 3.755-14.62 | 4.5 |
| Boehmite (Nabaltec, AOH 20) | 3.18 | 0.202 | 8.667 | 3.055-24.98 | 4 |
| Gibbsite (Huber, Onxy Elite 431) | 2.42 | 0.059 | 9.997 | 2.126-29.39 | 3.4 |
| Sand (US Silica, WG 00) | 2.65 | 0.118 | 494.7 | 306.4-779.6 | 6.5 |
| Zirconium Oxide (Durazon 360) | 5.70 | 0.158 | 9.987 | 0.948-39.52 | 8 |

The systems using the separator assembly can be configured as shown in FIG. 33. When the flow was initiated, the flow from the variable speed pump (Duty Master P25G33167, Reliance Electric) shunted back directly back to the tank (~460 gal filled initially to ~90%) for complete recycle (see alternating dash in FIG. 33). This step assisted the slurry in the impeller mixed tank to mix more completely prior to flow through the device and minimized abrasion wear to the plastic inserts. Inserts may be of a variety of materials including metal, plastic, ceramic, etc. A valve change then closed flow through the shunt or bypass so that flow proceeds through the mesofluidic separator. Flow through the transparent lines from the outlets of the separator was observed until these lines filled to their maximum extent, observations of bubbles minimized or ceased completely, and observers were certain that the separator was full of liquid. This observation step typically took approximately one minute. The density, flowrate, three pressures, and initial scale mass (unless tared) were then recorded. The density and flowrate were measured using a Coriolis meter, noted on FIG. 33 as a flowrate measurement (i.e., Q). Then another set of valves was activated so that the full outlet streams (dashed in FIG. 33) were diverted for ten seconds from recycle into collection vessels, at least one of which was on a scale. Ten seconds was selected to minimize uncertainty because the response time of the three-way valves are less than one second. During the diversion, the flowrate and three pressures were observed as they approached steady state and recorded. The mass of the full diversion sample from either the permeate or the express lane flows was measured using a weight balance (Combics 3, Sartorius). Once diversion was complete and values recorded, the pump flowrate was changed to the next setting. Diversion samples were not replaced, decreasing the volume of the tank as testing proceeded.

The orientation of the mesofluidic separator assembly assumed one of three positions: horizontal with express lane down, vertical with downward flow, and vertical with upward flow. The vertical configurations required additional lengths of plastic tubing beyond that required of the horizontal. When the vertical up configuration was changed to the vertical down configuration, one 90° elbow approximately two inches in diameter was removed.

After the flow ceased and testing was completed, the slurry in the vessel was allowed to settle for at least three days or until the fluid was visually clear. Then the clear fluid was removed using a peristaltic pump and the remaining solids were then dried, weighed, sieved, and particle size distribution measured.

In data analysis, the pressure drop across the device is reported as the difference between the upstream pressure and the average of the downstream pressures. Between the upstream pressure tap and the start of the separator were two elbows and several feet of flexible tubing, whose influence on pressure drop was not quantified. The volumetric flowrate was determined from the weighed mass(es) by dividing the mass by 10 s, and then dividing by the inlet density with appropriate unit conversions. Where only the permeate or express lane mass was measured, the volumetric flowrate of the other was determined by subtracting the calculated volumetric flowrate from the inlet volumetric flowrate. The permeate split is then the volumetric flowrate of the permeate divided by the inlet volumetric flowrate. The bulk Reynolds number was determined using $$Re_D = \frac{D v_b}{v}, \tag{1}$$

where D is the tube inner diameter, $v_b(=4Q/(vD^2))$ is the bulk cross sectional average, Q is the volumetric flowrate, and v is the kinematic viscosity of the slurry. The express lane and permeate velocities were calculated from the volumetric flowrates each divided by their respective cross sectional areas determined at the Y. The velocity in the gap, $V_G$, was determined by dividing the permeate velocity by the gap width, G, and multiplying by the member center-to-center distance. The gap Reynolds number is then $$Re_G = \frac{G v_G}{v}. \tag{2}$$

In this manner, the pressure drop, permeate split, bulk Reynolds number, and gap Reynolds number were determined.

Here, we explore an industrial scale mesofluidic filtration system at fast flowrates. Because prior work was performed with spherical beads, large particle separation is evaluated for abrasive aspherical particles typical of abrasive radioactive waste. We explore the pressure drop, split in flowrates between permeate and filtrate, and the fraction of large particles in the permeate line each as a function of flowrate for three separator orientations. We evaluate the pipe and gap Reynolds numbers relative to those reported elsewhere to place these results in context.

A key feature of this separator design is the circular form factor that fits within a three inch tube. This is important because its small footprint permits easy integration into existing industrial piping systems. The three inch test system was selected as a geometric control against nuclear criticality but larger systems for a variety of industries are feasible.

The circular form factor contrasts with arrays that have been constructed as planar systems with rectangular cross sections. Because the array of pillars is intricate, this system is designed and constructed using additive manufacturing to fit within a pipe three inches in diameter.

With respect to FIGS. 34A-34D, inlet flowrate data with horizontal results for (34A) pressure drop and (34B) fraction of flow through the permeate versus feed flowrate. Circles indicate dilute simulant, squares indicate concentrated simulant, and triangles indicate conditioned simulant with particles in excess of 0.9 mm mostly but not completely removed, while closed symbols indicate that the inserts were installed and the open symbols indicate that the inserts were absent. Vertical results for (34C) pressure drop and (34D) fraction of flow through the permeate versus feed flowrate. Squares indicate downward flow and triangles indicate upward flow, while closed symbols indicate that the inserts were installed and the open symbols indicate that the inserts were absent.

With the inserts in dilute simulant, a maximum flowrate of 100 gpm was achieved at the pump's maximum output. Although this simulant was rather dilute, it was sufficiently concentrated to make the solution cloudy. With the more concentrated solution, a maximum flowrate of 90 gpm was achieved. These volumetric flowrates correspond to bulk inlet velocities in the range of 0.4-2.5 m/s, which are as fast as and faster than any explored experimentally. These flowrates may only be limited not by the device but by the pump, suggesting that these tests have not determined an upper maximum velocity achievable by this technology.

Perhaps the most surprising finding is that the plastic members survived an abrasive simulant over several hours of testing. However, on member mortem analysis, the only members that broke were those that failed as the inserts were assembled together into the test stand or upon removal but not during flow. While the assemblies can be constructed of polymeric material including industrial plastics alone, metal materials can be used as well in industrial systems and may have greater resistance to both fluid drag and mechanical installation forces.

FIGS. 34A-34D also show that the pressure drop increases approximately quadratically with flowrate. The portion of the flowrate that passes through the permeate increases with flowrate. In the absence of the inserts, the proportion of the flow is nearly equal. However, with the inserts, the proportion drops substantially to typically 10-25% of the flow. Even as fluid motion presents a drag force to the members, the members provide a drag force to the fluid, increasing the resistance of the separator relative to the express lane. This flow attenuates more quickly when large particles (>d$_{90}$) occlude the separator face (these particles would be removed upstream in cascaded devices). However, when the larger particles are removed (here >0.9 mm), the proportion of the flow through the permeate appears to depend but weakly on particle concentration (compare closed triangles and circles in FIG. 34B).

Figure 35A:
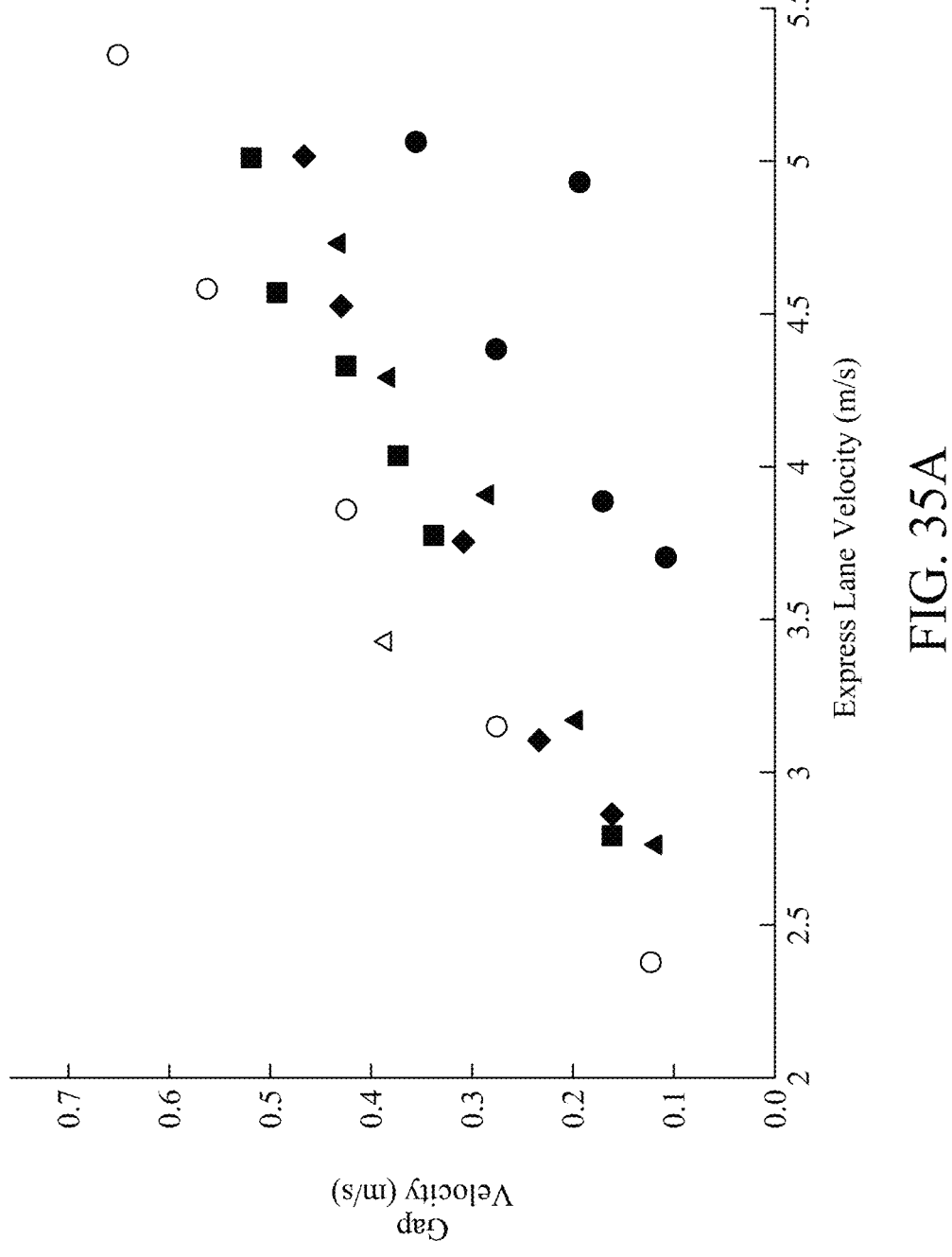
FIGS. 35A-35B are representations of data acquired utilizing separator assemblies according to embodiments of the disclosure.

FIG. 35A compares the spatial average velocity through the express lane to the spatial average velocity across the gap. The flowrates in the gap remain relatively modest between ~0.1-0.7 m/s in contrast to the flowrates through the express lane that remain between 2.4-5.4 m/s (7.8-17.7 ft/s). These flowrates through the express lane more than suffice to drive particle through the express lane without the formation of a fixed bed. This is commensurate with the observation of transient particle beds in transparent sections from both express lane and permeate flows. Often the flows were sufficiently fast so that a bed was not observed at all but the color across the transparent sections was homogeneous. These observations suggest that settled solids observed in outlet streams once flow ceased formed after flow stopped.

Figure 35B:
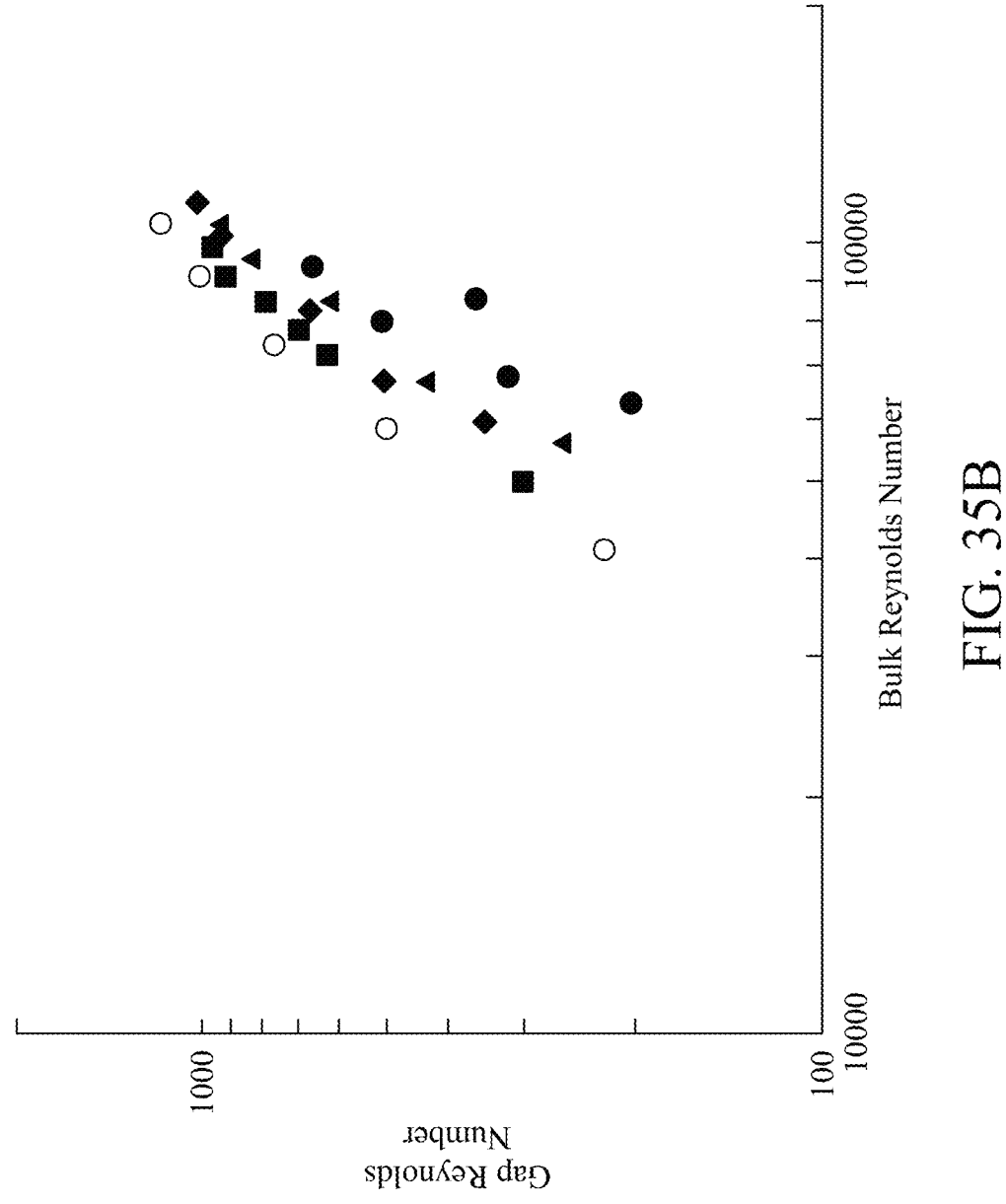
Figure 36A:
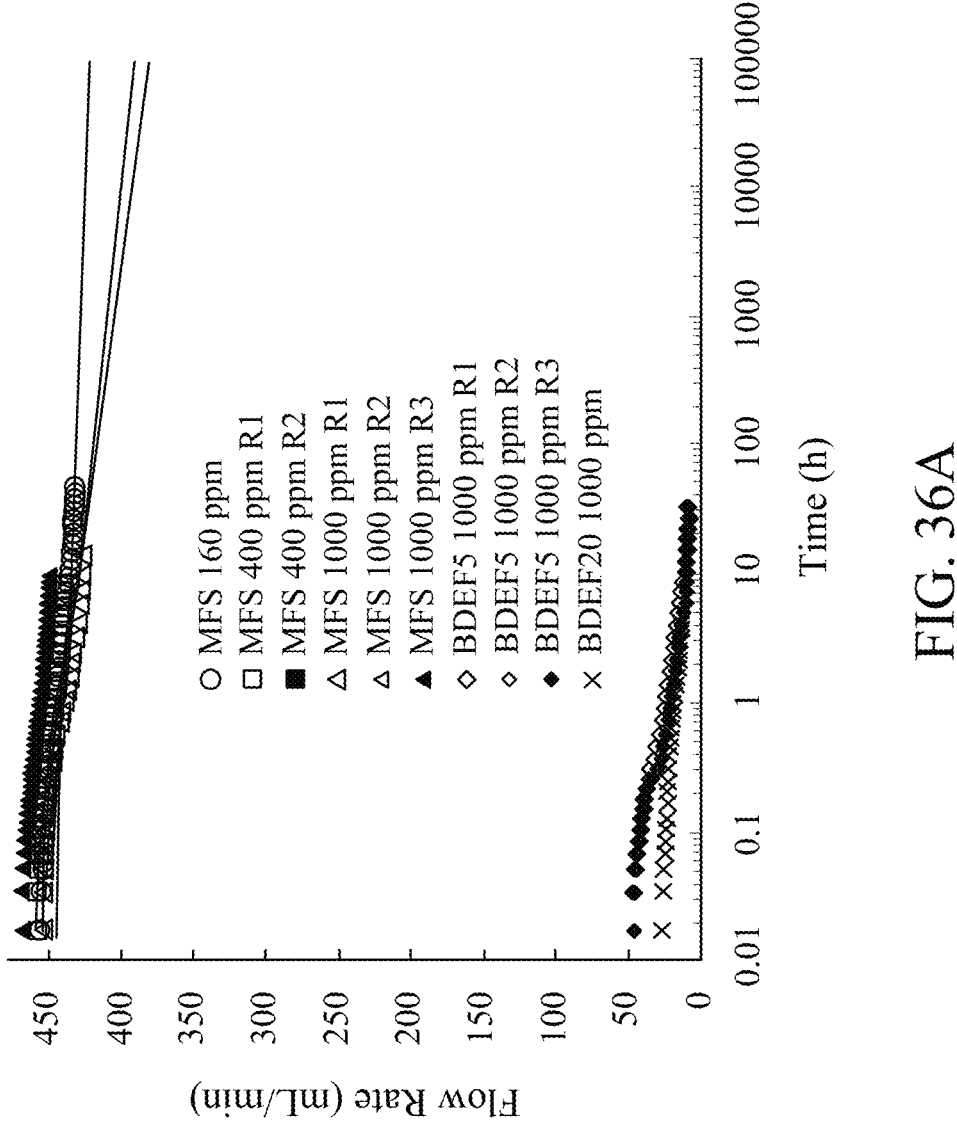
FIGS. 36A-36D represent data acquired utilizing separator assemblies according to an embodiment of the disclosure.
Figure 36B:
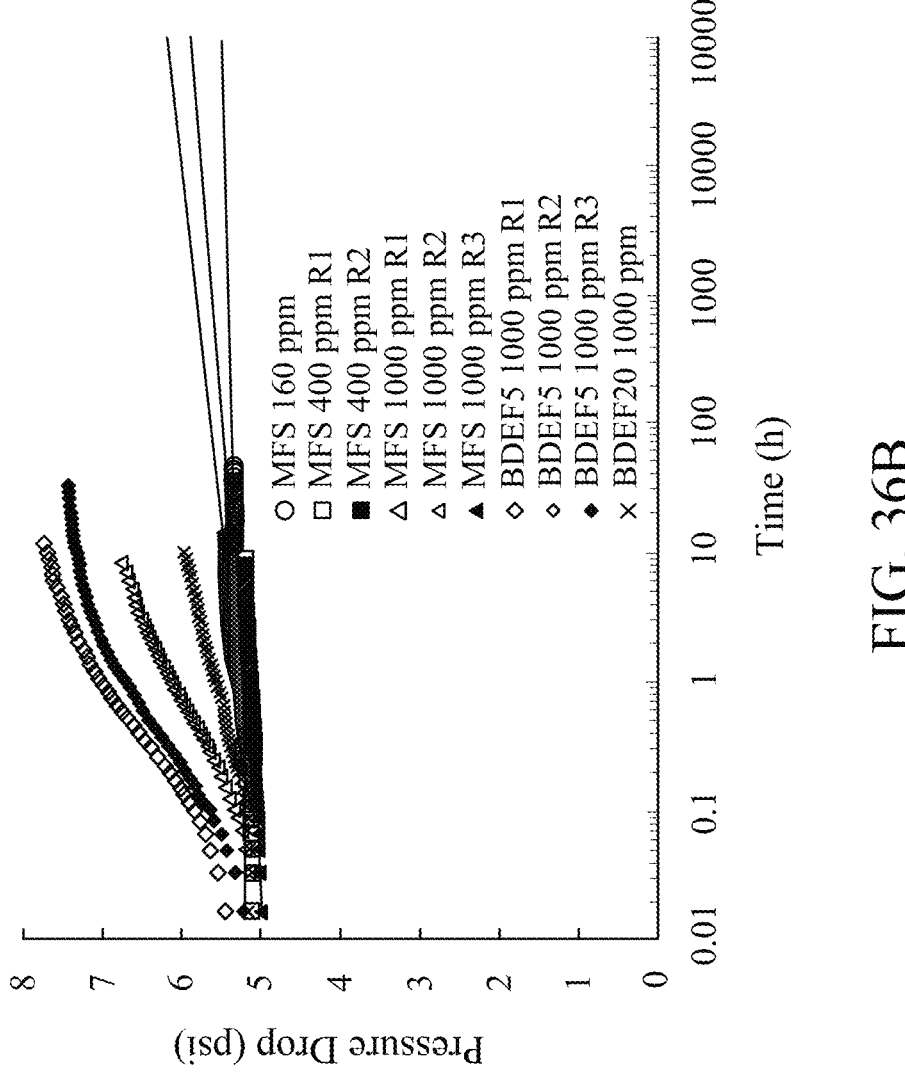
Figure 36C:
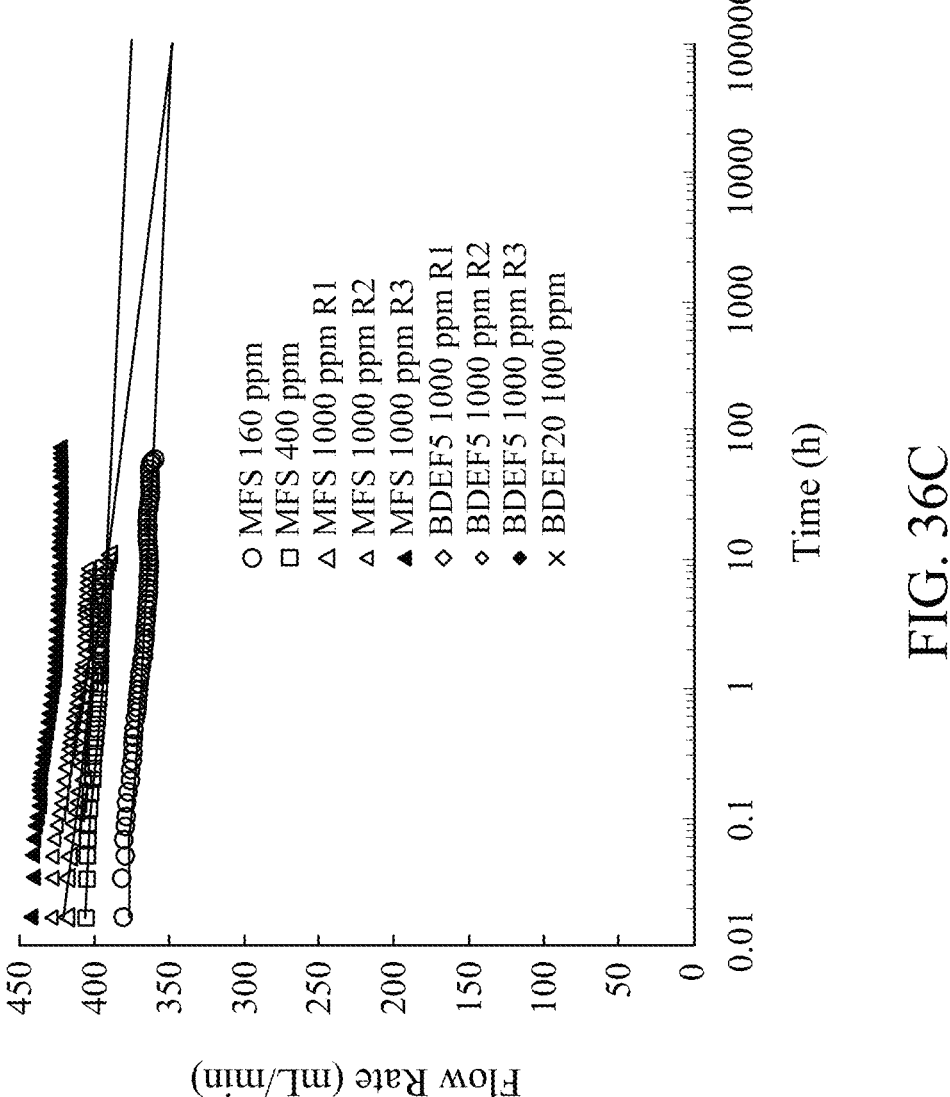
Figure 36D:
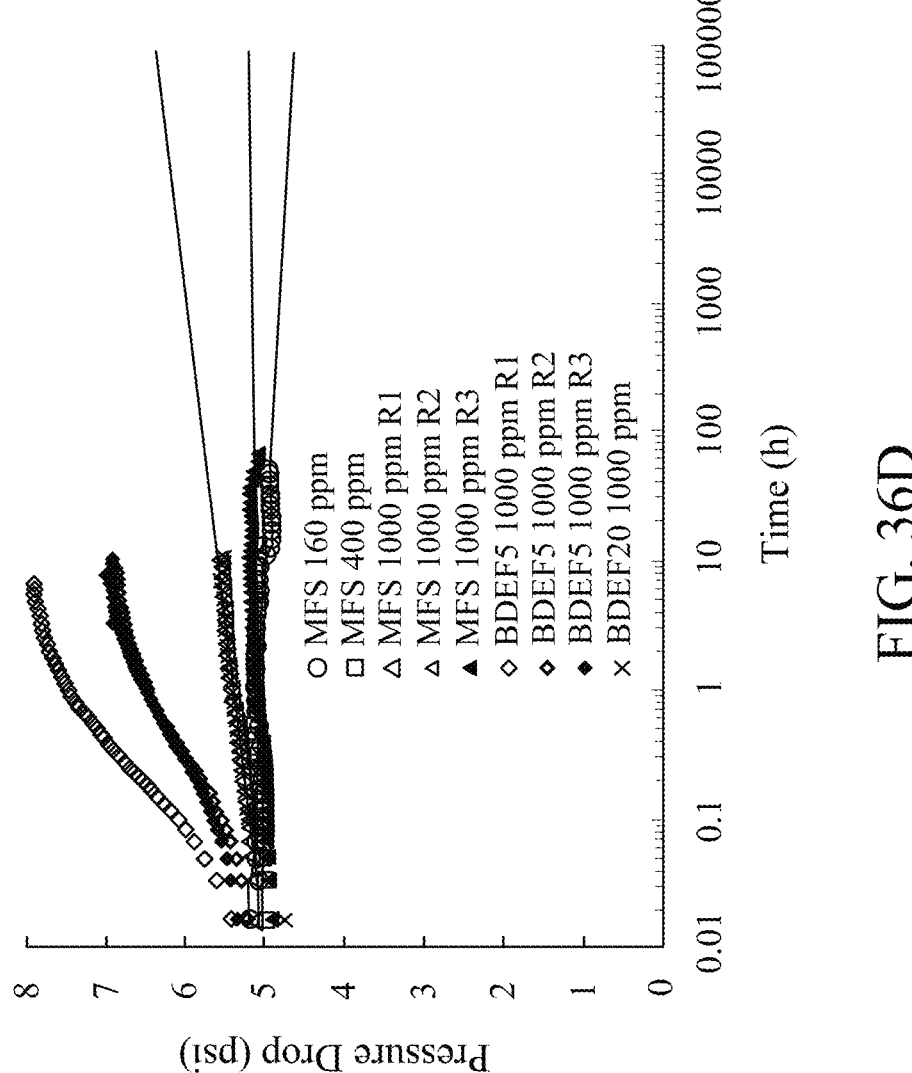

FIGS. 35A and 35B provide average velocity across the gap versus average velocity across the express lane and gap Reynolds number versus bulk Reynolds number. Circles and squares indicate the horizontal orientation with express lane down, triangles indicate the vertical configuration for upward flow, and diamonds indicate the vertical configuration for downward flow with dilute simulant open and concentrated simulant closed. The square symbol indicates conditioned simulant with very large particles (>0.9 mm) removed.

FIG. 35B summarizes these results in terms of two important Reynolds numbers. The bulk Reynolds number, Rep, is the typical Reynolds number based on the tube diameter and unobstructed inlet flowrate. This figure shows that the Reynolds numbers all exceed the laminar-turbulent transition by at least an order of magnitude. This is important because it indicates that the flow entering the device is turbulent. This contrasts with prior efforts where inlet flows were decidedly laminar but is commensurate with many industrial applications where turbulence is commonplace. The second Reynolds number is the gap Reynolds number based on the critical dimension of the edge-to-edge distance between members (here ~1.8 mm) and the average velocity across the gap.

FIG. 34A-34D also highlight the influence of tube orientation. When flow is oriented parallel to the gravitational vector, particle separation occurs predominantly if not exclusively by size. When the flow vector has a component normal to the gravitational vector, gravitational settling may drive particles to cross stream lines with larger and denser particles settling faster. The net result of orientation shows that large particle removal is more effective in the horizontal configuration with express lane down because higher density particles enter the express lane due to both the filtration mechanism and gravitational settling.

Slurries with larger and higher density particles may be separated in shorter sequences or cascades. For example, in nuclear waste processing at Hanford, a screen on the pump inlet prevents particles larger than 3/8th of an inch from entering the pump and piping system. In the absence of a gravitational assist, the several separation stages (consecutively arranged within the same pipe) would be required, where the design cutoff of the current stage determines the minimum member spacing in the next. However, with gravitational assist fewer separation stages would be needed to achieve the same performance.

Nevertheless, the difference between up and down orientations is minimal. There is a slight decrease in pressure drop from upward flow to downward flow, but this comports with the removal of a single 90° bend between the two test cases. We note that there is an important cutoff velocity for the vertical upward flow condition. The upward drag force must meet or exceed the gravitational settling force for the particle to continue upward through the device. Based on the settling expression of Camenen (2007), the flowrate Q that balances this condition is given by $$Q = \frac{\pi}{4}D^2 \frac{vG}{dfD_{cc}}\left(\sqrt{15 + \sqrt{\frac{g(s-1)d^3}{0.3v^2}}} - \sqrt{15}\right)^2, \tag{3}$$

where D is the pipe diameter, v is the kinematic viscosity of the slurry, G is the gap, d is the particle diameter, f is the fraction of the cross section through the permeate, $D_{cc}$ is the center-to-center distance between members, g is the gravitational constant, and s is the specific gravity of the particle. For sand in Table 4, the critical flowrate is only 10 gpm, so that this criterion is relatively modest. On member evaluation at the end of testing of the vertical upward flow configuration, particles were observed throughout the device, but they may have passed through the device after the flow had been turned off when residual fluid was drained. A back flow preventer is contemplated.

The separator performs consistently across flowrates up to 90 gpm with modest pressure drop even though the inlet flow was turbulent and vortex shedding is likely within the member arrays.

Additionally, two chemical simulants were employed with compositions presented in Tables 5-6. Both caustic slurry simulants were representative of wastes, which are stored at highly basic conditions to minimize tank wall corrosion. Neither simulant presented radioactivity risk. The salt cake simulant was prepared for testing by filling the reservoir with 10.8 kg of the supernatant from mixed simulant that had been filtered through a 0.45 μm filter. The retained solids were filtered through a 106 μm filter. To achieve a ~160 ppm simulant, 40.5 g of particles <106 μm were added. The simulant was sheared in the test system for at least 5 minutes prior to testing. To achieve a ~400 ppm simulant, an additional 60.7 g of particles <106 μm were added. To achieve a ~1000 ppm simulant, an additional 148.9 g of particles <106 μm were added.

Similarly, the $FePO_4$ simulant was prepared for testing by filling the reservoir with 17.8 kg of the supernatant from mixed simulant that had been filtered through a 0.45 μm filter. To achieve a ~160 ppm simulant (on an $Fe(OH)_3$ basis), 2.83 g of iron phosphate were added. This simulant was sheared overnight prior to testing. To achieve a ~400 ppm simulant, an additional 4.20 g of iron phosphate were added. To achieve a ~1000 ppm simulant, an additional 10.6 g of iron phosphate were added. In both cases, weight fractions do not account for further solubilization of solids, and when samples were removed their contents were not replaced. The as-made salt cake simulant chemical simulant is given in Table 5. This composition is prior to sieving with a 106 micron sieve.

The test system had two parallel flow loops (see FIG. 33). In the main flow loop, simulant in a feed tank was fed to a steady pump that drove flow through a cross flow filtration unit that only provided flow resistance, and then back to the feed tank. An interior loop that contained the filter tested diverged after the pump and merged back at the feed tank. An in-line Coriolis mass flow controller measured flowrate and TC probe the temperature. A differential pressure meter indicated the pressure drop across the filtration system along with downstream tubing. The system was operated with the mesofluidic separator in a horizontal configuration with express lane down. The dead-end filters selected for this analysis were the Mott grade 5 and grade 20 filters available commercially, because their nominal sizes span that anticipated with the mesofluidic separator device.

TABLE 2

S-salt cake chemical simulant composition.

| Species | Concentration |
|---|---|
| Aluminum (Al) | $2.81 \cdot 10^{-1}$ mol/L |
| Chromium (Cr) | $1.03 10^{-2}$ mol/L |
| Nitrate ($NO_2$) | $8.18 10^{-1}$ mol/L |

TABLE 2-continued

S-salt cake chemical simulant composition.

| Species | Concentration |
|---|---|
| Nitrate ($NO_3$) | 1.93 mol/L |
| Phosphate ($PO_4$) | $8.80 \cdot 10^{-2}$ mol/L |
| Sulfate ($SO_4$) | $8.29 \cdot 10^{-2}$ mol/L |
| Inorganic carbon (C) | $5.21 \cdot 10^{-1}$ mol/L |
| Fluoride (F) | $5.79 \cdot 10^{-3}$ mol/L |
| Chloride (Cl) | $9.10 \cdot 10^{-2}$ mol/L |
| Hydroxide (OH) | $7.17 \cdot 10^{-1}$ mol/L |
| Potassium (K) | $2.92 \cdot 10^{-2}$ mol/L |
| Sodium (Na) | 5.11 mol/L |
| Gibbsite (Almatis C333) | 0.394 g/g |
| Boehmite (APYRAL AOH20) | 0.089 g/g |
| Cancrinite | 0.067 g/g |
| Grimaldiite | 0.152 g/g |
| Sodium Oxalate | 0.141 g/g |
| Sodium Phosphate Dodecahydrate | 0.128 g/g |
| Iron Rich Sludge | 0.029 g/g |

TABLE 3

Nominal sodium chemical simulant composition.

| Species | Concentration |
|---|---|
| $Al(NO_3)_3$—$9H_2O$ | 0.17 mol/L |
| NaOH (50% solution, w/w) | 4.15 mol/L |
| $CsNO_3$ | 0.00010 mol/L |
| KC1 | 0.12 mol/L |
| $Na_2SO_4$ | 0.066 mol/L |
| $NaNO_2$ | 1.02 mol/L |
| $NaNO_3$ | 1.28 mol/L |
| $Na_3PO_4$—$12H_2O$ | 0.043 mol/L |
| $Na_2CO_3$—$H_2O$ | 0.47 mol/L |
| $Na_2C_2O_4$ | 0.013 mol/L |
| Water, Deionized | 41.51 mol/L |
| This simulant is termed 5.6M Na (nominal) LAWPS filtrate | |

Prior to a test run, flow was initiated through the main flow loop. After that flow achieves steady state, flow in a mesofluidic filtration device (MFS) loop was initiated. The pump flowrate was initially pulsed above the target flowrate and device tapped to drive out any bubbles that may be present in the system. The transparent tubing from the MFS to the tank was observed to ensure that bubbles ceased. The variable frequency driven pump can be tuned so that the pressure drop started at 5 psi. The temperature of the heat exchanger was then manually set to maintain the temperature at ~20° C., because prior experience with chemical slurry simulants suggested temperature sensitivity. The system operated without further operator intervention except where regular temperature checks suggested manual adjustment of the heat exchanger. In this manner, both the pressure and flowrate may vary during the course of the experiment. The data acquisition system (DAS) recorded the pressure and flowrates across and through the device as a function of time. Data was collected each 2.5 seconds (0.4 Hz), 60 s averages therefore were reported here. Data analysis began one minute after the pressure was set to approximately 5 psi and other flow adjustments were complete, because 60 s averages were reported.

The system was operated with both outlet streams exiting into the tank for a complete recycle. In this manner the flowrate and pressure drop vary as a function of time for at least 7 hours. The minimum duration was selected because a majority of the attrition occurs in these early times and because the back-pulsed dead end filtration (BDEF) has been shown to cake the volume of the entrance line to this filter in approximately ~7 hours. The MFS was permitted to run longer as opportunity permitted.

A feed sample was collected once for each concentration from the outlet of the mixing tank at the start of the run. At the end of the test, samples of the feed, permeate, and express lane were collected from the lines as they entered the mixing tank. These lines were located above the liquid level in the tank to keep device outlet pressure at ambient pressure. Flow to the express lane was also collected for one minute while monitoring the flow entering the MFS to determine the flowrate splits to permeate and express lane.

The dead-end filter was evaluated similarly. The commercial off-the-shelf filter selected for comparison was a sintered Mott grade 5, in-line filter (6480-1/2-6-10-AB) with a 6 inch long and ⅜ inch 316LSS porous filter housed in a ½ inch pipe made of 316SS.

FIGS. 36A-36D compare and contrast the performance an additively manufactured mesofluidic separator system to a commercially available dead-end filter as a flowrate through the filtration system as a function of time. In each case, the system was set to 5 psi regardless of flowrate without further adjustment so that both pressure and flowrate were permitted to evolve over time. The dead-end filters show a fairly rapid drop in throughput as a function of time. Both Mott filters, grades 5 and 20 that span the nominal size cutoff of the mesofluidic separator, drop quickly losing 57-78% of their flow and increasing 18-39% in pressure drop within the first seven hours. These changes are consistent with cake fouling, though some depth fouling may also play a role. In contrast, the mesofluidic device shows a 3-5% drop in the flowrate and an increase in pressure drop of ≤6.5% over the same seven hour window. Fitting the mesofluidic separator flowrate data to a logarithmic curve shows that a line on a log-linear plot represents the mesofluidic data reasonably well and projects that this device will retain >89% of its flowrate over three months and >87% of its flow over three years (Table 7). Similarly, the fitting of the mesofluidic separator pressure data to a logarithmic curve shows reasonable agreement and projects that this device's pressure drop will rise by ≤14% of its flowrate over three months and <17% over three years (Table 8). The dead end filters would not be serviceable after 3 months of operation much less three years and increase in pressure drop over 7 hours approximately as much as the MFS filter does in three years.

The simulants were specifically chosen because they are known to clog filter systems with some rapidity. Indeed, the 7 hour interval was chosen for comparison because the annular space immediately upstream of the BDEF filter fills completely within this interval. Retaining flow for days, months and years suggests that flushing and replacement protocols may be much less frequent if not completely unnecessary with the mesofluidic filtration systems in contrast to dead-end filtration systems. There does appear to be a modest difference between the two simulants. The curves for the FePO₄ simulant overlap in contrast to the curves for the salt cake simulant that data in contrast opens up more each time. This suggests that whereas the sticky FePO₄ simulant may have been protective during the cleaning steps (unnecessary during regular operations), the S-salt cake was not protective of the Hanes 282 alloy.

TABLE 4

Flow rate comparisons and projections

| Device | Simulant | Concentration ppm | 7 h % diff | 3 mo % diff | 3 yr % diff |
|---|---|---|---|---|---|
| — | — | | | | |
| MFS | Salt Cake | 160 | −4.4% | −6.8% | −7.9% |
| MFS | Salt Cake | 400 | −3.1% | −6.1% | −7.4% |
| MFS | Salt Cake | 1000 | −5.8% ± 1.5% | −10.4% ± 4.3% | −12.3% ± 5.4% |
| BDEF Grade 5 | Salt Cake | 1000 | −76.7% ± 2.9% | Not Possible | Not Possible |
| BDEF Grade 20 | Salt Cake | 1000 | −57.8% | Not Possible | Not Possible |
| MFS | FePO₄ | 160 | −3.8% | −5.5% | −6.3% |
| MFS | FePO₄ | 400 | −4.6% ± 1.5% | −9.7% ± 3.5% | −11.9% ± 4.4% |
| MFS | FePO₄ | 1000 | −5.0% ± 0.8% | −10.5% ± 1.5% | −12.9% ± 1.8% |
| BDEF Grade 5 | FePO₄ | 1000 | −72.4% ± 5.2% | Not Possible | Not Possible |
| BDEF Grade 20 | FePO₄ | 1000 | −61.4% | Not Possible | Not Possible |

TABLE 5

Pressure comparisons and projections

| Device | Simulant | Concentration ppm | 7 h % diff | 3 mo % diff | 3 yr % diff |
|---|---|---|---|---|---|
| — | — | | | | |
| MFS | Salt Cake | 160 | −0.2% | −5.4% | −7.3% |
| MFS | Salt Cake | 400 | 2.0% | 3.3% | 3.9% |
| MFS | Salt Cake | 1000 | 7.1% ± 1.4% | 12.0% ± 6.4% | 14.2% ± 8.5% |
| BDEF Grade 5 | Salt Cake | 1000 | 39.7% ± 10.7% | Not Possible | Not Possible |
| BDEF Grade 20 | Salt Cake | 1000 | 28.7% | Not Possible | Not Possible |
| MFS | FePO₄ | 160 | 4.8% | 6.6% | 7.6% |
| MFS | FePO₄ | 400 | 6.2% ± 2.4% | 12.9% ± 5.5% | 15.8% ± 6.9% |
| MFS | FePO₄ | 1000 | 6.5% ± 0.9% | 13.2% ± 1.1% | 16.1% ± 1.2% |
| BDEF Grade 5 | FePO₄ | 1000 | 38.9% ± 6.4% | Not Possible | Not Possible |
| BDEF Grade 20 | FePO₄ | 1000 | 18.5% | Not Possible | Not Possible |

Figure 37A:
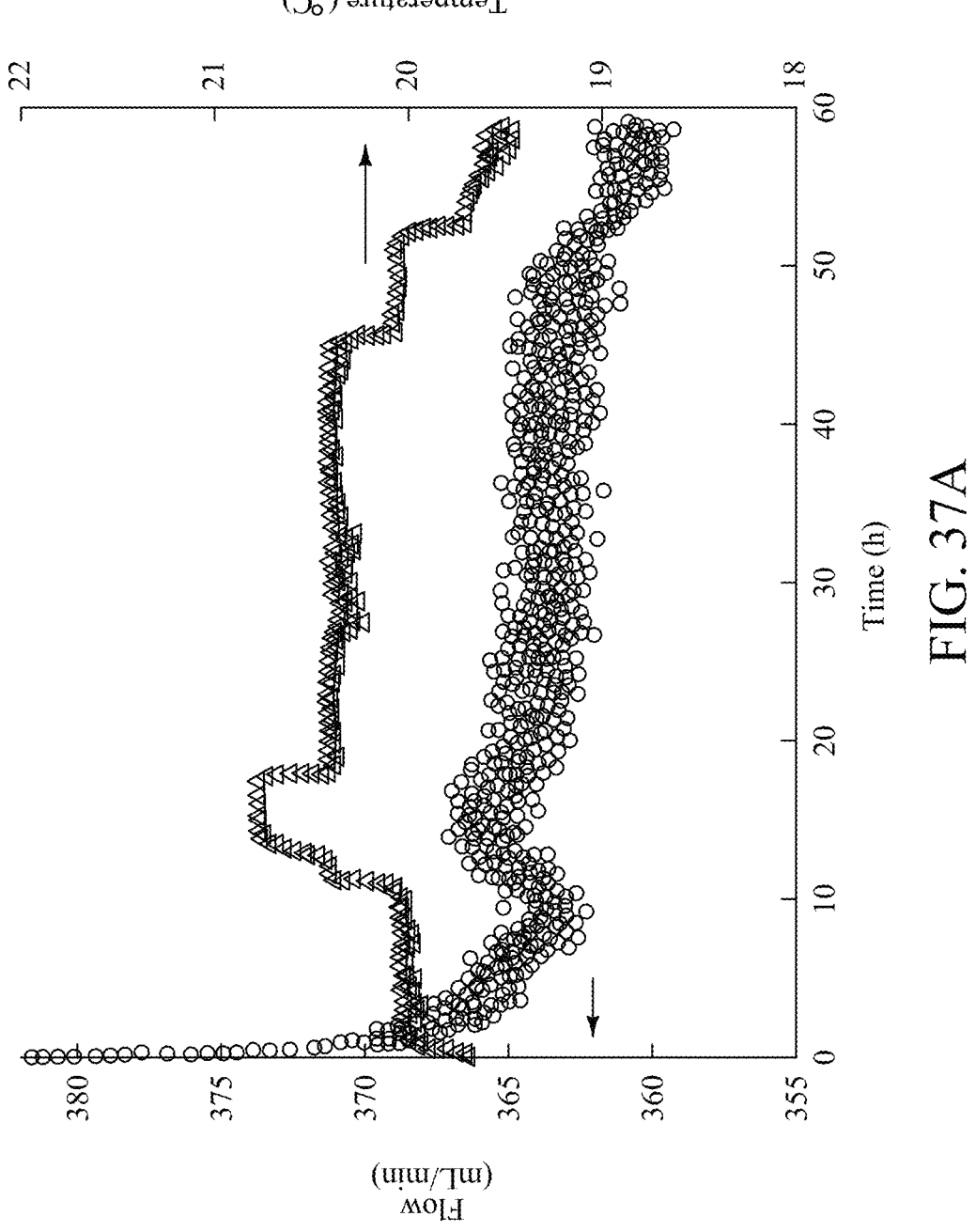
FIGS. 37A-37B represent data acquired utilizing separator assemblies according to an embodiment of the disclosure.
Figure 37B:
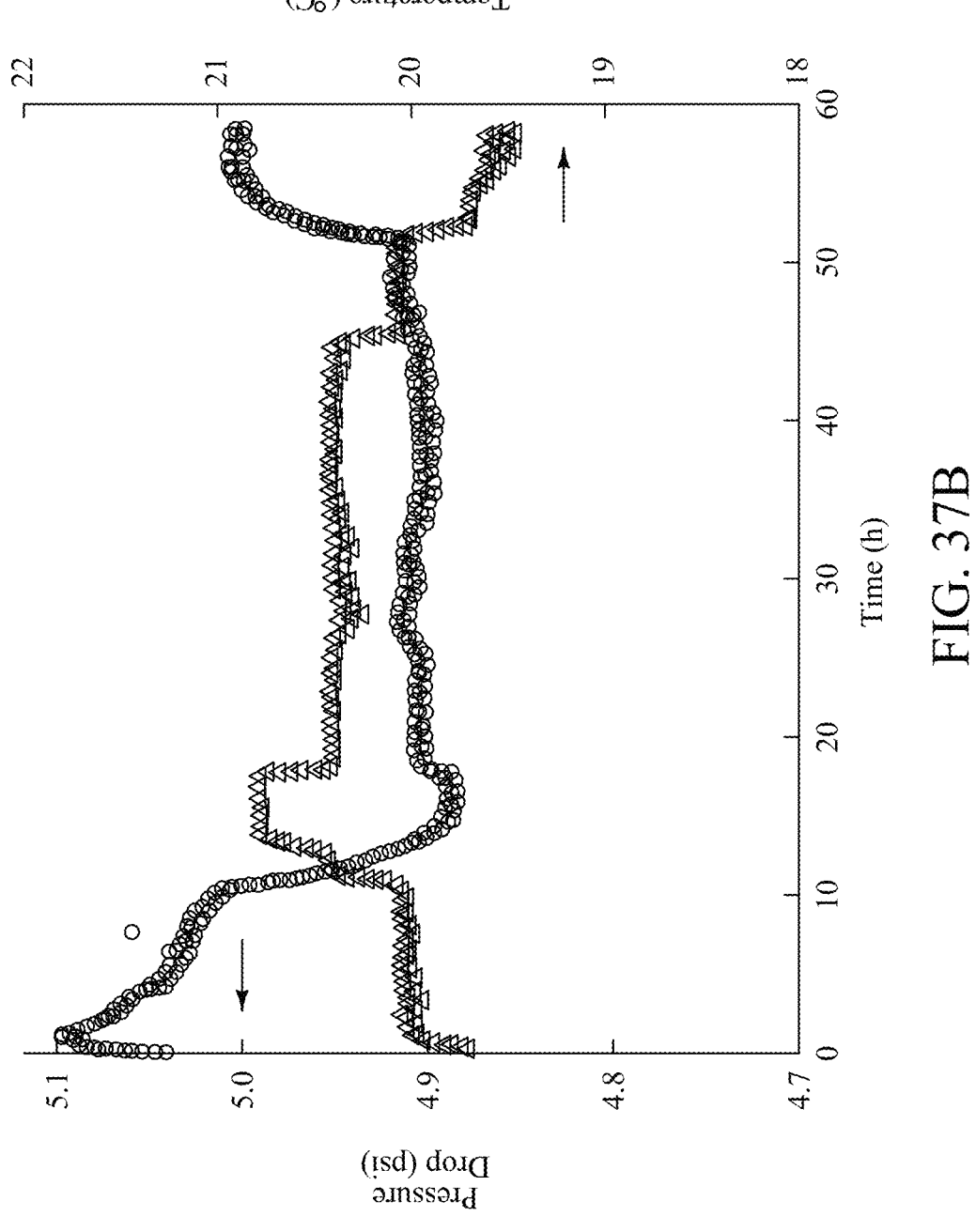

Like some chemical simulants, the extent of particle attraction between the metal of the MFS and the simulant particles may be temperature sensitive. To the extent that the DLVO (Derjaquin-Landau-Verwey-Overbeek) theory which describes van der Waals forces and electrostatic forces applies, both the lumped van der Waals force and electrostatic force are modestly temperature dependent as is the drag force acting on attached particles through viscosity. The net result of these temperature sensitivities is shown in FIGS. 37A-B. After the exponential drop in flowrate, as the temperature goes up the flowrate goes up and as the temperature drops, the flowrate drops. The pressure is similarly dependent on the temperature as the pressure goes down when the flowrates up. These variations contribute to the uncertain predictions of pressure drop decreases over time for the S-salt cake at 160 ppm, though other conditions appear to be less sensitive and the variations are quite small. Like many industrial environments, the temperature is checked and adjusted manually (e.g., bang-bang control) as necessary but not necessary finely tuned with advanced temperature control systems. Please note that the temperature differences are subtle but influential as temperature spans of under 2° C. appear to affect small variations in the profiles.

Although the express lane occupies a minority of the cross section of flow, nearly half of the flow exits out the express lane. For the salt cake simulant over a range of flowrates from 361-424 mL/min, flow through the permeate captured only 60.2±0.6% (1σ) of the entering flow. For the FePO$_4$ simulant over a range of flowrates from 426-448 mL/min, flow through the permeate captured only 60.6±0.7% (1σ) of the entering flow. In both cases, no clear trend in flowrate split versus flowrate was observed, and the flow exiting through the permeate line was much less than would have been suggested by the cross sectional area alone. The flowrate split is independent of concentration at these relatively modest concentrations (160-1000 ppm).

For these conditions, the entering Reynolds number based on the hydraulic diameter ranges over 162-202, well within the laminar inertial flow regime. The corresponding gap Reynolds number spans 21-25. They show that the critical diameter drops to 80-85% of that of creep flow, so that a critical diameter of 20 μm based on creep flow conditions would be expected to fall to ~16-17 μm, within the nominal Mott grade 5 and grade 20 bound.

Figure 38:
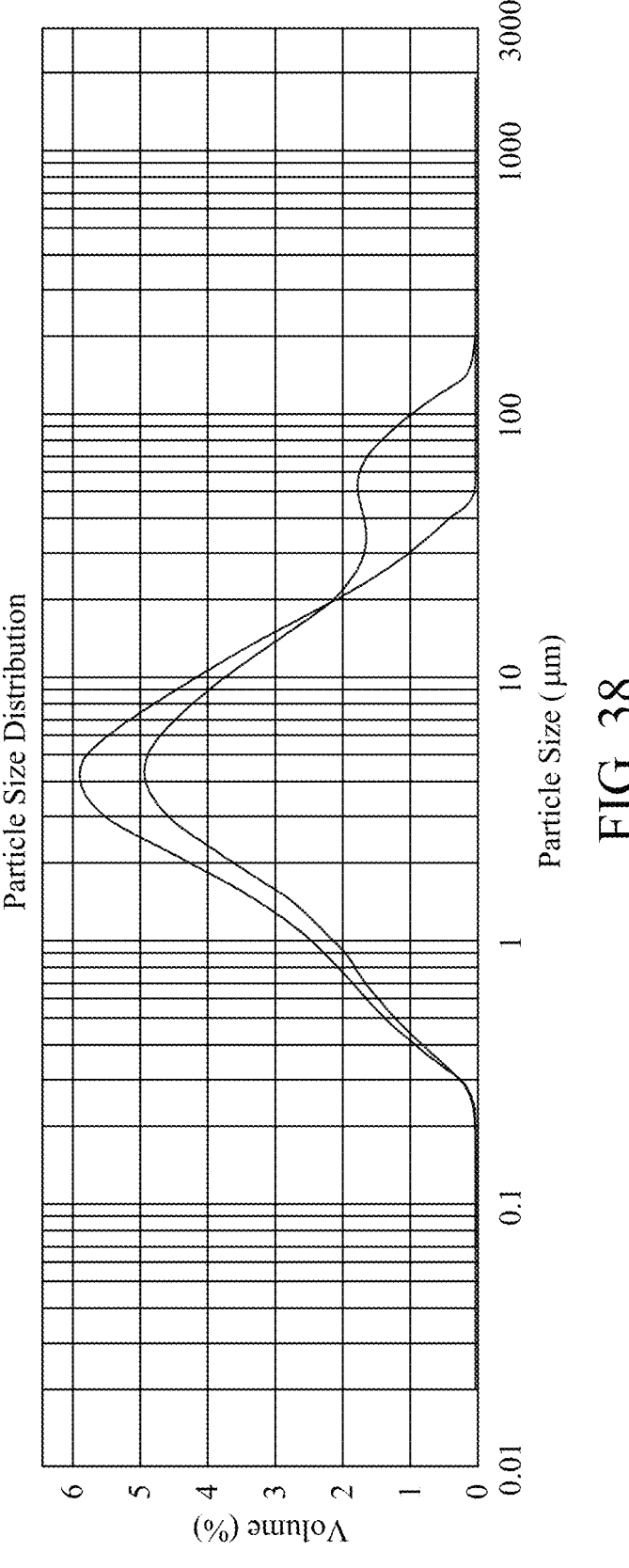
FIG. 38 represents data acquired utilizing separator assemblies according to an embodiment of the disclosure.

To further evaluate separator performance, FIG. 38 compares the particle size distributions for express lane and inlet and outlet compositions. The distributions are similar (perhaps with rescaling) for sizes below 10 μm. However, above 10 μm, the express lane distribution has a shoulder from ~20-130 μm. This shoulder is completely absent in permeate distributions, indicating that the separation does indeed become effective around 16-17 μm as suggested above.

Figure 39:
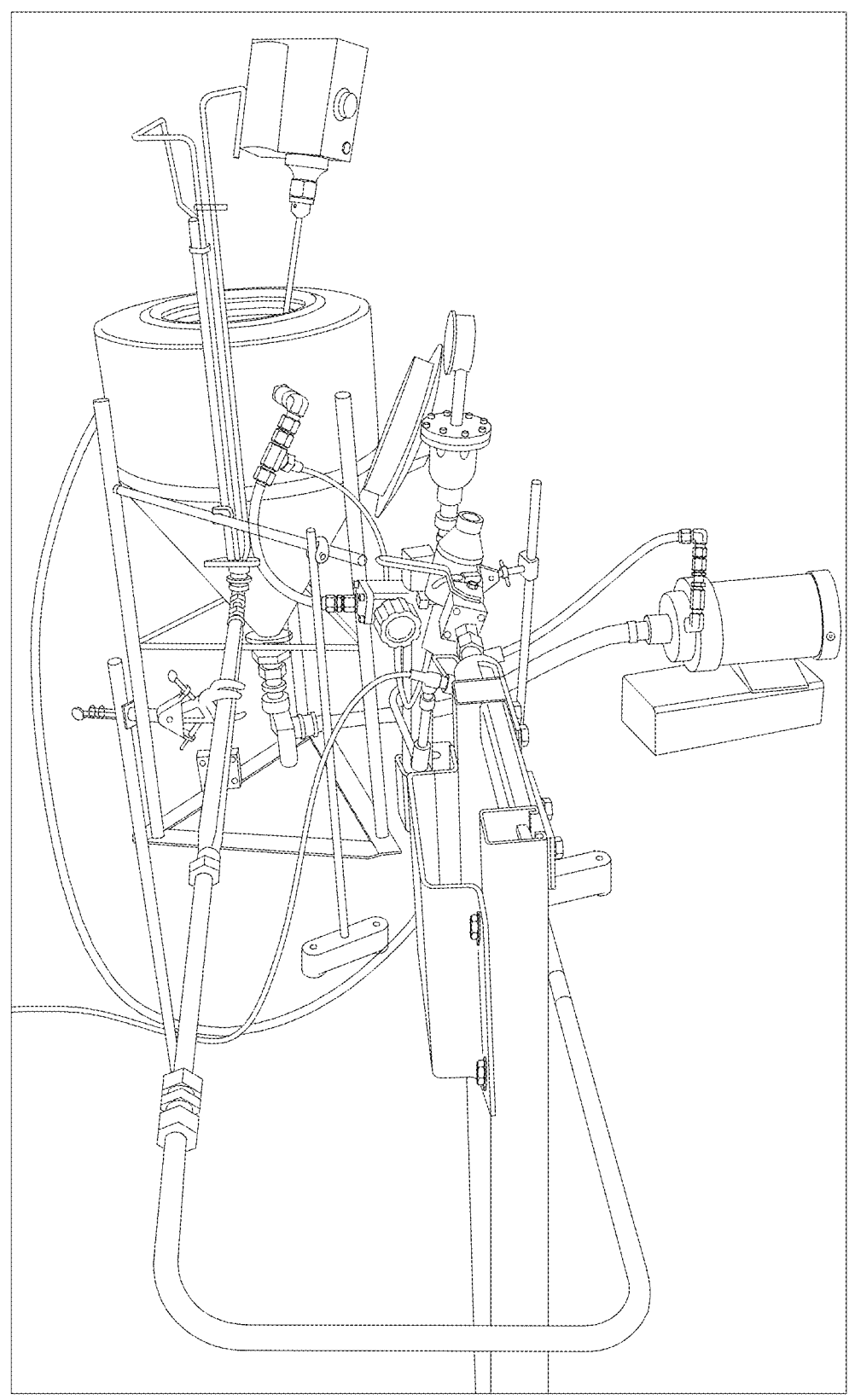
FIG. 39 is a slurry processing system equipped with a separation assembly and configured to provide a clockwise flow according to an embodiment of the disclosure.
Figure 40A:
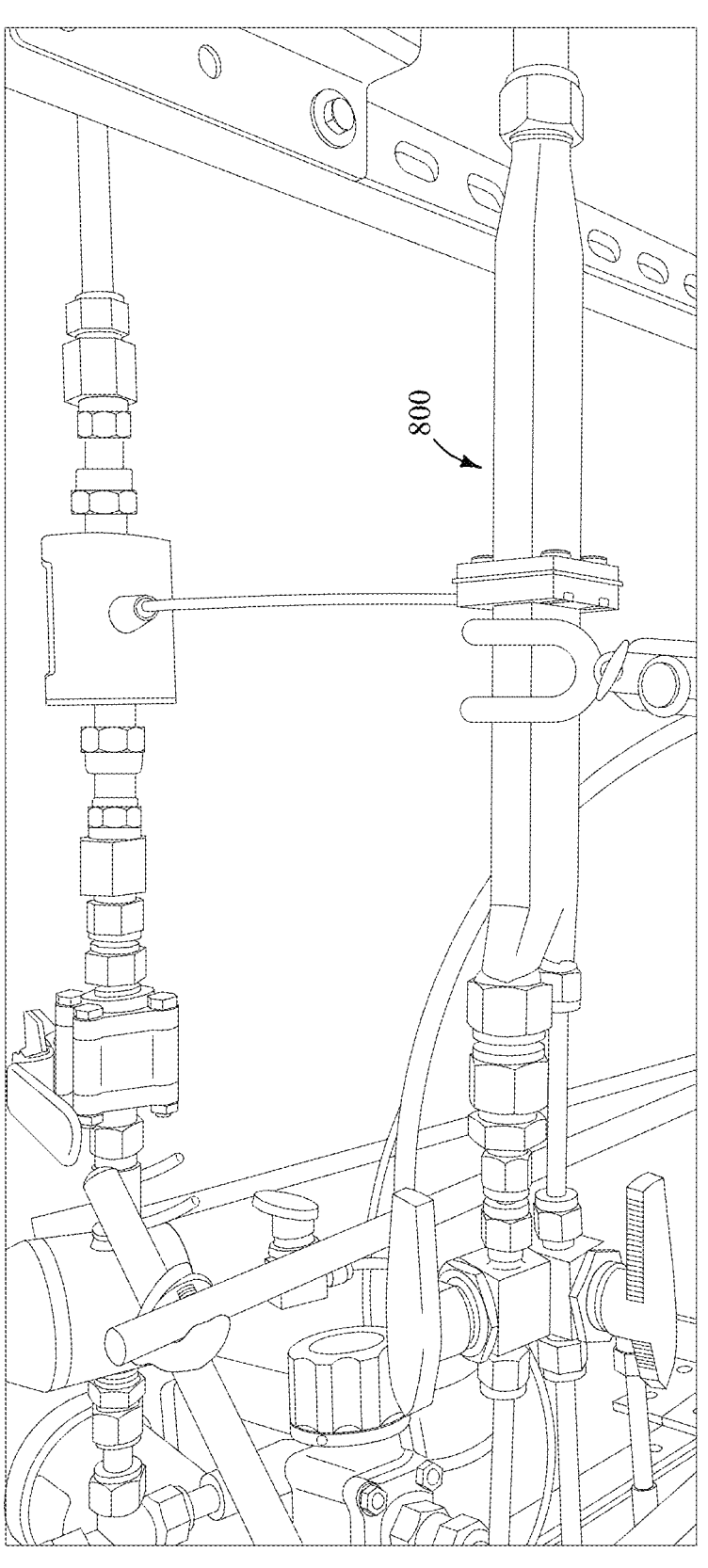
FIG. 40A depicts a mesofluidic assembly as part of the system of FIG. 39 configured for non-Newtonian slurry separation installed in a test loop with flow from right to left with a 10 pin repeat. The permeate outlet is above the express lane outlet at the left of the figure.
Figure 40B:
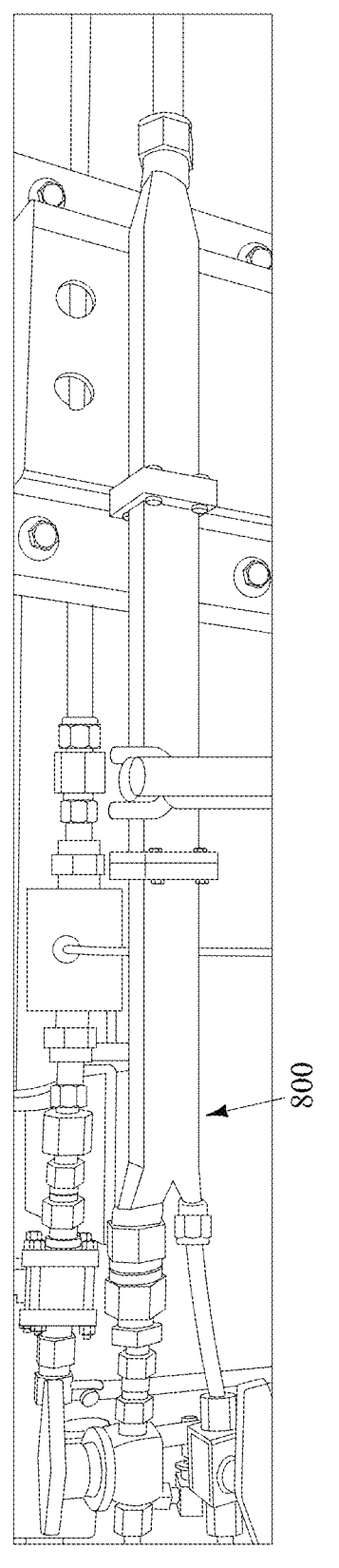
FIG. 40B depicts a mesofluidic assembly as part of the system of FIG. 39 configured for non-Newtonian slurry installed in a test loop with flow from right to left with a 20 pin repeat. The permeate outlet is above the express lane outlet at the left of the figure.

An example in line configuration of a separation assembly is shown in FIG. 39. As shown in FIG. 40A, the in-line configuration includes the 10 pin assembly. As shown in FIG. 40B, the in-line configuration includes the 20 pin assembly which is longer than the 10 pin assembly. Each assembly has the same cross-sectional area and fittings.

As an example, the 20 pin assembly was evaluated first followed by the 10 pin assembly. Samples were extracted at each flowrate shown in FIG. 41 and evaluated with no slurry addition to replace that from removed samples. The bulk density of the slurry laden with solids was measured to be 1.231±0.027 g/mL. (P) represents permeate, and (EL) represents express lane.

Figure 41:
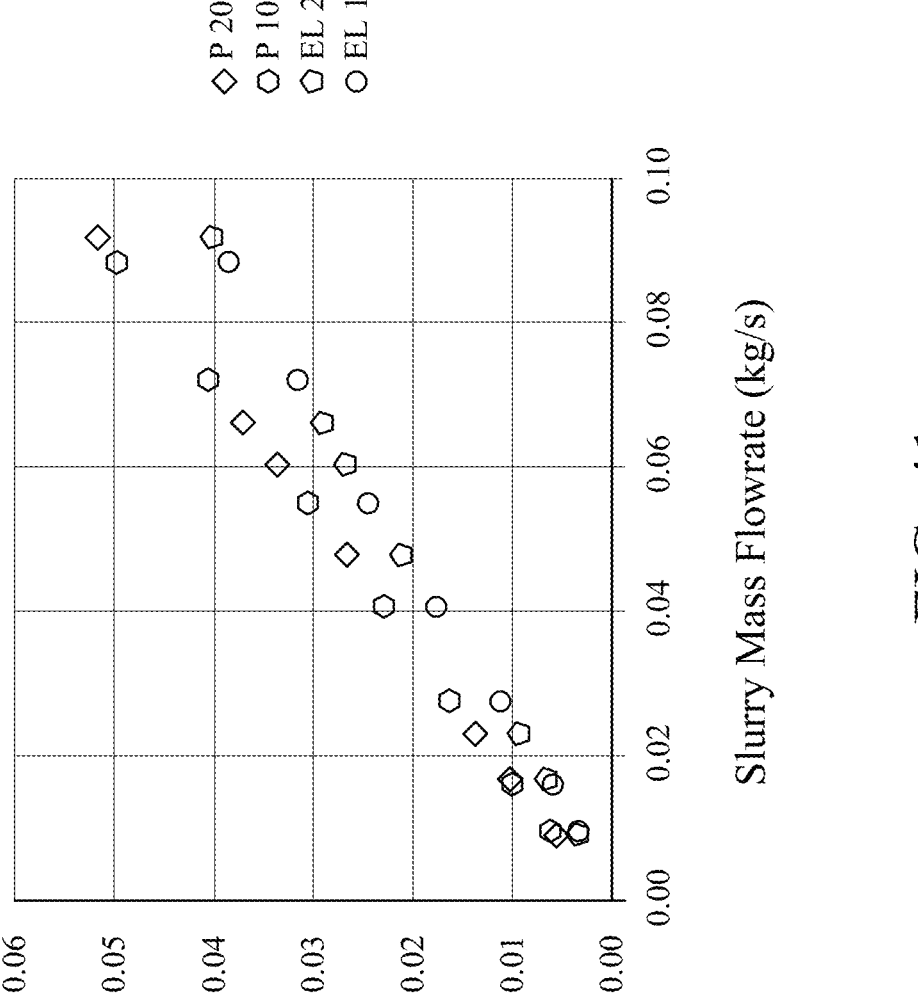
FIG. 41 depicts data for the slurry flow split between permeate (P) and express lane (EL) for the 20 pin (20) and 10 pin (10) assemblies showing permeate (P) and express lane (EL) as a function of total slurry mass flowrate acquired using assemblies and/or methods according to an embodiment of the disclosure.
Figure 42:
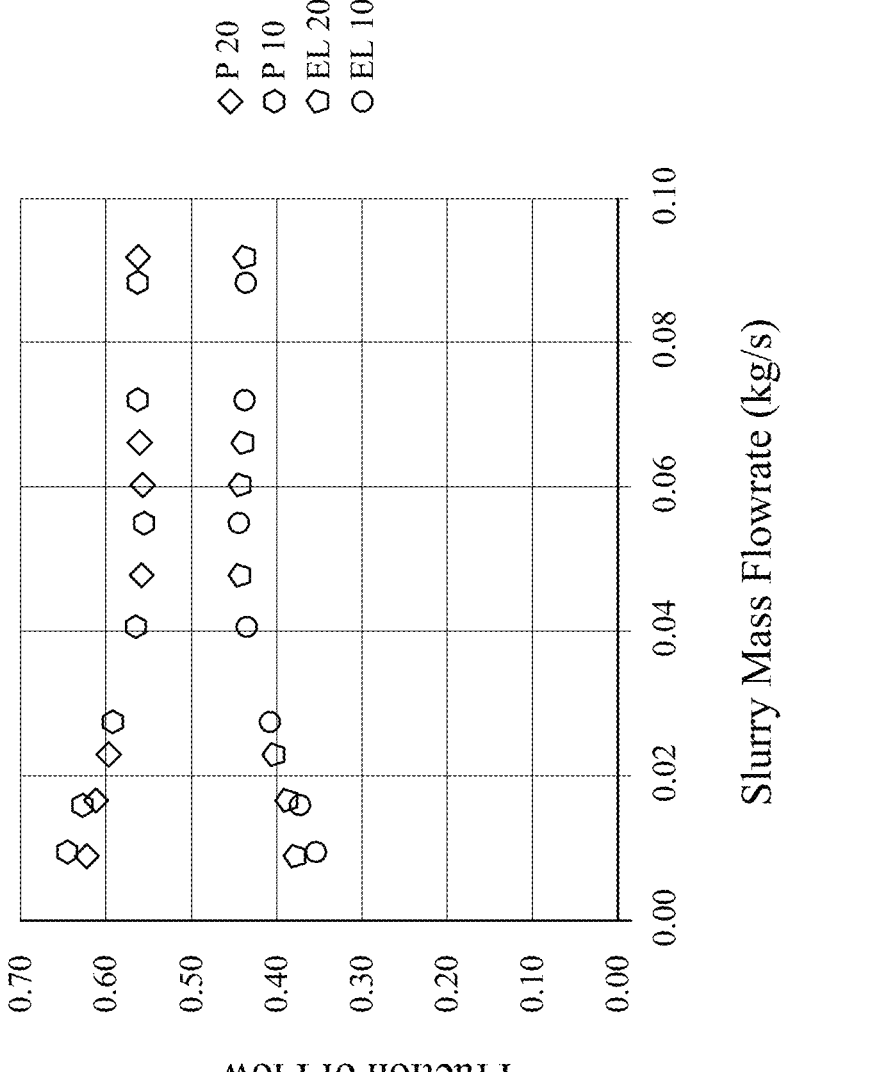
FIG. 42 depicts data for the fraction of slurry exiting permeate (P) and express lane (EL) as a function of total slurry mass flowrate acquired using assemblies and/or methods according to an embodiment of the disclosure.

In accordance with the above configurations, runs were conducted at seven feed flowrates as shown in FIG. 41. The data of FIG. 42 can be construed to indicate that more slurry exited via the permeate than via the express lane with a higher fraction at lower flowrates.

Figure 43:
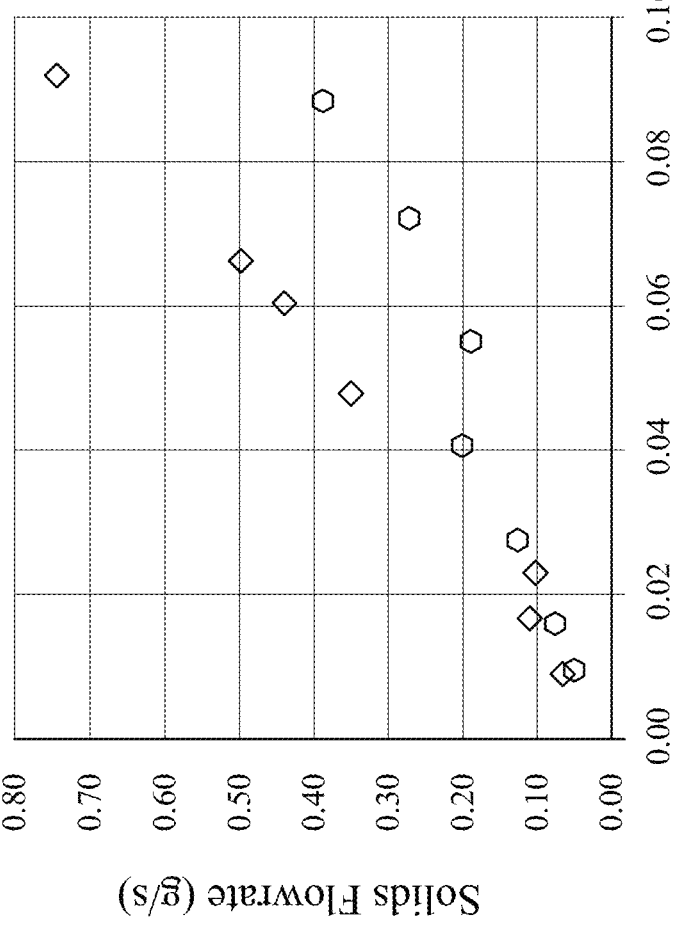
FIG. 43 depicts data for the total solids flowrate per test in 20 pin (Total 20) and 10 pin (Total 10) assemblies compared to mass flowrate showing the total solids flowrate as a function of the total slurry mass flowrate acquired using assemblies and/or methods according to an embodiment of the disclosure.

In FIG. 43, the total solids flowrate per test is plotted for the 20 pin and 10 pin devices, where the large particles in Table 3 are termed solids in contrast to the Kaolin and Bentonite clay that is the carrier fluid. Where not indicated otherwise, solids can be considered the combination of all three particle sizes. The solids flow in both devices increases approximately linearly with some experimental scatter.

Figure 44:
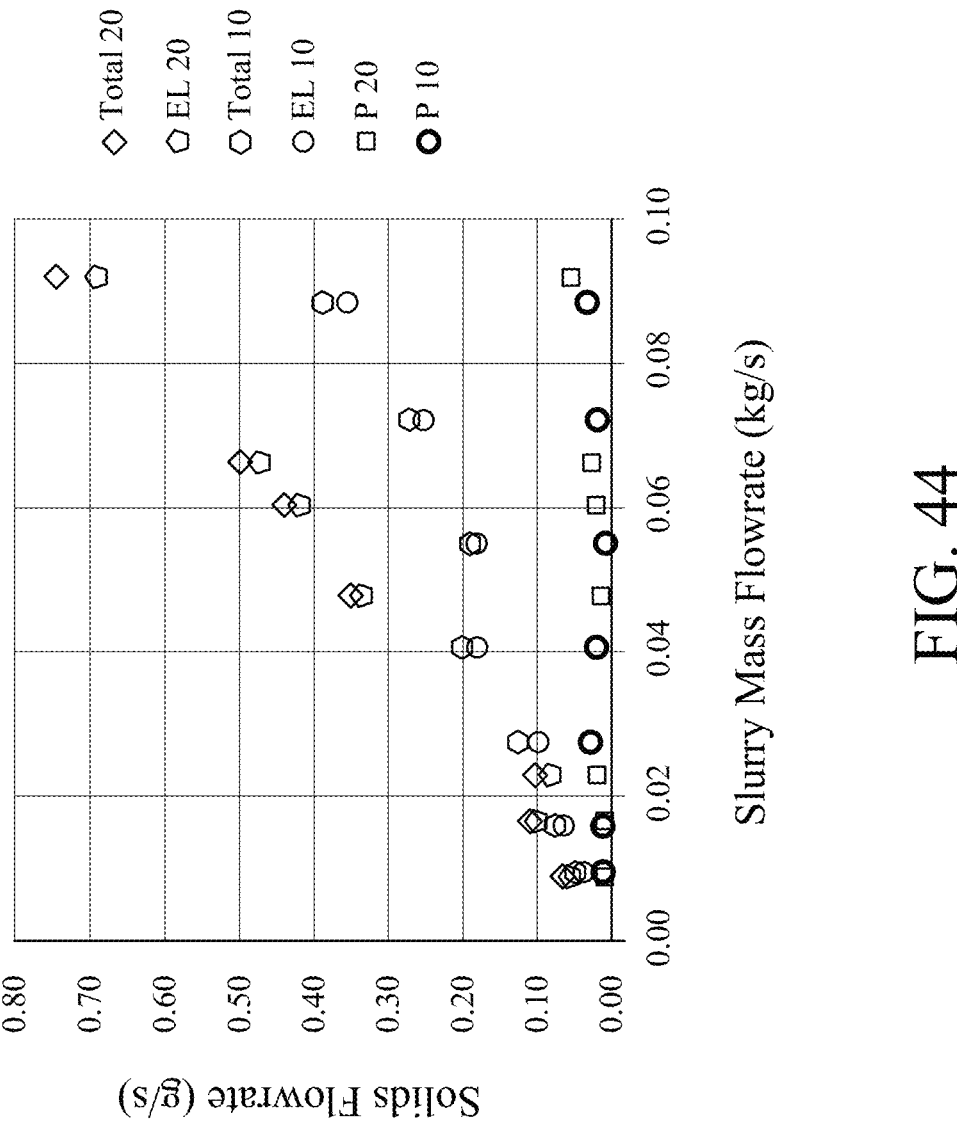
FIG. 44 depicts data for solids flowrate per test in 20 pin and 10 pin assemblies compared to total mass flowrate showing total, express lane (EL) and permeate (P) flowrates for each assembly (20 and 10) as a function of total slurry mass flowrate acquired using assemblies and/or methods according to an embodiment of the disclosure.

In FIG. 44 the total solids flowrate as well as the express lane (EL) and permeate (P) solids flowrates are plotted. As shown, the majority of the solids exit via the express lane.

Figure 45:
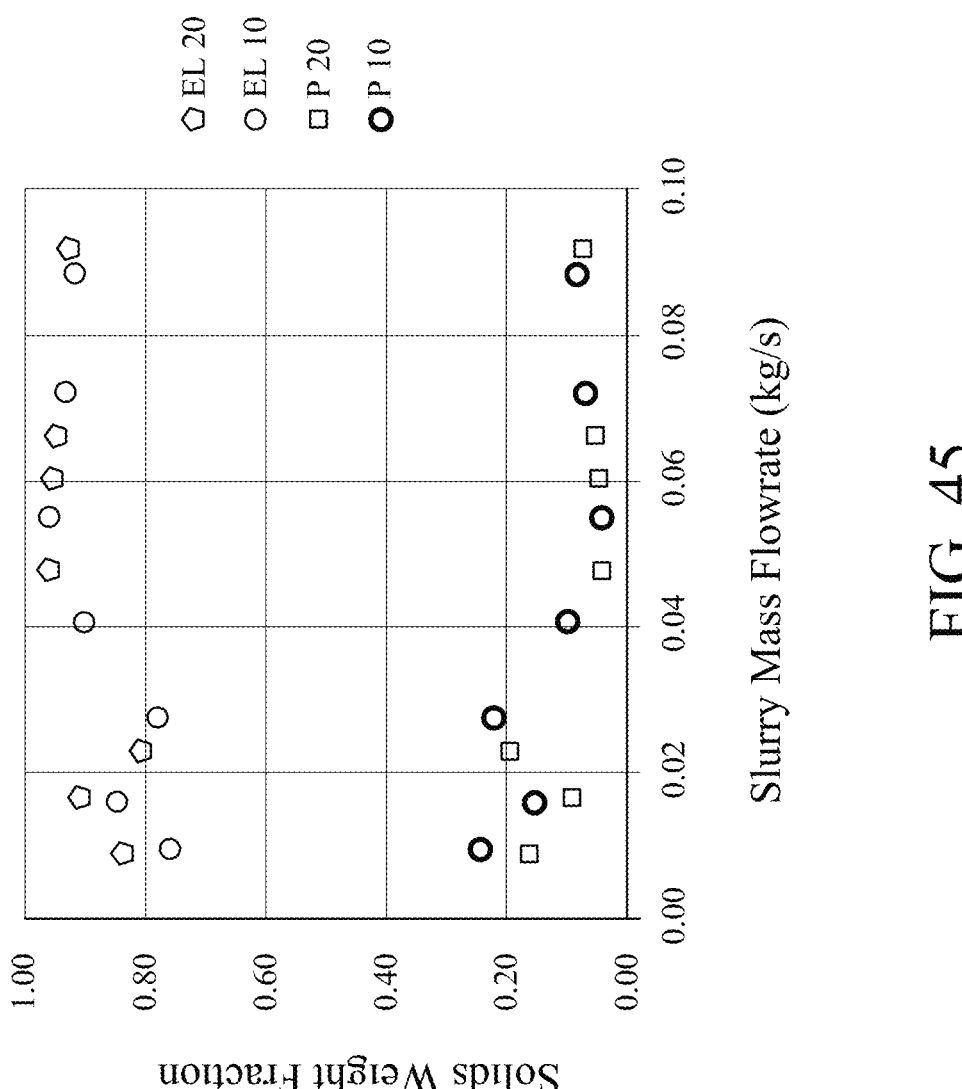
FIG. 45 depicts data for solids weight fraction in 20 pin and 10 pin assemblies compared to total mass flowrate showing exiting weight fractions for express lane (EL 20 and EL 10) and permeate (P 20 and P 10) as a function of total slurry mass flowrate acquired using assemblies and/or methods according to an embodiment of the disclosure.

In FIG. 45, the solids weight fraction for express lane and permeate are plotted as a function of slurry mass flowrate. At higher flowrates, greater than 90% of the solids exit via the express lane.

In FIGS. 46A and 46B, the solids flowrate through the express lane (EL) is plotted versus the slurry mass flowrate for each of the three particle sizes listed in Table 3 and shown in the legend of the plot. Data from the 20 pin array tests are shown in FIG. 46A (EL 20); data from the 10 pin array tests are shown in FIG. 46B (EL 10). The largest size fraction had the largest contribution for both FIGS. 46A and 46B, and for the 20-pin array the smallest size fraction had the smallest contribution. For the 10-pin array the two smaller particle size fractions were of similar magnitudes for some test conditions.

Figure 47A:
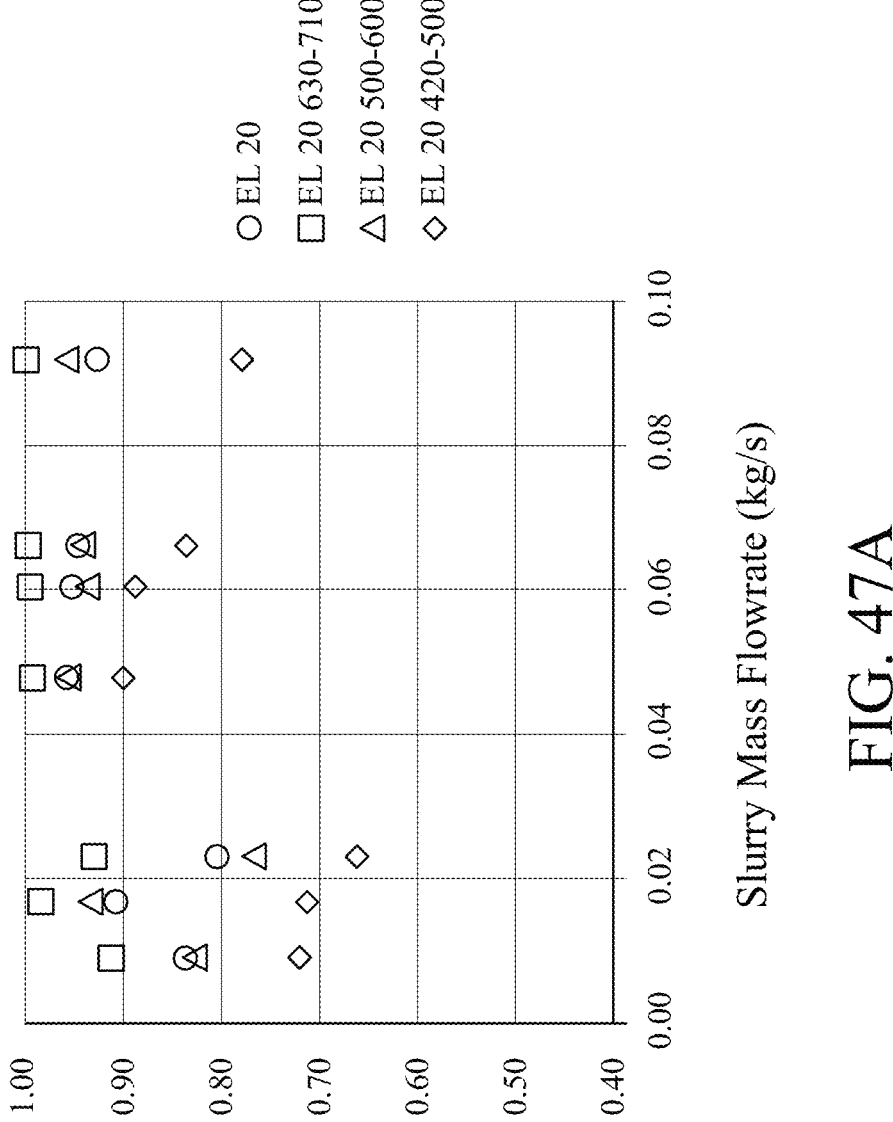
FIG. 47A depicts data for fraction of solids exiting express lane for each particle in test of 20 pin assemblies showing solids fraction in the express lane solids flowrate (EL 20) and data for each of the three glass beads as a function of total slurry mass flowrate acquired using assemblies and/or methods according to an embodiment of the disclosure.
Figure 47B:
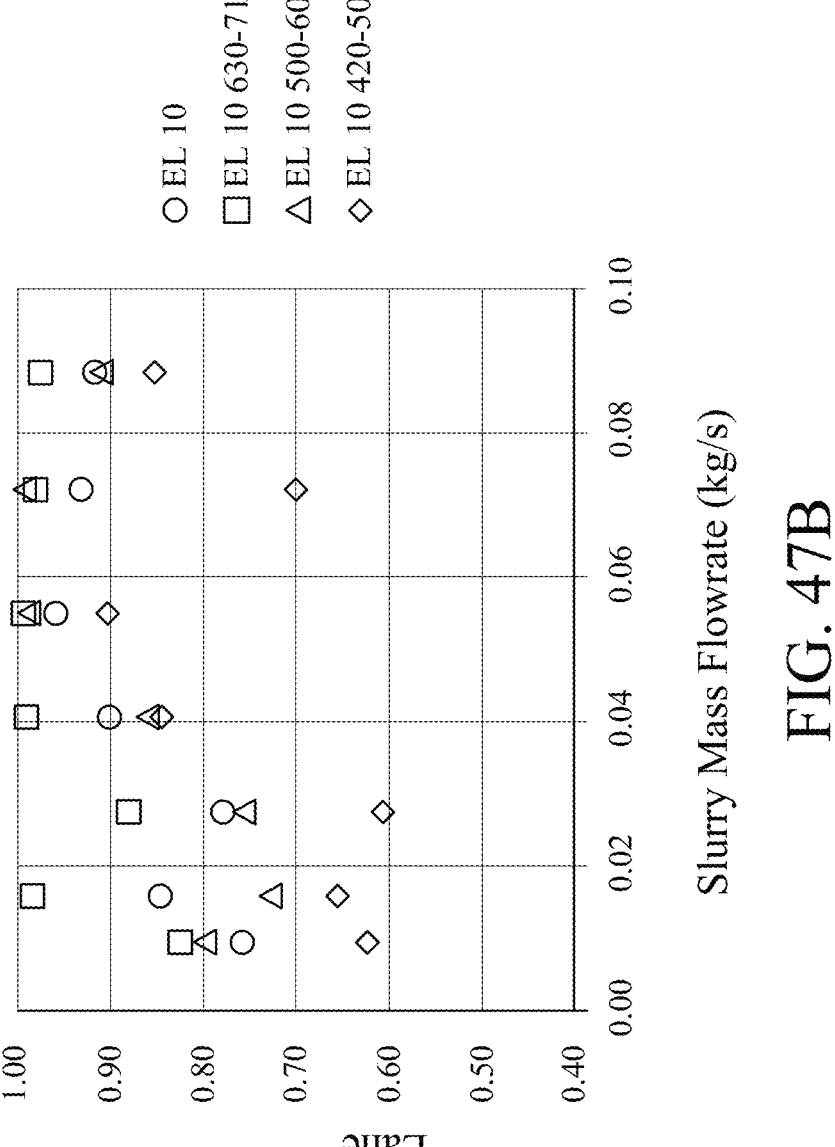
FIG. 47B depicts data for fraction of solids exiting express lane for each particle in test of 10 pin assemblies showing solids fraction in the express lane solids flowrate (EL 10) and data for each of the three glass beads as a function of total slurry mass flowrate acquired using assemblies and/or methods according to an embodiment of the disclosure.

In FIGS. 47A and 47B, the solids fraction of feed slurry in the express lane is plotted versus the slurry feed mass flowrate for each of the three particle sizes. Data from the 20 pin array tests are shown in FIG. 47A (EL 20); data from the 10 pin array tests are shown in FIG. 47B (EL 10). For both configurations, the solids fraction of largest particles was above 0.9 for most tests; the medium particles were of intermediate values and the smallest particles were as low as 0.6 for lower flowrates. The particle separation for the larger particles was better than for the smaller particles for both arrays. In general, the particle separation of the 20 pin array was somewhat better than the particle separation of the 10 pin array.

Figure 48A:
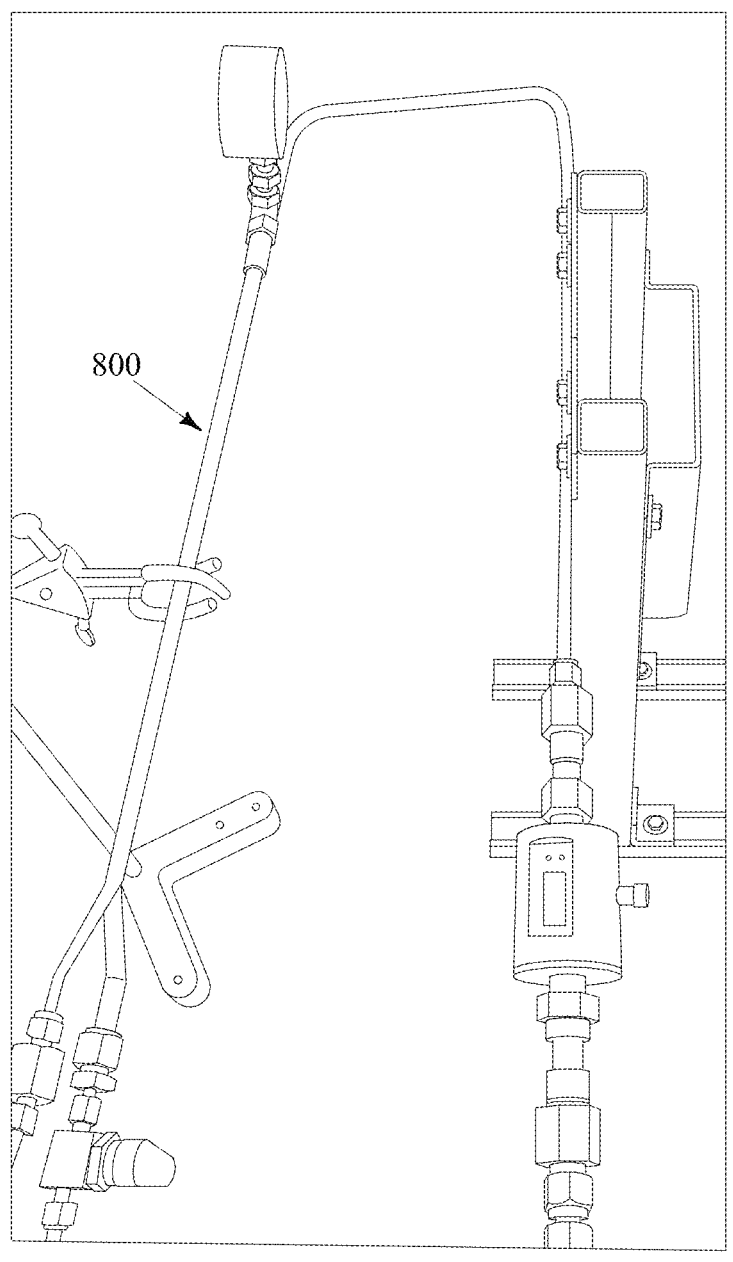
FIG. 48A is a mesofluidic separator assembly as part of a system configuration showing express lane exit on left of the figure and permeate exit on right of Y split configured according to an embodiment of the disclosure.

At least one implementation can include a metal meso-fluidic separator assembly 800 as shown in FIG. 48A. The assembly can be configured as a 0.51 m long assembly having a 10.92 mm outer diameter and a 6.30 mm square cross section channel that runs the length of the assembly. Internally, the assembly can contain ~5300 circular posts of diameter 500 μm; center-to-center spacing within each row and from row to row is 800 μm, and post offset from row to row is 10 μm. The approximate porosity of this array configuration is 70%. See FIG. 48B for a representative image of at least one configuration of the assembly configured to receive mixtures and separate same.

In accordance with example implementations, methods for size separating a dispersed fluid phase from a continuous fluid phase are provided. The methods can include providing a continuous fluid having dispersed fluid bodies (e.g., fluid particles or droplets) of at least two sizes into a conduit having a plurality members; and arranging the members to direct the smaller of the two sizes of dispersed fluid bodies through the plurality of members while maintaining a substantially linear path, and to direct the larger of the two sizes of fluid bodies through the plurality of members in a substantially non-linear path.

In accordance with another implementation, the mesofluidic separator assemblies can have posts therein that do not extend completely between opposing walls of the assembly conduit. This configuration can provide for a lower pressure drop.

An example, mesofluidic separator assembly can include: at least a pair of supports configured to extend lengthwise and within to a pressure differential axis; and at least one level of a plurality of members extending at least partially between the pair of supports.

Instrumentation is listed in Table 9. Slurry flows clockwise in the loop; grab samples are collected simultaneously from the express lane and permeate using 50 mL centrifuge tubes as flow enters the mixing vessel using a digital stopwatch. The mass of each sample was measured after the test. Solids of each type were separated by wet sieving; then they were captured, dried, and weighed.

TABLE 9

| INSTRUMENTATION | |
| --- | --- |
| Instrument | Model |
| Pump | Dayton stainless steel centrifugal pump Model PPT05014GGG |
| Pressure | Digital pressure gauge (SSI Technologies, Inc. MediaGauge ™ MG-200-A-9V-R) pressure transducer |
| Flow | Magnetic-inductive flow meter (Ifm electronic magnetic-inductive flow meter SM6001) |
| Temperature in mix tank | Hand held thermocouple and reader (FLUKE 51-2B, type K thermocouple) |
| Sample time | Digital stopwatch |
| Sample mass | Mettler PM2500 Delta Range ® |
| Overhead stirrer | RW16 basic IKA ® WERKE |

In accordance with example configurations, these mesofluidic separator assemblies and/or methods can be used for removing solids from slurries with non-Newtonian rheology. Separation of 90% was achieved for the largest particles tested over the range of flowrates tested for both devices. Other sizes also achieved separation.

In accordance with another example implementation, mesofluidic separation assemblies and methods were applied for flowing two-phase (oil/water) mixtures. Accordingly, an example mixture for separation included oil with water as the carrier fluid, and separation was achieved over a range of oil-water concentrations. In accordance with another application of the present disclosure, oil-water mixtures can be separated at flows on the order of liters per minute (L/min).

The separator assemblies and/or methods of the present disclosure can be used to separate multiphase mixtures such as oil and water. Oil-water mixtures can be separated at flowrates of ~1-2 L/min at a range of concentrations from 2-11 wt % oil in water.

Again with reference to FIGS. 18A-18B and FIG. 20, in accordance with at least one embodiment, mixture flow the mesofluidic separator assembly and flows through the internal array where posts separate oil droplets from water with the oil droplets migrating around the posts of the array and exit via the express lane; and the water following the streamlines and exiting via the permeate.

An example two component water-oil mixture that included room temperature tap water with no additives and a mineral oil was provided. The mineral oil selected was Cannon Instrument Company Viscosity Standard S60. Fluid properties of S60 at 20° C. are a viscosity of 150.8 m·Pas and a density of 0.8678 g/mL and at 25° C. are a viscosity of 110.3 m·Pas and a density of 0.8647 g/mL. Mineral oil addition to the mixing vessel is shown in FIG. 49A. The oil was dispersed into droplets by circulation through the pump and the mixture is shown in FIG. 49B. Return flow through the sampling lines is visible in both FIGS. 49A and 49B as a bypass line flow that enters the mixing vessel along the side of the vessel.

Figure 48B:
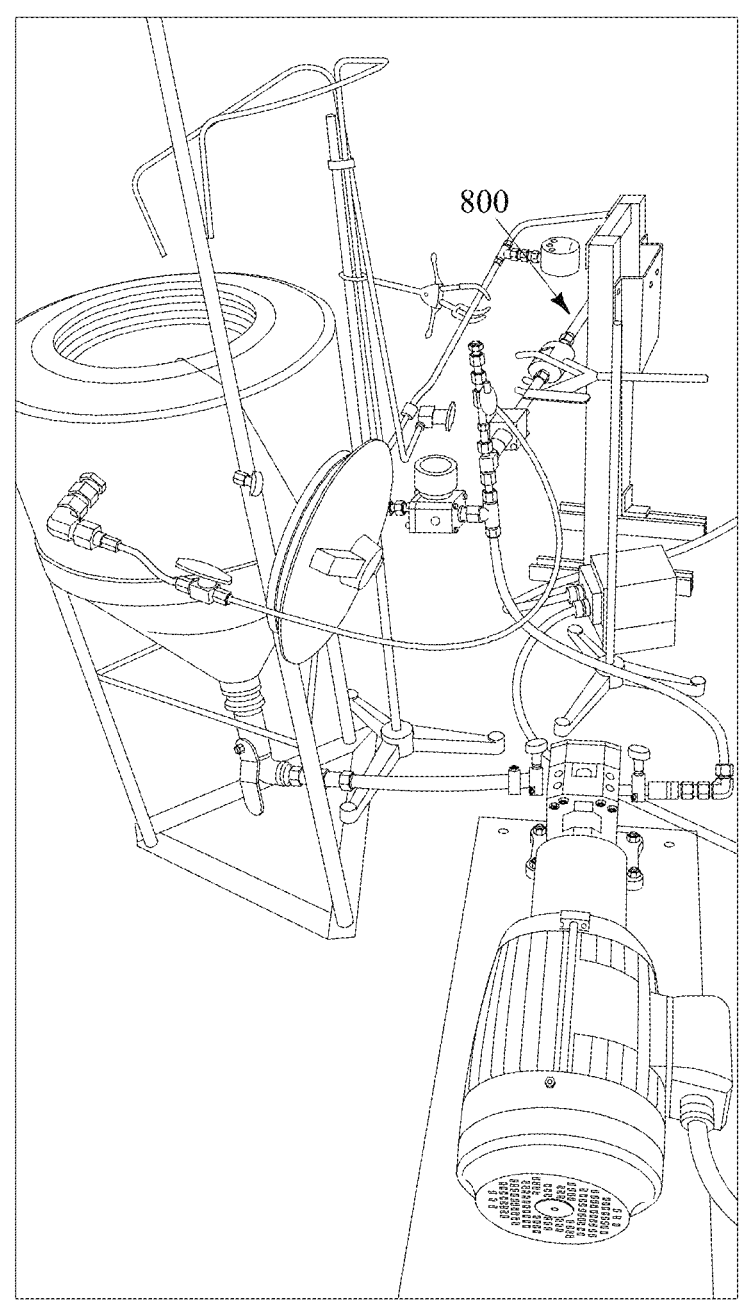
FIG. 48B is a mesofluidic separator assembly as part of a system flow loop configuration showing instrumentation and pump according to an embodiment of the disclosure.

The test loop components and instrumentation are shown in FIG. 48B and are listed in Table 10.

TABLE 10

| INSTRUMENTATION | |
| --- | --- |
| Instrument | Model |
| Pump | Hydracell pump (model no. P400NSXSS0 07 S, serial no. 435292) with a Griffco Valve Inc. pulsation dampener (PD0013NV53, serial # 5005322) |
| Pressure | Digital pressure gauge (SSI Technologies, Inc. MediaGauge ™ MG-200-A-9V-R) pressure transducer |
| Flow | Magnetic-inductive flow meter (Ifm electronic magnetic-inductive flow meter SM6001) |
| Temperature | In mix tank: hand held thermocouple (FLUKE 51-2B) |
| Sample time | Digital stopwatch |
| Liquid mass | Mettler PM2500 Delta Range ® |

Figure 50:
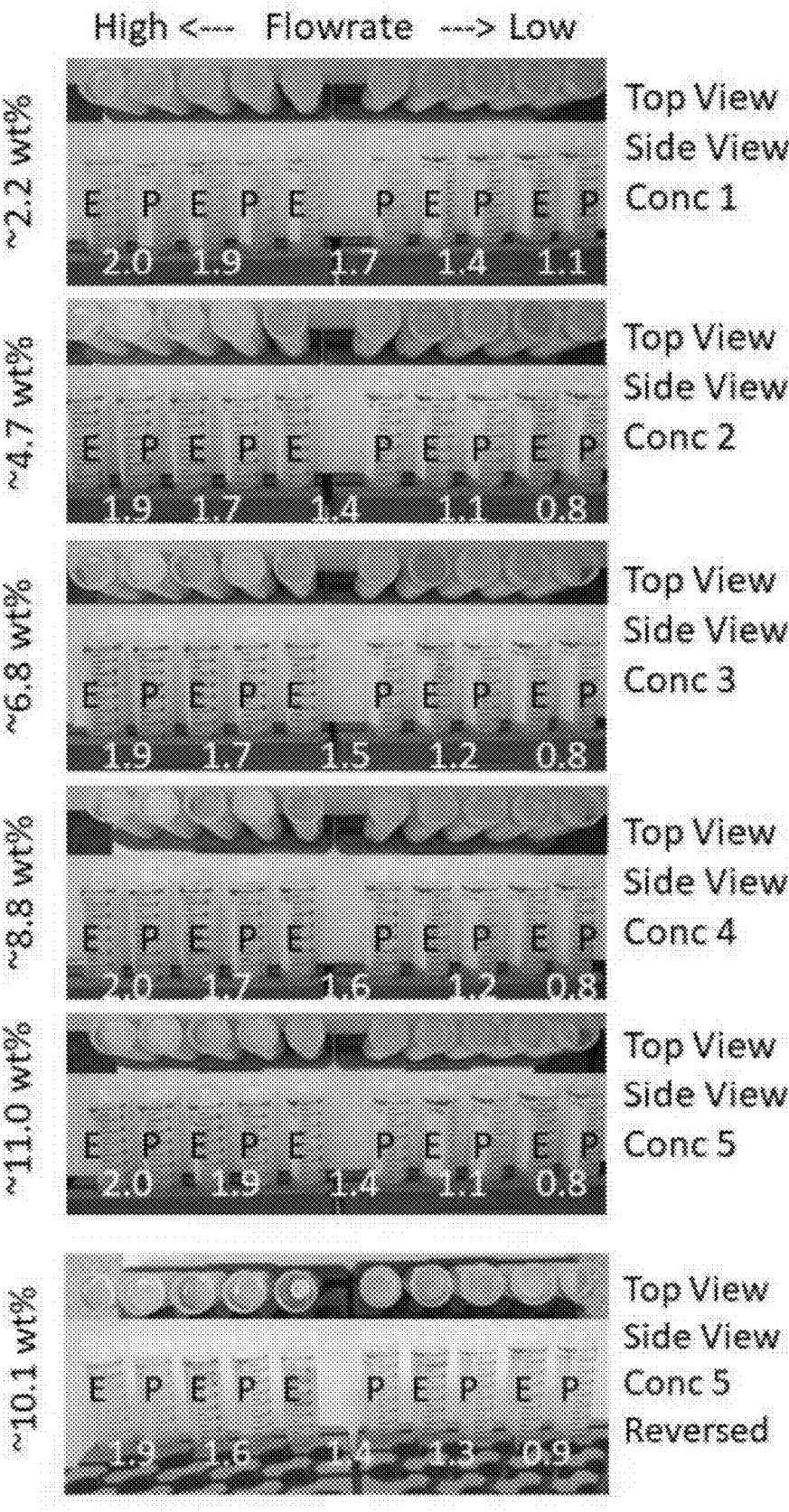
FIG. 50 depicts samples and data acquired across flowrates and oil concentrations, with approximate flowrate in L/min shown in white font for each E-P tube pair according to embodiments of the disclosure.

For this example, five different nominal concentrations mixtures and a range of decreasing flowrates at each nominal concentration were provided through the system. Samples were obtained by capturing flow from the express lane and permeate lane (see FIGS. 49A-49B, and 50) simultaneously into two 50 mL centrifuge tubes. Following the test at the highest concentration, the mesofluidic assembly was rotated 180 degrees to evaluate the effect of tube orientation. At each nominal concentration, the first sample set was obtained at the highest flowrate; the flowrate decreased incrementally for samples 2 through 5. After the fifth sample, additional water was added to replace the fluid volume captured in the centrifuge tubes and additional oil was added to increase the concentration of oil. Photos of the sample tubes from each of the tests are shown in FIG. 50. Each tube is labeled E for express lane or P for permeate. The values below each E-P pair show the flowrate in L/min. The average concentration for the five sample pairs is shown to the left (~wt %). Due to sample extraction, the concentration varied slightly for each sequential pair.

After samples were obtained, the centrifuge tubes were capped. Measurements obtained included sample mass and volume of water and oil. These volumes were obtained from the scale scribed on the centrifuge tubes. The concentration (~wt %) shown in FIG. 50 is the average value for the five tests at each concentration. The assemblies and methods can separate oil (e.g., mineral oil) from water at flows on the order of liters per minute.

The photos in FIG. 50 show that across a wide range of flowrates and initial oil concentrations the height of the oil layer in the express lane sample is thicker than the oil layer in the permeate sample. In each panel of FIG. 50, a side view is shown for each tube with a top view of the same vials immediately above. The consistency in each express lane sample having significantly more oil than from the permeate is remarkable. This result indicates indeed that this device can separate oil droplets in water.

Figure 51:
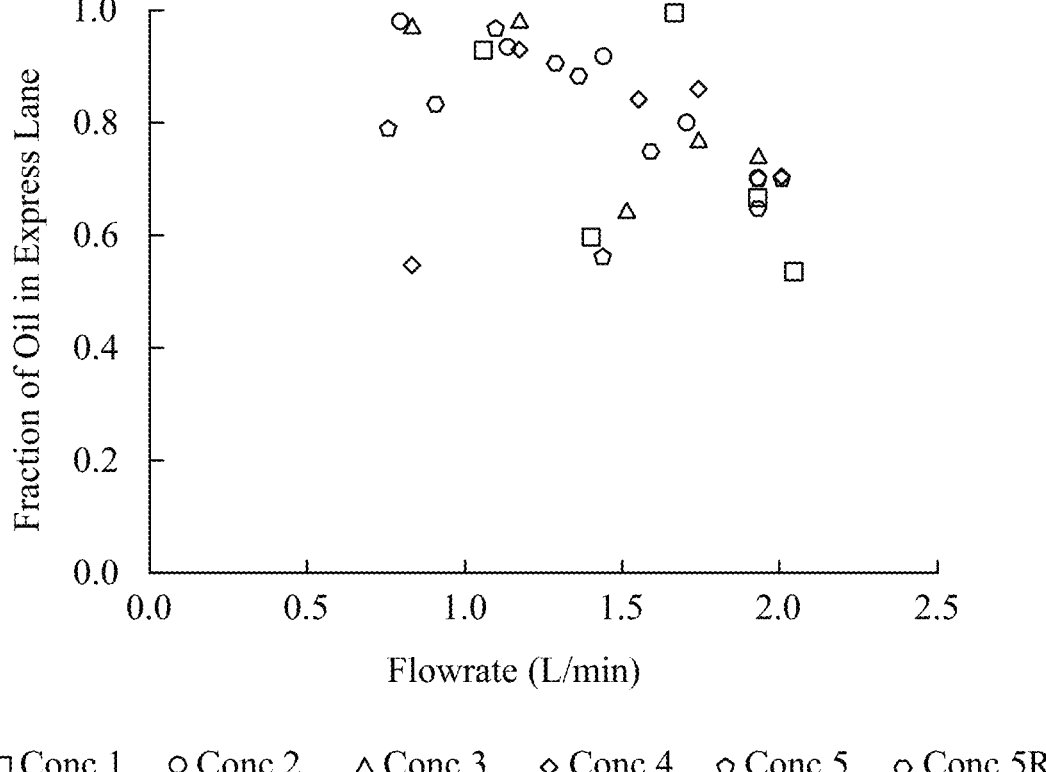
FIG. 51 depicts data showing fraction of oil in express lane as a function of flowrate for average concentration as depicted in FIG. 48B.

The flowrates of 0.20-0.54 gpm (0.8-2.0 L/min) are significant. FIG. 51 shows that despite some scatter that the amount of oil that partitions to the express lane starts high and then generally decreases at higher flowrates regardless of device orientation. A preponderance of the data at the lower flowrates indicates ninety plus percent of the oil comes out the express lane rather than the permeate channel, albeit with notable scatter. In accordance with additional implementations, the assemblies can be sequentially ordered in series to improve the separation. Higher flowrates may be achieved either by increasing the number of assemblies or by increasing the cross-sectional area of the assemblies.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A mesofluidic system for separating components of a mixture, the system comprising:
   a mesofluidic conduit system comprising at least one section;
   the at least one section comprising, in at least one cross section, a tortured path and an expressway;
   the at least one section being configured to receive a mixture of components, the tortured path configured to direct at least one portion of the mixture of components to the expressway while allowing at least another portion of the mixture of components to avoid the expressway; and
   at least one other section defining at least two conduit pathways, one of the conduit pathways being configured to receive the at least one portion of the mixture of components proceeding through the expressway and the another of the conduit pathways being configured to receive the other portion of the mixture of components that proceeded through the tortured path and avoided the expressway.

2. The system of claim 1 wherein the tortured path comprises one or more staggered arrays.

3. The system of claim 2 wherein the staggered arrays comprise staggered posts.

4. The system of claim 1 wherein the tortured path comprises one or more tapered arrays.

5. The system of claim 1 wherein the tortured path comprises one or more arrays arranged to direct the at least one portion of a mixture of components in one direction and direct the other portion of the mixture of components in another direction within the one section.

6. The system of claim 5 wherein the one portion of the mixture has different physical properties than the other portion of the mixture.

7. The system of claim 1 wherein the tortured path comprises at least one support extending lengthwise along a pressure differential axis of the at least one section, and a plurality of displacement devices extending from the at least one support and normal to the pressure differential axis.

8. The system of claim 1 wherein the mixture comprises bubbles.

9. The system of claim 1 wherein the mixture is condensed phase materials.

10. A mesofluidic method for separating components of a mixture, the method comprising:
   providing a mixture of components, wherein at least two of the components have different physical characteristics;
   conveying the mixture mesofluidically through at least one section of conduit, the at least one section of conduit defining a tortured path and an expressway; and
   the conveying separating at least some of the at least two components.

11. The method of claim 10 wherein the mixture comprises bubbles.

12. The method of claim 10 wherein the mixture is condensed phase materials.

13. The method of claim 12 wherein the mixture of condensed phase components comprises one or more of liquids, liquids and solids, liquids and cells, liquids and flocculants, solids, and/or emulsificants.

14. The method of claim 13 wherein the mixture of condensed phase components comprises solids and the solids can be comprise particles, molecules, fragments, and/or cells.

15. The method of claim 12 wherein the mixture of condensed phase components is multi-phasic.

16. The method of claim 12 wherein the mixture of condensed phase components comprises more than two phases.

17. The method of claim 10 wherein the separating comprises separating gases from gases within a condensed phase matrix, gases from liquids, liquids from liquids, liquids from solids, and/or solids from solids.

18. The method of claim 10 wherein the mixture of components comprises one or more of sand, oil, sticky particles that agglomerate, salt cake simulant, abrasive polydispersed particles, viscous slurry with particles, spheres, silica, oil-water mixture with solid particles, algae, flocculates, and/or emulsions.

19. A mesofluidic system for separating components of a mixture, the system comprising:
   a mesofluidic conduit system comprising at least one section;
   the at least one section comprising, in at least one cross section:
   a tortured path;
   wherein the at least one section is configured to receive a mixture of components, the tortured path configured to direct at least one portion of the mixture of components in one direction while allowing at least another portion of the mixture of components to proceed without change in direction, wherein the path of the one portion is different than the other portion; and
   at least one other section defining at least two conduit pathways, one of the conduit pathways being configured to receive the at least one portion of the mixture of components proceeding in the one direction and the other of the conduit pathways being configured to receive the other portion of the mixture of components.

20. The system of claim 19 wherein the tortured path comprises one or more staggered arrays.

21. The system of claim 20 wherein the staggered arrays comprise staggered posts.

22. The system of claim 19 wherein the tortured path comprises one or more tapered arrays.

23. The system of claim 19 wherein the tortured path comprises one or more arrays arranged to direct at least one portion of the mixture of components in one direction and direct at least another portion of the mixture of components in another direction.

24. The system of claim 23 wherein the one portion of the mixture has different physical properties than the other portion of the mixture.

25. The system of claim 19 wherein the tortured path comprises:

at least one support extending lengthwise along a pressure differential axis of the at least one section; and a plurality of displacement devices extending from the at least one support and normal to the pressure differential axis.

26. A mesofluidic system for separating components of a mixture, the system comprising:

a mesofluidic conduit system comprising at least one section;

the at least one section comprising, in at least one cross section, a tortured path and an expressway, the section being aligned along a plane wherein the tortured path is aligned perpendicularly above the expressway in the at least one cross section;

the at least one section being configured to receive a mixture of fluid phase components; and the tortured path configured to direct at least one portion of the mixture of components in one direction while allowing at least another portion of the mixture of components to proceed without change in direction, wherein the path of the one portion is different than the other portion; and at least one other section defining at least two conduit pathways, one of the conduit pathways being configured to receive the at least one portion of the mixture of components proceeding in the one direction and the other of the conduit pathways being configured to receive the other portion of the mixture of components.

27. The system of claim 26 wherein the tortured path comprises one or more staggered arrays of deterministic lateral displacement devices.

28. The system of claim 27 wherein the lateral displacement devices comprise staggered posts.

29. The system of claim 27 wherein the tortured path comprises at least one support extending lengthwise along a pressure differential axis of the at least one section, and plurality of displacement devices extending from the at least one support and normal to the pressure differential axis.

30. The system of claim 26 wherein the tortured path comprises one or more tapered arrays of deterministic lateral displacement devices.

31. The system of claim 26 wherein the one portion of the mixture has different physical properties than the other portion of the mixture.

32. A mesofluidic method for separating components of a mixture, the method comprising:

providing a mixture of components, wherein at least two of the components have different physical characteristics;

conveying the mixture mesofluidically along a plane through at least one section of conduit, the at least one section of conduit defining a tortured path and an expressway, wherein the tortured path is aligned perpendicularly above the expressway; and the conveying separating at least some of the at least two components.

33. The method of claim 32 wherein the mixture of components comprises one or more of gases and liquids, liquids, liquids and solids, liquids and cells, liquids and flocculants, solids, and/or emulsificants.

34. The method of claim 33 wherein the mixture of components is multi-phasic.

35. The method of claim 32 wherein the mixture of components comprises more than two phases.

36. The method of claim 32 wherein the separating comprises separating bubbles from bubbles within a liquid matrix, liquids from liquids, liquids from solids, and/or solids from solids.

37. The method of claim 32 wherein the mixture of components comprises one or more of sand, oil, sticky particles that agglomerate, salt cake simulant, abrasive polydispersed particles, viscous slurry with particles, spheres, silica, oil-water mixture with solid particles, algae, flocculants, and/or emulsions.

* * * * *